United States Patent
Roy Chaudhuri et al.

(10) Patent No.: US 12,509,695 B2
(45) Date of Patent: Dec. 30, 2025

(54) MATERIALS AND METHODS FOR PROTEIN PRODUCTION

(71) Applicant: Impossible Foods Inc., Redwood City, CA (US)

(72) Inventors: Biswajoy Roy Chaudhuri, San Mateo, CA (US); Smita Shankar, Millibrae, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

(21) Appl. No.: 18/609,276

(22) Filed: Mar. 19, 2024

(65) Prior Publication Data

US 2024/0218378 A1    Jul. 4, 2024

Related U.S. Application Data

(62) Division of application No. 16/858,443, filed on Apr. 24, 2020, now Pat. No. 11,965,167.

(60) Provisional application No. 62/838,770, filed on Apr. 25, 2019.

(51) Int. Cl.
    *C12N 15/52*    (2006.01)

(52) U.S. Cl.
    CPC ...... *C12N 15/52* (2013.01); *C12Y 203/01037* (2013.01)

(58) Field of Classification Search
    CPC ........ C12N 15/63; C12N 9/1029; C12N 9/16; C12Y 203/01037; C12Y 503/03012
    USPC ........................................................ 434/194
    See application file for complete search history.

(56) References Cited

U.S. PATENT DOCUMENTS

| | | |
|---|---|---|
| 3,013,863 A | 12/1961 | May |
| 4,683,195 A | 7/1987 | Mullis |
| 4,683,202 A | 7/1987 | Mullis |
| 4,800,159 A | 1/1989 | Mullis |
| 4,886,753 A | 12/1989 | Marcker |
| 4,965,188 A | 10/1990 | Mullis |
| 5,204,253 A | 4/1993 | Sanford |
| 5,538,880 A | 7/1996 | Lundquist |
| 5,753,465 A | 5/1998 | Chien et al. |
| 5,824,511 A | 10/1998 | Mattoon et al. |
| 6,013,863 A | 1/2000 | Lundquist |
| 6,261,827 B1 | 7/2001 | Elrod |
| 6,329,571 B1 | 12/2001 | Hiei |
| 7,230,157 B1 | 6/2007 | Zuo |
| 8,021,695 B2 | 9/2011 | Gruber |
| 8,143,023 B2 | 3/2012 | Takagi et al. |
| 8,236,528 B2 | 8/2012 | Tsutsumi |
| 9,085,766 B2 | 7/2015 | Crane et al. |
| 9,938,326 B2 | 4/2018 | Akeda et al. |
| 9,938,327 B2 | 4/2018 | Shankar |
| 10,273,492 B2 | 4/2019 | Shankar |
| 10,689,656 B2 | 6/2020 | Shankar et al. |
| 11,965,167 B2 | 4/2024 | Roy Chaudhuri et al. |
| 2002/0194643 A1 | 12/2002 | Merot |
| 2004/0093643 A1 | 5/2004 | Ensley |
| 2006/0053515 A1 | 3/2006 | Geigenberger |
| 2007/0031832 A1 | 2/2007 | Watt |
| 2008/0085996 A1 | 4/2008 | Kuvshinov |
| 2008/0166757 A1 | 7/2008 | Bron |
| 2009/0328249 A1 | 12/2009 | Paget |
| 2010/0064384 A1 | 3/2010 | Zank |
| 2011/0129874 A1 | 6/2011 | Tsutsumi et al. |
| 2011/0287467 A1 | 11/2011 | Crane |
| 2012/0195883 A1 | 8/2012 | Huang |
| 2014/0325710 A1 | 10/2014 | Abad |
| 2015/0299716 A1 | 10/2015 | Zhou |
| 2016/0024512 A1 | 1/2016 | Armstrong |
| 2016/0130602 A1 | 5/2016 | Inzé |
| 2016/0340411 A1 | 11/2016 | Fraser |
| 2017/0188612 A1 | 7/2017 | Varadan |
| 2017/0342131 A1 | 11/2017 | Fraser |
| 2017/0342132 A1 | 11/2017 | Fraser |
| 2017/0349637 A1 | 12/2017 | Shankar |
| 2017/0349906 A1 | 12/2017 | Shankar |
| 2018/0127764 A1 | 5/2018 | Shankar |
| 2018/0371469 A1 | 12/2018 | Shankar |
| 2019/0292217 A1 | 9/2019 | Davis |
| 2019/0292555 A1 | 9/2019 | Davis |

(Continued)

FOREIGN PATENT DOCUMENTS

| CN | 1974758 | 6/2007 |
|---|---|---|
| CN | 105483146 | 4/2016 |

(Continued)

OTHER PUBLICATIONS

U.S. Appl. No. 62/835,338, Hoyt et al.

(Continued)

*Primary Examiner* — Tekchand Saidha
*Assistant Examiner* — Mohammad Y Meah
(74) *Attorney, Agent, or Firm* — Fish & Richardson P.C.

(57) ABSTRACT

This document relates to materials and methods for the production of protein. In one aspect, this document provides a first exogenous nucleic acid construct including a nucleotide sequence encoding an aminolevulinate synthase (ALAS) protein operably linked to a first promoter element, wherein the ALAS includes at least a first heme responsive motif (HRM), and wherein the ALAS includes a mutation in the first HRM, and a second exogenous nucleic acid construct comprising a nucleotide sequence encoding a heme-binding protein, wherein the second exogenous nucleic acid construct including a nucleotide sequence encoding the heme-binding protein is operably linked to the first promoter element or is operably linked to a second promoter element.

12 Claims, 32 Drawing Sheets
Specification includes a Sequence Listing.

(56) References Cited

U.S. PATENT DOCUMENTS

| | | |
|---|---|---|
| 2020/0340000 A1 | 10/2020 | Roy-Chaudhuri et al. |
| 2022/0290166 A1 | 9/2022 | Shankar et al. |
| 2025/0051786 A1 | 2/2025 | Shankar et al. |
| 2025/0066951 A1 | 2/2025 | Hoyt et al. |

FOREIGN PATENT DOCUMENTS

| | | |
|---|---|---|
| CN | 108517327 | 9/2018 |
| EP | 2058398 | 5/2009 |
| EP | 2669375 | 12/2013 |
| JP | A-10-42873 | 2/1998 |
| JP | 2005-333907 | 12/2005 |
| JP | 2008017774 | 1/2008 |
| JP | A-2008-17733 | 1/2008 |
| JP | A-2009-505657 | 2/2009 |
| RU | 2520748 | 6/2014 |
| WO | WO 1998012913 | 4/1998 |
| WO | WO 2000000597 | 1/2000 |
| WO | WO 2001098480 | 12/2001 |
| WO | WO 2003085113 | 10/2003 |
| WO | WO 2004057946 | 7/2004 |
| WO | WO 2004099405 | 11/2004 |
| WO | WO 2006091094 | 11/2004 |
| WO | WO 2008090211 | 7/2008 |
| WO | WO 2009009142 | 1/2009 |
| WO | WO 2010063652 | 6/2010 |
| WO | WO 2012083424 | 6/2012 |
| WO | WO 2013010042 | 1/2013 |
| WO | WO 2014008729 | 1/2014 |
| WO | WO 2014110539 | 7/2014 |
| WO | WO 2015038796 | 3/2015 |
| WO | WO 2015153666 | 10/2015 |
| WO | WO 2016054375 | 4/2016 |
| WO | WO 2016183163 | 11/2016 |
| WO | WO 2018102656 | 6/2018 |
| WO | WO 2018102721 | 6/2018 |
| WO | WO 2020/219972 A1 | 10/2020 |

OTHER PUBLICATIONS

[No Author Listed] Impossible Foods Inc. "GRAS Notification for Soybean Leghemoglobin Protein Derived from Pichia Pastoris." GRAS notice 000540, Retrieved from internet <URL:https://www.fda.gov/Food/IngredientsPackagingLabeling/GRAS/NoticeInventory/default.htm.> dated Sep. 4, 2014, 109 pages, Redwood City, California.

[No Author Listed] Impossible Foods Inc. "GRAS Notification for Soybean Leghemoglobin Protein Derived from Pichia Pastoris." GRAS notice 000737, Retrieved from internet <URL:https://www.fda.gov/downloads/Food/IngredientsPackagingLabeling/GRAS/NoticeInventory/default.htm, 1063 pages, dated Oct. 2, 2017.

Abler and Scandalios, "Isolation and characterization of a genomic sequence encoding the maize Cat3 catalase gene," Plant Mol. Biol., 1993, 22(6):1031-1038.

Ahmad et al., "Protein expression in Pichia pastoris: recent achievements and perspectives for heterologous protein production," Applied microbiology and biotechnology, Jun. 2014, 98:5301-5317.

Alberts et al., "Molecular Biology of the Cell," 4th edition, 2002, 20 pages.

Aoyama and Chua, "A glucocorticoid-mediated transcriptional induction system in transgenic plants," Plant J., 1997, 11(3):605-612.

Azmir, et al., "Techniques for extraction of bioactive compounds from plant materials," J. Food Engineering, 2013, 117(4):426-436.

Balaji, et al., "Expression of anti-tumor necrosis factor alpha (TNFα) single-chain variable fragment (scFv) in Spirodela punctata plants transformed with Agrobacterium tumefaciens," Biotechnology and Applied Biochemistry, 2016, 63(3):354-361.

Barata, et al., "Targeting of the soybean leghemoglobin to tobacco chloroplasts: effects on aerobic metabolism in transgenic plants," Plant Science, 2000, 155:193-202.

Bawa et al., "Functional recombinant protein is present in the pre-induction phases of Pichia pastoris cultures when grown in bioreactors, but not shake-flasks," Microbial cell factories, Dec. 2014, 13(1):1-13.

Benfey et al., "The cauliflower mosaic virus 35S promoter; combinatorial regulation of transcription in plants," Science, 1990, 250:959-966.

Benfey, et al., "The CaMV 35S enhancer contains at least two domains which can confer different developmental and tissue-specific expression patterns," The EMBO Journal, 1989, 8(8):2195-2202.

Benson et al., "GenBank," Nucleic Acids Research: Database Issue, 2014, 42:D32-D37.

Böhner and Gatz, "Characterisation of novel target promoters for the dexamethasone-inducible/tetracycline-repressible regulator TGV using luciferase and isopentenyl transferase as sensitive reporter genes." Mol. Gen. Genet., 2001, 264:860-870.

Böhner, et al., "Transcriptional activator TGV mediates dexamethasone-inducible and tetracycline-inactivatabale gene expression," Plant J., 1999, 19:87-95.

Bruce, et al., "Expression profiling of the maize flavonoid pathway genes controlled by estradiol-inducible transcription factors CRC and P," Plant Cell, 2000, 12:65-79.

Caddick, et al., "An ethanol inducible gene switch for plants used to manipulate carbon metabolism," Nat. Biotechnol., 1998, 16:177-180.

Chaparro-Giraldo, et al, "Soybean leghemoglobin targeted to potato chloroplasts influences growth and development of transgenic plants," Plant Cell Reports, 2000, 19:961-965.

Chen, et al., "Regulated expression of genes encoding soybean β-conglycinins in transgenic plants," Dev. Genet., 1989, 10(2):112-122.

Chenna et al., "Multiple sequence alignment with the Clustal series of programs," Nucleic acids research, Jul. 1, 2003, 31(13):3497-3500.

Chiruvolu, et al., "Recombinant protein production in an alcohol oxidase-defective strain of Pichia pastoris in fedbatch fermentations," Enzyme Microb. Technol., 1997, 21:277-83.

Comai, et al., "Expression of a *Brassic anapus* malate synthase gene in transgenic tomato plants during the transition from late embryogeny to germination," Plant Physiol., 1992, 98:53-61.

Conceicao and Krebbers, "A cotyledon regulatory region is responsible for the different spatial expression patterns of *Arabidopsis* 2S albumin genes," Plant, 1994, 5:493-505.

Craft, et al., "New pOp/LhG4 vectors for stringent glucocorticoid-dependent transgene expression in *arabidopsis*," Plant J., 2005, 41:899-918.

Cramer et al., "Transgenic Plants for Therapeutic Proteins: Linking Upstream and Downstream Strategies," Curr Top Microbiol Immunol, 1999, 240:95-118.

Cregg, et al., "Recombinant protein expression in Pichia pastoris," Molecular Biotechnology, 2000, 16:23-52.

Cuellar-Bermudez, et al., "Extraction and purification of high-value metabolites from microalgae: essential lipids, astaxanthin and phycobiliproteins," Microb. Biotechnol., 2015, 8(2):190-209.

Czarnecki and Grimm, "Post-translational control of tetrapyrrole biosynthesis in plants, algae, and cyanobacteria," J. Exp. Bot., 2012, 63(4):1675-1687.

Dailey et al, "Examination of mitochondrial protein targeting of haem synthetic enzymes: in vivo identification of three functional haem-responsive motifs in 5-aminolaevulinate synthase" Biochem J., 2005, 386(Pt 2):381-386.

Datta, et al., "Nucleotide sequence of a gene encoding soybean repetitive proline-rich protein 3," Plant Mol. Biol., 1990, 14(2):285-286.

Dayhoff et al., "A Model of Evolutionary Change in Proteins," Atlas of Protein Sequence and Structure, 1978, 5(Suppl. 3):345-352.

De Schutter et al., "Genome sequence of the recombinant protein production host Pichia pastoris," Nature biotechnology, Jun. 2009, 27(6):561-5666.

Declaration of Dr. Carl Batt, dated Jan. 27, 2023, 137pages.

Declaration of Dr. Carl Batt, dated Jan. 27, 2023, 174 pages.

(56) References Cited

OTHER PUBLICATIONS

Declaration of Dr. Geoffrey Lin-Cereghino, dated Jan. 27, 2023, 51 pages.
Declaration of Dr. Sylvia Hall-Ellis, dated Jan. 27, 2023, 196 pages.
Devos et al., "Practical limits of function prediction," Proteins: Structure, Function, and Bioinformatics, Oct. 2000, 41(1):98-107.
Ding, et al., "High-level expression of basic fibroblast growth factor in transgenic soybean seeds and characterization of its biological activity," Biotechnol. Lett., 2006, 28(12):869-875.
Engel et al., "Foods and food ingredients produced via recombinant DNA techniques: an overview," Genetically Modified Foods—Acs Symposium Series, 1995, Chapter 1:1-10.
Eskelin, et al., "Production of a recombinant full-length collagen type I α-1 and of a 45-kDa collagen type I α-1 fragment in barley seeds," Plant Biotechnology Journal, 2009, 7:657-672.
Extended European Search Report in European Appln. No. 20157598-2, dated Aug. 26, 2020, 18 pages.
Extended European Search Report in European Appln. No. 22151183.5, dated Jul. 13, 2022, 12 pages, Europe.
Ferreira, "Heme synthesis," Encyclopedia of Biological Chemistry, 2013 539-542.
Fraser et al., "Safety evaluation of soy leghemoglobin protein preparation derived from pichia pastoris, intended for use as a flavor catalyst in plant-based meat," International Journal of Toxicology, 2018, 37(3):241-262.
Freeman, "Transcription and Translation," Biological Sciences, Chapter 16-18, 2d. Edition, 2005, 338-400.
Garrocho-Villegas et al., "Plant hemoglobins: what we know six decades after their discovery," Gene, Aug. 15, 2007, 398(1-2):78-85.
Gatz, et al., "Stringent repression and homogeneous de-repression by tetracycline of a modified CaMV 35S promoter in intact transgenic tobacco plants," Plant J., 1992, 2:397-404.
GenBank Accession No. AAA33980.1, "leghemoglobin [*Glycine max*]," Apr. 27, 1993, 1 page.
GenBank Accession No. AB365355.1, "Candida boidinii TRM1 gene for Zn(II)2Cys6-type transcription factor Trm1, complete cds," dated Mar. 22, 2008, 3 pages.
GenBank Accession No. AB548760.1, "Candida boidinii TRM2 gene for C2H2-type transcription factor Trm2, complete cds," dated Jul. 17, 2010, 3 pages.
GenBank Accession No. ABD57365.1, "methanol expression regulator I [Komagataella pastoris]," dated Mar. 4, 2006, 2 pages.
GenBank Accession No. AEOI02000005.1, bases 858873 to 862352, "Ogataea parapolymorpha DL-1 chr3, whole genome shotgun sequence," dated Dec. 3, 2013, 186 pages.
GenBank Accession No. AF066054.1, "Pichia pastoris formaldehyde dehydrogenase (FLD1) gene, complete cds," dated Sep. 17, 1998, 2 pages.
GenBank Accession No. AJ313360.1, "Hansenula polymorpha partial ORF1 DNA and MOX gene promoter region," dated Jul. 25, 2016, 2 pages.
GenBank Accession No. AJA60352.1, "Ferrochelatase [Bradyrhizobium japonicum]," dated Feb. 24, 2015, 2 pages.
GenBank Accession No. AY288296.1, "Pichia pastoris 3-phosphoglycerate kinase (PGK1) gene, complete cds," dated Jul. 22, 2005, 2 pages.
GenBank Accession No. BAA24685.1, "leghemoglobin [*Pisum sativum*]," date Mar. 27, 2009, 3 pages.
GenBank Accession No. BAF99700.1, "Zn(II)2Cys6-type transcription factor Trm1 [Candida boidinii]," dated Mar. 22, 2008, 2 pages.
GenBank Accession No. BAJ07608.1, "C2H2-type transcription factor Trm2 [Candida boidinii]," dated Jul. 17, 2010, 1 page.
GenBank Accession No. CAY69365.1, "5-aminolevulinate synthase, catalyzes the first step in the heme biosynthetic pathway [Komagataella phaffii GS115]," dated Feb. 27, 2015, 2 pages.
GenBank Accession No. CAY70887.1, "Hypothetical protein PAS_chr3_0836 [Komagataella phaffii GS115]," dated Feb. 27, 2015, 2 pages.
GenBank Accession No. DQ395124.1, "Pichia pastoris methanol expression regulator I gene, complete cds," dated Mar. 4, 2006, 2 pages.
GenBank Accession No. E06147.1, "Promoter of Candida alcohol oxidase gene," dated Nov. 4, 2005, 2 pages.
GenBank Accession No. ESX01253.1, "Regulatory protein ADR1 [Ogataea parapolymorpha DL-1]," dated Dec. 3, 2013, 2 pages.
GenBank Accession No. FJ752551.1, "Pichia pastoris dihydroxyacetone synthase 1 (DAS1) gene, complete cds" dated Mar. 21, 2009, 2 pages.
GenBank Accession No. J02798.1, "*Brassica napus* 1.7S napin seed storage protein (napA) gene, complete cds," dated Oct. 11, 2001, 2 pages.
GenBank Accession No. KJ755994.1, "Komagataella pastoris strain GS115 FLD1 gene, promoter region and 5' UTR," dated Jul. 30, 2014, 1 page.
GenBank Accession No. L05934.1, "*Zea mays* catalase (Cat3) gene, complete cds," dated Oct. 22, 1993, 3 pages.
GenBank Accession No. NF102272.2, "Protein Family Model PF00042 (heme-biding globins)," dated Jan. 27, 2021, 27 pages.
GenBank Accession No. NM_173881.2, "Bos taurus myoglobin (MB), mRNA," dated Feb. 23, 2019, 2 pages.
GenBank Accession No. U62648.1, "Pichia pastoris glyceraldehyde-3-phosphate dehydrogenase (GAP) gene, complete cds," dated Mar. 7, 1997, 2 pages.
GenBank Accession No. U93215.3, "*Arabidopsis thaliana* chromosome 2 Bac T6B20 genomic sequence, complete sequence," dated Feb. 27, 2002, 32 pages.
GenBank Accession No. U96967.1, "Pichia pastoris strain NRRL Y-11430 alcohol oxidase (AOX1) gene, complete cds," dated Oct. 30, 2001, 2 pages.
GenBank Accession No. X02425.1, "Hansenula polymorpha MOX gene for methanol oxidase" dated Oct. 23, 2008, 3 pages.
GenBank Accession No. X79871.1, "P.pastoris AOX2 gene, promoter region," dated Jul. 26, 2016, 2 pages.
GenBank Accession No. XM_002490678.1, "Komagataella phaffii GS115 Hypothetical protein (PAS_chr1-4_0586), partial Mrna," dated Jul. 22, 2009, 2 pages.
GenBank Accession No. XM 002491600.1, "Komagataella phaffii GS115 5-aminolevulinate synthase, catalyzes the first step in the heme biosynthetic pathway (PAS_chr2-1_0716), partial mRNA," dated Oct. 11, 2017, 2 pages.
GenBank Accession No. XP 002492481.1: Ferrochelatase [Komagataella phaffi GS115], dated Oct. 11, 2017, 3 pages.
GenBank Accession No. XP 002493846.1 Delta-aminolevulinate dehydratase, a homooctameric enzyme [Komagataella phaffi GS115], dated Oct. 11, 2017.
GenBank Accession No. XP 014509945.1, "ferrochelatase-2, chloroplastic isoform X1 [*Vigna radiata* var. *radiata*]," dated Nov. 10, 2015, 1 page.
GenBank Accession No. YSAAODIA, "Candida boidinii methanol oxidase (AOD1) gene, complete cds," dated Apr. 27, 1993, 2 pages.
González-Domínguez et al., "Haem Regulation of the Mitochondrial Import of the Kluyveromyces Lactis 5-aminolaevulinate Synthase: An Organelle Approach," Yeast, 2001, 18(1):41-48.
Goodfellow et al., "The solution structure and heme binding of the presequence of murine 5-aminolevulinate synthase," FEBS Letters, 2001, 404(2):325-331.
Guarna et al., "On-line monitoring and control of methanol concentration in shake-flask cultures of Pichia pastoris," Biotechnology and bioengineering, Nov. 5, 1997, 56(3):279-286.
Haddadi, "Investigation of crops cultivation systems: a review," Agricultural Advances, 2016, 5(3):269-274.
Hajdukiewicz, et al., "The small, versatile pPZP family of Agrobacterium binary vectors for plant transformation," Plant Mol. Biol., 1994, 25(6):989-994.
Haon et al., "Recombinant protein production facility for fungal biomass-degrading enzymes using the yeast Pichia pastoris," Frontiers in microbiology, Sep. 23, 2015, 6(1002): 12 pages.
Harada, et al., "Spatially regulated genes expressed during seed germination and postgerminative development are activated during embryogeny," Mol. Gen. Genet., 1988, 212(3):466-473.

(56) References Cited

OTHER PUBLICATIONS

Hargrove, et al., "Characterization of recombinant soybean leghemoglobin a and apolar distal histidine mutants," J. Mol. Biol., 1997, 266:1032-1042.
Hartner et al., "Promoter library designed for fine-tuned gene expression in Pichia pastoris," Nucleic acids research, Jul. 1, 2008, 36(12): e76, 15 pages.
Hartner et al., "Regulation of methanol utilisation pathway genes in yeasts," Microbial cell factories, Dec. 2006, 5(39):1-21.
Hoffman, et al., "Identification of rate-limiting steps in yeast heme biosynthesis," Biochem. Biophys. Res. Commun., 2003, 310(4):1247-1253.
Hong et al., "Fermentation strategies for improved heterologous expression of laccase in Pichia pastoris," Biotechnology and Bioengineering, Aug. 20, 2002, 79(4):438-449.
Horvath, et al., "The production of recombinant proteins in transgenic barley grains," PNAS, 2000, 97:1914-1919.
Hyldig-Nielsen, et al., "The primary structures of two leghemoglobin genes from soybean," Nucleic Acids Res., 1982, 10:689-701.
Inan & Meagher, "Non-repressing carbon sources for alcohol oxidase (AOX1) promoter of Pichia pastoris," J. Biosci. Bioeng., 2001, 92:585-589.
International Preliminary Report on Patentability in International Appln. No. PCT/US2016/031797, dated Nov. 14, 2017, 6 pages.
International Preliminary Report on Patentability in International Appln. No. PCT/US2017/064160, dated Jun. 4, 2019, 8 pages.
International Preliminary Report on Patentability in International Appln. No. PCT/US2017/064274, dated Jun. 4, 2019, 6 pages.
International Preliminary Report on Patentability in International Appln. No. PCT/US2020/029946, dated Nov. 4, 2021, 7 pages.
International Search Report and Written Opinion in International Appln. No. PCT/US2016/031797, dated Sep. 20, 2016, 9 pages.
International Search Report and Written Opinion in International Appln. No. PCT/US2017/064160, dated Feb. 13, 2018, 11 pages.
International Search Report and Written Opinion in International Appln. No. PCT/US2017/064274, dated Mar. 7, 2018, 9 pages.
International Search Report and Written Opinion in PCT Appln. No. PCT/US2020/029946, dated Jul. 14, 2020, 12 pages.
Jokipii-Lukkari, et al., "Intrinsic non-symbiotic and truncated haemoglobins and heterologous Vitreoscilla haemoglobin expression in plants," Journal of Experimental Botany, 2009, 60(2):409-422.
Josefsson, et al., "Structure of a gene encoding the 1.7 S storage protein, napin, from *Brassica napus*," J. Biol. Chem., 1987, 262:12196-12201.
Kaltwasser, et al., "Construction and application of epitope- and green fluorescent protein-tagging integration vectors for Bacillus subtilis," Applied and Environmental Microbiology, 2002, 68:2624-2628.
Katakura et al., "Effect of methanol concentration on the production of human β2-glycoprotein I domain V by a recombinant Pichia pastoris: a simple system for the control of methanol concentration using a semiconductor gas sensor," Journal of Fermentation and Bioengineering, Jan. 1, 1998, 86(5):482-487.
Keddie, et al., "A seed-specific *Brassica napus* oleosin promoter interacts with a G-box-specific protein and may be bi-directional," Plant Mol. Biol., 1994, 24(2):327-340.
Keegstra and Cline, "Protein import and routing systems of chloroplasts," Plant Cell, 1999, 11:557-579.
Kelly et al., "Cultivation of methylotrophs," In Hydrocarbon and Lipid Microbiology Protocols: Isolation and Cultivation, Dec. 6, 2014, 33 pages.
Kim et al., 'Increased expression of Fe-chelatase leads to increased metabolic flux into heme and confers protection against photodynamically induced oxidative stress,' Oct. 1, 2014, 271-287, 86(3), Plant molecular biology.
Kisselev et al, "Polypeptide Release Factors in Prokaryotes and Eukaryotes: Same Function, Different Structure", Structure, Jan. 2002, 10(1):8-9.
Koo, et al., "Ecdysone agonist-inducible expression of a coat protein gene from. tobacco mosaic virus confers viral resistance in transgenic *Arabidopsis*," Plant J., 2004, 37:439-448.
Krainer, et al., "Optimizing cofactor availability for the production of recombinant heme peroxidase in Pichia pastoris," Microbial Cell Factories, 2015, 14(4):1-9.
Kranthi et al., "Identification of key DNA elements involved in promoter recognition by Mxrlp, a master regulator of methanol utilization pathway in Pichia pastoris," Biochimica et Biophysica Acta (BBA)—Gene Regulatory Mechanisms, Jun. 1, 2009, 1789(6-8):460-468.
Kranthi, et al., "Identification of Mxrlp-binding sites in the promoters of genes encoding dihydroxyacetone synthase and peroxin 8 of the methylotrophic yeast Pichia pastoris," Yeast, 2010, 27:705-711.
Kubota, et al., "Novel Mechanisms for Heme-dependent Degradation of ALAS1 Protein as a Component of Negative Feedback Regulation of Heme Biosynthesis," J. Biol. Chem., 2016, 291(39):20516-20529.
Kurtz et al., "Development of autonomously replicating plasmids for Candida albicans," Molecular and Cellular Biology, Jan. 1987, 7(1):209-217.
Liachko et al., "An autonomously replicating sequence for use in a wide range of budding yeasts," FEMS yeast research, Mar. 1, 2014, 4(2):364-367.
Lin-Cereghino et al., "Heterologous protein expression in the methylotrophic yeast Pichia pastoris," FEMS microbiology reviews, Jan. 1, 2000, 24(1):45-66.
Lin-Cereghino, et al., "Mxrlp, a key regulator of the methanol utilization pathway and peroxisomal genes in Pichia pastoris," Mol. and Cell. Biol., 2006, 26:883-897.
Liu, et al., "Bacterial pathogen phytosensing in transgenic tobacco and *Arabidopsis* plants," Plant Biotech. J., 2013, 11:43-52.
Liu, et al., "Balanced globin protein expression and heme biosynthesis improve production of human hemoglobin in *Saccharomyces cerevisiae*," Metabolic Engineering, 2014, 21:9-16.
Liu, et al., "Rapid in vivo analysis of synthetic promoters for plant pathogen phytosensing," BMC Biotechnol., 2011, 11:108, 9 pages.
Lloyd, et al., "Targeted mutagenesis using zinc-finger nucleases in *Arabidopsis*," Proc. Natl. Acad. Sci. USA, 2005, 102:2232-2237.
Londer, et al., "Production and preliminary characterization of a recombinant triheme cytochrome c(7) from Geobacter sulfurreducens in *Escherichia coli*," Biochem. Biophys. Acta Jul. 2002, 1554(3):202-211.
Lutz, et al., "A guide to choosing vectors for transformation of the plastid genome of higher plants," Plant Physiol., 2007, 145:1201-1210.
Malik et al., "Production of high levels of poly-3-hydroxybutyrate in plastids of C amelina sativa seeds," Plant biotechnology journal, Jun. 2015, 13(5):675-688.
Martinez, et al., "Ecdysone agonist inducible transcription in transgenic tobacco plants," Plant J., 1999, 19:97-106.
Marty, "Plant vacuoles," Plant Cell, 1999, 11:587-599.
Mense and Zhang, "Heme: a versatile signaling molecule controlling the activities of diverse regulators ranging from transcription factors to MAP kinases," Cell Res., 2006, 16:681-692.
Mett, et al., "Copper-controllable gene expression system for whole plants," PNAS, 1993, 90:4567-4571.
Miele, et al., "A GATA-type transcription factor regulates expression of the high-affinity iron uptake system in the methylotrophic yeast Pichia pastoris," Arch. Biochem. Biophys., 2007, 465:172-179.
Mitrophanov, et al., "Positive autoregulation shapes response timing and intensity in two component signal transduction systems," J. Mol. Biol., 2010, 401(4):671-680.
Mitrophanov, et al., "Positive feedback cellular control systems," Bioessays, 2008, 30(6):542-555.
Mochizuki, et al., "The cell biology of tetrapyrroles: a life and death struggle," Trends Plant Sci., 2010, 15(9):488-498.
Munakata et al., "Role of the Heme Regulatory Motif in the Heme-Mediated Inhibition of Mitochondrial Import of 5-aminolevulinate Synthase," J. Biochem., 2004, 136(2):233-238.
Naik, et al., "Production and utilisation of hydroponics fodder," Indian J. Anim. Nutr., 2015, 32(1):1-9.

(56) References Cited

OTHER PUBLICATIONS

Nakagawa, et al., "Alcohol oxidase hybrid oligomers formed in vivo and in vitro," Yeast, 1999, 15:1223-1230.
NCBI Resource Coordinators, "Database resources of the national center for biotechnology information," Nucleic acids research, Nov. 28, 2015, 44:D6-D19.
Nicola et al., "Structural rearrangements due to ligand binding and haem replacement in myoglobin and leghaemoglobins," European Journal of Biochemistry, Aug. 1977, 78(1):133-140.
Office Action in Chinese Appln. No. 202080040385.8, dated Mar. 1, 2024, 17 pages (with English translation).
Padidam, et al., "Chemical-inducible, ecdysone receptor-based gene expression system for plants," Transgenic Res., 2003, 12:101-109.
Parua et al., "Pichia pastoris 14-3-3 regulates transcriptional activity of the methanol inducible transcription factor Mxrl by direct interaction," Molecular microbiology, Jul. 2012, 85(2):282-298.
Pereira et al., "Conserved regulation of the Hansenula polymorpha MOX promoter in *Saccharomyces cerevisiae* reveals insights in the transcriptional activation by Adrlp," European journal of biochemistry, May 1996, 238(1):181-191.
Perez-Grau and Goldberg, "Soybean seed protein genes are regulated spatially during embryogenesis," Plant Cell., 1989, 1(11):1095-1109.
Phan, et al., "Novel plasmid-based expression vectors for intro- and extracellular production of recombinant proteins in Bacillus subtilis," Protein Expression & Purification, 2006, 46:189-195.
Proulx, et al., "Iron bioavailability of hemoglobin from soy root nodules using a caco-2 cell culture model," J. Agric. Food Chem., 2006, 54:1518-1522.
Qu, et al., "Ectopic expression of the cotton non-symbiotic hemoglobin gene GhHbl triggers defense responses and increases disease tolerance in *Arabidopsis*," Plant Cell Physiol., 2006, 47:1058-1068.
Rabert et al., "Recombinants proteins for industrial uses: utilization of Pichia pastoris expression system," Brazilian Journal of Microbiology, 2013, 44:351-356.
Raymond, et al., "Development of the methylotrophic yeast Pichia methanolica for the expression of the 65 kilodalton isoform of human glutamate decarboxylase," Yeast, 1998, 14:11-23.
Reedy, et al., "Development of a heme-protein structure-electrochemical function database," Nucleic Acids Research, 2008, 36: Database issue D307-D313.
Reynolds and Smith, "The isocitrate lyase gene of cucumber: Isolation, characterisation and expression in cotyledons following seed germination," Plant Mol. Biol., 1995, 27:487-497.
Richards, et al., "Construction of a GFP-BAR plasmid and its use for switchgrass transformation," Plant Cell. Rep., 2001, 20:48-54.
Roggenkamp et al., "Transformation of the methylotrophic yeast Hansenula polymorpha by autonomous replication and integration vectors," Molecular and General Genetics MGG, Feb. 1986, 202:302-308.
Roslan, et al., "Characterization of the ethanol-inducible alc gene-expression system in *Arabidopsis thaliana*," Plant J., 2001, 28:225-235.
Salter, et al., "Characterisation of the ethanol-inducible alc gene expression system for transgenic plants," Plant J., 1998, 16:127-132.
Samalova, et al., "pOp6/LhGR: a stringently regulated and highly responsive dexamethasone-inducible gene expression system for tobacco," Plant J., 2005, 41:919-935.
Sasano et al., "Trmlp, a Zn (II) 2Cys6-type transcription factor, is a master regulator of methanol-specific gene activation in the methylotrophic yeast Candida boidinii," Eukaryotic Cell, Mar. 2008, 7(3):527-536.
Sasano, et al., "Trm2p-dependent depression is essential for methanol-specific gene activation in the methylotrophic yeast Candid boidinii," FEMS Yeast Res., 2010, 10:535-544.
Search Report in Chinese Appln. No. 201480057829.3, dated Jan. 15, 2019, 2 pages, with English translation.
Shen, et al., "An optimized transit peptide for effective targeting of diverse foreign proteins into chloroplasts in rice," Scientific Reports, 2017, 7:46231, 12 pages.
Sheridan, et al., "The macl gene: controlling the commitment to the meiotic pathway in maize," Genetics, 1996, 142:1009-1020.
Sievers, et al., "The Primary Structure of Soybean (*Glycine max*) Leghemoglobin c*," Acta Chemica Scandinavica B, 1978, 32:380-386.
Sinagawa-Garcia, et al., "Next generation synthetic vectors for transformation of the plastid genome of higher plants," Plant Mol. Biol., 2009, 70:487-498.
Sjödahl, et al., "Deletion analysis of the *Brassica napus* cruciferin gene cru 1 promoter in transformed tobacco: promoter activity during early and late stages of embryogenesis is influenced by cis-acting elements in partially separate regions," Planta, 1995, 197:264-271.
Somleva, et al., "Agrobacterium-mediated genetic transformation of switchgrass," Crop Sci., 2002, 42:2080-2087.
Sossountzov, et al., "Spatial and temporal expression of a maize lipid transfer protein gene," Plant Cell, 1991, 3:923-933.
Sreekrishna, "Pichia, optimization of protein expression," Encyclopedia of industrial biotechnology: bioprocess, bioseparation, and cell technology, Flickinger MC. Hoboken, New Jersey: John Wiley and Sons, Inc., 2010:1-16.
Stryjewska et al., "Biotechnology and genetic engineering in the new drug development. Part I. DNA technology and recombinant proteins," Pharmacological reports, Sep. 2013, 65(5):1075-1085.
Sudhamsu et al., "Co-expression of ferrochelatase allows for complete heme incorporation into recombinant proteins produced in *E. coli*," Protein Expr. Purif., 2010, 73(1):78-82.
Supplementary European Search Report and Opinion in EP Appln. No. EP 14844701.4, dated Jan. 27, 2017, 6 pages.
Supplementary European Search Report and Opinion in EP Appln. No. EP 16793420.7, dated Aug. 29, 2018, 8 pages.
Tanaka and Tanaka, "Tetrapyrrole biosynthesis in higher plants" Annu. Rev. Plant Biol., 2007, 58:321-46.
Thompson, et al., "Characterization of the herbicide-resistance gene bar from *Streptomyces hygroscopicus*," EMBO, 1987, 6:2519-2523.
Tjalsma, et al., "Signal peptide-dependent protein transport in Bacillus subtilis: a genome-based survey of the secretome," Microbiol. and Molec. Biol. Rev., 2000, 64:515-547.
Tovkach, et al., "A toolbox and procedural notes for characterizing novel zinc finger nucleases for genome editing in plant cells," Plant J, 2009, 57:747-757 25.
Townsend, et al., "High-frequency modification of plant genes using engineered zinc-finger nucleases," Nature, 2009, 459:442-445.
Trinh et al., "Effect of methanol feeding strategies on production and yield of recombinant mouse endostatin from Pichia pastoris," Biotechnology and Bioengineering, May 20, 2003, 82(4):438-444.
UniParc Accession No. UPI0001A4D18B, retrieved from URL <https://www.uniprot.org/uniparc/UPI0001A4D18B?sort=score>, available on or before Sep. 2018, 3 pages.
UniprotKB Accession No. P02236, "Leghemoglobin C2," dated Nov. 1, 1988, 9 pages.
Urao, et al., "Molecular cloning and characterization of a gene that encodes a MYC-related protein in *Arabidopsis*," Plant Mol. Biol, 1996, 32:571-576.
Van den Broeck, et al., "Targeting of a foreign protein to chloroplasts by fusion to the transit peptide from the small subunit of ribulose 1,5-bisphosphate carboxylase," Nature, 1985, 313:358-363.
Vedvick et al., "High-level secretion of biologically active aprotinin from the yeast Pichia pastoris," Journal of industrial microbiology and biotechnology, Apr. 1, 1991, 7(3):197-201.
Vellard, "The enzyme as drug: application of enzymes as pharmaceuticals," Current Opinion in Biotechnology, 2003, 14(4):444-450.
Vitale and Denecke, "The endoplasmic reticulum—gateway of the secretory pathway," Plant Cell, 1999, 11:615-628.
Vögeli-Lange, et al., "Evidence for a role of β-1,3-glucanase in dicot seed germination," Plant J., 1994, 5:273-278.
Vogl et al., "Regulation of Pichia pastoris promoters and its consequences for protein production," New biotechnology, May 25, 2013, 30(4):385-404.

(56) References Cited

OTHER PUBLICATIONS

Vothknecht, et al., "Barley glutamyl tRNAGlu reductase: mutations affecting haem inhibition and enzyme activity," Phytochemistry, 1998, 47(4):513-519.

Wang et al., "Mit1 transcription factor mediates methanol signaling and regulates the alcohol oxidase 1 (AOX1) promoter in Pichia pastoris," Journal of Biological Chemistry, Mar. 18, 2016, 291(12):6245-6261.

Washio and Ishikawa, "Organ-specific and hormone-dependent expression of genes for serine carboxypeptidases during development and following germination of rice grains," Plant Physiol., 1994, 105:1275-1280.

Weinmann, et al., "A chimeric transactivator allows tetracycline-responsive gene expression in whole plants," Plant J., 1994, 5:559-569.

Werner, et al., "High-level recombinant protein expression in transgenic plants by using a double-inducible viral vector," PNAS, 2011, 108(34):14061-14066.

Whisstock et al, "Prediction of protein function from protein sequence and structure", Quarterly Reviews of Biophysics, Aug. 2003, 36(3):307-340.

Witkowski et al, "Conversion of a β-Ketoacyl Synthase to a Malonyl Decarboxylase by Replacement of the Active-Site Cysteine with Glutamine†", Biochemistry, Aug. 18, 1999, 38:11643-11650.

Wu, et al., "Efficient production of a functional single-chain antidigoxin antibody via an engineered Bacillus subtilis expression-secretion system," Nature Biotechnology, 1993, 11(1):71-76.

Xie and Yang, "RNA-guided genome editing in plants using a CRISPR-Cas system," Mal. Plant, 2013, 6:1975-1983.

Yurimoto et al., "Methanol-inducible gene expression and heterologous protein production in the methylotrophic yeast Candida boidinii," Biotechnology and applied biochemistry, Jun. 2009, 85-92, 53(2), Great Britain.

Zhang et al., "Heterologous protein expression in yeasts and filamentous fungi," Manual of Industrial Microbiology and Biotechnology, Mar. 25, 2010, 145-156.

Zhang, et al., "Isocitrate lyase and malate synthase genes from *Brassica napus* L. are active in pollen," Plant Physiol., 1994, 104:857-864.

Zhang, et al., "Optimization of the heme biosynthesis pathway for the production of 5-aminolevulinic acid in *Escherichia coli*," Sci. Rep., 2015, 5:8584, 7 pages.

Zhang, et al., "Transcription activator-like effector nucleases enable efficient plant genome engineering," Plant Physiol., 2013, 161:20-27.

Zuo, et al., "An estrogen receptor-based transactivator XVE mediates highly inducible gene expression in transgenic plants," Plant J., 2000, 24:265-273.

Figure 4

<110> Impossible Foods Inc.

<210> 1
<211> 161
<212> PRT
<213> Vigna radiata

<400> 1
Met Thr Thr Thr Leu Glu Arg Gly Phe Thr Glu Glu Gln Glu Ala Leu
1               5                   10                  15
Val Val Lys Ser Trp Asn Val Met Lys Lys Asn Ser Gly Glu Leu Gly
            20                  25                  30
Leu Lys Phe Phe Leu Lys Ile Phe Glu Ile Ala Pro Ser Ala Gln Lys
        35                  40                  45
Leu Phe Ser Phe Leu Arg Asp Ser Thr Val Pro Leu Glu Gln Asn Pro
    50                  55                  60
Lys Leu Lys Pro His Ala Val Ser Val Phe Val Met Thr Cys Asp Ser
65                  70                  75                  80
Ala Val Gln Leu Arg Lys Ala Gly Lys Val Thr Val Arg Glu Ser Asn
                85                  90                  95
Leu Lys Lys Leu Gly Ala Thr His Phe Arg Thr Gly Val Ala Asn Glu
            100                 105                 110
His Phe Glu Val Thr Lys Phe Ala Leu Leu Glu Thr Ile Lys Glu Ala
        115                 120                 125
Val Pro Glu Met Trp Ser Pro Ala Met Lys Asn Ala Trp Gly Glu Ala
    130                 135                 140
Tyr Asp Gln Leu Val Asp Ala Ile Lys Tyr Glu Met Lys Pro Pro Ser
145                 150                 155                 160
Ser

<210> 2
<211> 133
<212> PRT
<213> Methylacidiphilum infernorum

<400> 2
Met Ile Asp Gln Lys Glu Lys Glu Leu Ile Lys Glu Ser Trp Lys Arg
1               5                   10                  15
Ile Glu Pro Asn Lys Asn Glu Ile Gly Leu Leu Phe Tyr Ala Asn Leu
            20                  25                  30
Phe Lys Glu Glu Pro Thr Val Ser Val Leu Phe Gln Asn Pro Ile Ser
        35                  40                  45
Ser Gln Ser Arg Lys Leu Met Gln Val Leu Gly Ile Leu Val Gln Gly

Figure 4 - Continued

```
                  50                      55                      60
Ile Asp Asn Leu Glu Gly Leu Ile Pro Thr Leu Gln Asp Leu Gly Arg
 65                      70                      75                      80
Arg His Lys Gln Tyr Gly Val Val Asp Ser His Tyr Pro Leu Val Gly
                              85                      90                      95
Asp Cys Leu Leu Lys Ser Ile Gln Glu Tyr Leu Gly Gln Gly Phe Thr
                             100                     105                     110
Glu Glu Ala Lys Ala Ala Trp Thr Lys Val Tyr Gly Ile Ala Ala Gln
                     115                     120                     125
Val Met Thr Ala Glu
        130
```

<210> 3
<211> 139
<212> PRT
<213> Aquifex aeolicus

<400> 3
```
Met Leu Ser Glu Glu Thr Ile Arg Val Ile Lys Ser Thr Val Pro Leu
  1               5                  10                  15
Leu Lys Glu His Gly Thr Glu Ile Thr Ala Arg Met Tyr Glu Leu Leu
                 20                  25                  30
Phe Ser Lys Tyr Pro Lys Thr Lys Glu Leu Phe Ala Gly Ala Ser Glu
             35                  40                  45
Glu Gln Pro Lys Lys Leu Ala Asn Ala Ile Ile Ala Tyr Ala Thr Tyr
         50                  55                  60
Ile Asp Arg Leu Glu Glu Leu Asp Asn Ala Ile Ser Thr Ile Ala Arg
 65                  70                  75                  80
Ser His Val Arg Arg Asn Val Lys Pro Glu His Tyr Pro Leu Val Lys
                     85                  90                  95
Glu Cys Leu Leu Gln Ala Ile Glu Glu Val Leu Asn Pro Gly Glu Glu
                    100                 105                 110
Val Leu Lys Ala Trp Glu Glu Ala Tyr Asp Phe Leu Ala Lys Thr Leu
                115                 120                 125
Ile Thr Leu Glu Lys Lys Leu Tyr Ser Gln Pro
            130                 135
```

<210> 4
<211> 145
<212> PRT
<213> Glycine max

<400> 4
```
Met Gly Ala Phe Thr Glu Lys Gln Glu Ala Leu Val Ser Ser Ser Phe
  1               5                  10                  15
```

Figure 4 - Continued

```
Glu Ala Phe Lys Ala Asn Ile Pro Gln Tyr Ser Val Val Phe Tyr Thr
            20                  25                  30
Ser Ile Leu Glu Lys Ala Pro Ala Ala Lys Asp Leu Phe Ser Phe Leu
        35                  40                  45
Ser Asn Gly Val Asp Pro Ser Asn Pro Lys Leu Thr Gly His Ala Glu
    50                  55                  60
Lys Leu Phe Gly Leu Val Arg Asp Ser Ala Gly Gln Leu Lys Ala Asn
65                  70                  75                  80
Gly Thr Val Val Ala Asp Ala Ala Leu Gly Ser Ile His Ala Gln Lys
                85                  90                  95
Ala Ile Thr Asp Pro Gln Phe Val Val Val Lys Glu Ala Leu Leu Lys
            100                 105                 110
Thr Ile Lys Glu Ala Val Gly Asp Lys Trp Ser Asp Glu Leu Ser Ser
        115                 120                 125
Ala Trp Glu Val Ala Tyr Asp Glu Leu Ala Ala Ala Ile Lys Lys Ala
    130                 135                 140
Phe
145

<210> 5
<211> 162
<212> PRT
<213> Hordeum vulgare

<400> 5
Met Ser Ala Ala Glu Gly Ala Val Val Phe Ser Glu Glu Lys Glu Ala
1               5                   10                  15
Leu Val Leu Lys Ser Trp Ala Ile Met Lys Lys Asp Ser Ala Asn Leu
            20                  25                  30
Gly Leu Arg Phe Phe Leu Lys Ile Phe Glu Ile Ala Pro Ser Ala Arg
        35                  40                  45
Gln Met Phe Pro Phe Leu Arg Asp Ser Asp Val Pro Leu Glu Thr Asn
    50                  55                  60
Pro Lys Leu Lys Thr His Ala Val Ser Val Phe Val Met Thr Cys Glu
65                  70                  75                  80
Ala Ala Ala Gln Leu Arg Lys Ala Gly Lys Ile Thr Val Arg Glu Thr
                85                  90                  95
Thr Leu Lys Arg Leu Gly Gly Thr His Leu Lys Tyr Gly Val Ala Asp
            100                 105                 110
Gly His Phe Glu Val Thr Arg Phe Ala Leu Leu Glu Thr Ile Lys Glu
        115                 120                 125
Ala Leu Pro Ala Asp Met Trp Gly Pro Glu Met Arg Asn Ala Trp Gly
    130                 135                 140
Glu Ala Tyr Asp Gln Leu Val Ala Ala Ile Lys Gln Glu Met Lys Pro
145                 150                 155                 160
```

Figure 4 – Continued

Ala Glu

<210> 6
<211> 1153
<212> PRT
<213> Magnaporthe oryzae

<400> 6
Met Asp Gly Ala Val Arg Leu Asp Trp Thr Gly Leu Asp Leu Thr Gly
1 5 10 15
His Glu Ile His Asp Gly Val Pro Ile Ala Ser Arg Val Gln Val Met
20 25 30
Val Ser Phe Pro Leu Phe Lys Asp Gln His Ile Ile Met Ser Ser Lys
35 40 45
Glu Ser Pro Ser Arg Lys Ser Ser Thr Ile Gly Gln Ser Thr Arg Asn
50 55 60
Gly Ser Cys Gln Ala Asp Thr Gln Lys Gly Gln Leu Pro Pro Val Gly
65 70 75 80
Glu Lys Pro Lys Pro Val Lys Glu Asn Pro Met Lys Lys Leu Lys Glu
85 90 95
Met Ser Gln Arg Pro Leu Pro Thr Gln His Gly Asp Gly Thr Tyr Pro
100 105 110
Thr Glu Lys Lys Leu Thr Gly Ile Gly Glu Asp Leu Lys His Ile Arg
115 120 125
Gly Tyr Asp Val Lys Thr Leu Leu Ala Met Val Lys Ser Lys Leu Lys
130 135 140
Gly Glu Lys Leu Lys Asp Asp Lys Thr Met Leu Met Glu Arg Val Met
145 150 155 160
Gln Leu Val Ala Arg Leu Pro Thr Glu Ser Lys Lys Arg Ala Glu Leu
165 170 175
Thr Asp Ser Leu Ile Asn Glu Leu Trp Glu Ser Leu Asp His Pro Pro
180 185 190
Leu Asn Tyr Leu Gly Pro Glu His Ser Tyr Arg Thr Pro Asp Gly Ser
195 200 205
Tyr Asn His Pro Phe Asn Pro Gln Leu Gly Ala Ala Gly Ser Arg Tyr
210 215 220
Ala Arg Ser Val Ile Pro Thr Val Thr Pro Pro Gly Ala Leu Pro Asp
225 230 235 240
Pro Gly Leu Ile Phe Asp Ser Ile Met Gly Arg Thr Pro Asn Ser Tyr
245 250 255
Arg Lys His Pro Asn Asn Val Ser Ser Ile Leu Trp Tyr Trp Ala Thr
260 265 270
Ile Ile Ile His Asp Ile Phe Trp Thr Asp Pro Arg Asp Ile Asn Thr
275 280 285

Figure 4 - Continued

```
Asn Lys Ser Ser Ser Tyr Leu Asp Leu Ala Pro Leu Tyr Gly Asn Ser
    290                 295                 300
Gln Glu Met Gln Asp Ser Ile Arg Thr Phe Lys Asp Gly Arg Met Lys
305                 310                 315                 320
Pro Asp Cys Tyr Ala Asp Lys Arg Leu Ala Gly Met Pro Pro Gly Val
                325                 330                 335
Ser Val Leu Leu Ile Met Phe Asn Arg Phe His Asn His Val Ala Glu
            340                 345                 350
Asn Leu Ala Leu Ile Asn Glu Gly Gly Arg Phe Asn Lys Pro Ser Asp
            355                 360                 365
Leu Leu Glu Gly Glu Ala Arg Glu Ala Ala Trp Lys Lys Tyr Asp Asn
    370                 375                 380
Asp Leu Phe Gln Val Ala Arg Leu Val Thr Ser Gly Leu Tyr Ile Asn
385                 390                 395                 400
Ile Thr Leu Val Asp Tyr Val Arg Asn Ile Val Asn Leu Asn Arg Val
                405                 410                 415
Asp Thr Thr Trp Thr Leu Asp Pro Arg Gln Asp Ala Gly Ala His Val
            420                 425                 430
Gly Thr Ala Asp Gly Ala Glu Arg Gly Thr Gly Asn Ala Val Ser Ala
            435                 440                 445
Glu Phe Asn Leu Cys Tyr Arg Trp His Ser Cys Ile Ser Glu Lys Asp
    450                 455                 460
Ser Lys Phe Val Glu Ala Gln Phe Gln Asn Ile Phe Gly Lys Pro Ala
465                 470                 475                 480
Ser Glu Val Arg Pro Asp Glu Met Trp Lys Gly Phe Ala Lys Met Glu
                485                 490                 495
Gln Asn Thr Pro Ala Asp Pro Gly Gln Arg Thr Phe Gly Gly Phe Lys
            500                 505                 510
Arg Gly Pro Asp Gly Lys Phe Asp Asp Asp Leu Val Arg Cys Ile
    515                 520                 525
Ser Glu Ala Val Glu Asp Val Ala Gly Ala Phe Gly Ala Arg Asn Val
    530                 535                 540
Pro Gln Ala Met Lys Val Val Glu Thr Met Gly Ile Ile Gln Gly Arg
545                 550                 555                 560
Lys Trp Asn Val Ala Gly Leu Asn Glu Phe Arg Lys His Phe His Leu
                565                 570                 575
Lys Pro Tyr Ser Thr Phe Glu Asp Ile Asn Ser Asp Pro Gly Val Ala
            580                 585                 590
Glu Ala Leu Arg Arg Leu Tyr Asp His Pro Asp Asn Val Glu Leu Tyr
    595                 600                 605
Pro Gly Leu Val Ala Glu Glu Asp Lys Gln Pro Met Val Pro Gly Val
    610                 615                 620
Gly Ile Ala Pro Thr Tyr Thr Ile Ser Arg Val Val Leu Ser Asp Ala
625                 630                 635                 640
Val Cys Leu Val Arg Gly Asp Arg Phe Tyr Thr Thr Asp Phe Thr Pro
                645                 650                 655
```

Figure 4 – Continued

```
Arg Asn Leu Thr Asn Trp Gly Tyr Lys Glu Val Asp Tyr Asp Leu Ser
            660             665             670
Val Asn His Gly Cys Val Phe Tyr Lys Leu Phe Ile Arg Ala Phe Pro
        675             680             685
Asn His Phe Lys Gln Asn Ser Val Tyr Ala His Tyr Pro Met Val Val
    690             695             700
Pro Ser Glu Asn Lys Arg Ile Leu Glu Ala Leu Gly Arg Ala Asp Leu
705             710             715                 720
Phe Asp Phe Glu Ala Pro Lys Tyr Ile Pro Pro Arg Val Asn Ile Thr
                725             730             735
Ser Tyr Gly Gly Ala Glu Tyr Ile Leu Glu Thr Gln Glu Lys Tyr Lys
            740             745             750
Val Thr Trp His Glu Gly Leu Gly Phe Leu Met Gly Glu Gly Gly Leu
            755             760             765
Lys Phe Met Leu Ser Gly Asp Asp Pro Leu His Ala Gln Gln Arg Lys
    770             775             780
Cys Met Ala Ala Gln Leu Tyr Lys Asp Gly Trp Thr Glu Ala Val Lys
785             790             795                 800
Ala Phe Tyr Ala Gly Met Met Glu Glu Leu Leu Val Ser Lys Ser Tyr
            805             810             815
Phe Leu Gly Asn Asn Lys His Arg His Val Asp Ile Ile Arg Asp Val
            820             825             830
Gly Asn Met Val His Val His Phe Ala Ser Gln Val Phe Gly Leu Pro
        835             840             845
Leu Lys Thr Ala Lys Asn Pro Thr Gly Val Phe Thr Glu Gln Glu Met
    850             855             860
Tyr Gly Ile Leu Ala Ala Ile Phe Thr Thr Ile Phe Phe Asp Leu Asp
865             870             875                 880
Pro Ser Lys Ser Phe Pro Leu Arg Thr Lys Thr Arg Glu Val Cys Gln
            885             890             895
Lys Leu Ala Lys Leu Val Glu Ala Asn Val Lys Leu Ile Asn Lys Ile
            900             905             910
Pro Trp Ser Arg Gly Met Phe Val Gly Lys Pro Ala Lys Asp Glu Pro
            915             920             925
Leu Ser Ile Tyr Gly Lys Thr Met Ile Lys Gly Leu Lys Ala His Gly
        930             935             940
Leu Ser Asp Tyr Asp Ile Ala Trp Ser His Val Val Pro Thr Ser Gly
945             950             955                 960
Ala Met Val Pro Asn Gln Ala Gln Val Phe Ala Gln Ala Val Asp Tyr
                965             970             975
Tyr Leu Ser Pro Ala Gly Met His Tyr Ile Pro Glu Ile His Met Val
            980             985             990
Ala Leu Gln Pro Ser Thr Pro Glu Thr Asp Ala Leu Leu Leu Gly Tyr
        995             1000            1005
Ala Met Glu Gly Ile Arg Leu Ala Gly Thr Phe Gly Ser Tyr Arg Glu
    1010            1015            1020
```

Figure 4 - Continued

```
Ala Ala Val Asp Asp Val Val Lys Glu Asp Asn Gly Arg Gln Val Pro
1025                1030                1035                1040
Val Lys Ala Gly Asp Arg Val Phe Val Ser Phe Val Asp Ala Ala Arg
                1045                1050                1055
Asp Pro Lys His Phe Pro Asp Pro Glu Val Val Asn Pro Arg Arg Pro
                1060                1065                1070
Ala Lys Lys Tyr Ile His Tyr Gly Val Gly Pro His Ala Cys Leu Gly
            1075                1080                1085
Arg Asp Ala Ser Gln Ile Ala Ile Thr Glu Met Phe Arg Cys Leu Phe
        1090                1095                1100
Arg Arg Arg Asn Val Arg Arg Val Pro Gly Pro Gln Gly Glu Leu Lys
1105                1110                1115                1120
Lys Val Pro Arg Pro Gly Gly Phe Tyr Val Tyr Met Arg Glu Asp Trp
                1125                1130                1135
Gly Gly Leu Phe Pro Phe Pro Val Thr Met Arg Val Met Trp Asp Asp
                1140                1145                1150
Glu
```

<210> 7
<211> 530
<212> PRT
<213> Fusarium oxysporum

<400> 7
```
Met Lys Gly Ser Ala Thr Leu Ala Phe Ala Leu Val Gln Phe Ser Ala
1               5                   10                  15
Ala Ser Gln Leu Val Trp Pro Ser Lys Trp Asp Glu Val Glu Asp Leu
                20                  25                  30
Leu Tyr Met Gln Gly Gly Phe Asn Lys Arg Gly Phe Ala Asp Ala Leu
                35                  40                  45
Arg Thr Cys Glu Phe Gly Ser Asn Val Pro Gly Thr Gln Asn Thr Ala
        50                  55                  60
Glu Trp Leu Arg Thr Ala Phe His Asp Ala Ile Thr His Asp Ala Lys
65                  70                  75                  80
Ala Gly Thr Gly Gly Leu Asp Ala Ser Ile Tyr Trp Glu Ser Ser Arg
                85                  90                  95
Pro Glu Asn Pro Gly Lys Ala Phe Asn Asn Thr Phe Gly Phe Phe Ser
                100                 105                 110
Gly Phe His Asn Pro Arg Ala Thr Ala Ser Asp Leu Thr Ala Leu Gly
                115                 120                 125
Thr Val Leu Ala Val Gly Ala Cys Asn Gly Pro Arg Ile Pro Phe Arg
            130                 135                 140
Ala Gly Arg Ile Asp Ala Tyr Lys Ala Gly Pro Ala Gly Val Pro Glu
145                 150                 155                 160
```

Figure 4 - Continued

```
Pro Ser Thr Asn Leu Lys Asp Thr Phe Ala Ala Phe Thr Lys Ala Gly
                165                 170                 175
Phe Thr Lys Glu Glu Met Thr Ala Met Val Ala Cys Gly His Ala Ile
                180                 185                 190
Gly Gly Val His Ser Val Asp Phe Pro Glu Ile Val Gly Ile Lys Ala
                195                 200                 205
Asp Pro Asn Asn Asp Thr Asn Val Pro Phe Gln Lys Asp Val Ser Ser
    210                 215                 220
Phe His Asn Gly Ile Val Thr Glu Tyr Leu Ala Gly Thr Ser Lys Asn
225                 230                 235                 240
Pro Leu Val Ala Ser Lys Asn Ala Thr Phe His Ser Asp Lys Arg Ile
                245                 250                 255
Phe Asp Asn Asp Lys Ala Thr Met Lys Lys Leu Ser Thr Lys Ala Gly
                260                 265                 270
Phe Asn Ser Met Cys Ala Asp Ile Leu Thr Arg Met Ile Asp Thr Val
                275                 280                 285
Pro Lys Ser Val Gln Leu Thr Pro Val Leu Glu Ala Tyr Asp Val Arg
    290                 295                 300
Pro Tyr Ile Thr Glu Leu Ser Leu Asn Asn Lys Asn Lys Ile His Phe
305                 310                 315                 320
Thr Gly Ser Val Arg Val Arg Ile Thr Asn Asn Ile Arg Asp Asn Asn
                325                 330                 335
Asp Leu Ala Ile Asn Leu Ile Tyr Val Gly Arg Asp Gly Lys Lys Val
                340                 345                 350
Thr Val Pro Thr Gln Gln Val Thr Phe Gln Gly Gly Thr Ser Phe Gly
                355                 360                 365
Ala Gly Glu Val Phe Ala Asn Phe Glu Phe Asp Thr Thr Met Asp Ala
    370                 375                 380
Lys Asn Gly Ile Thr Lys Phe Phe Ile Gln Glu Val Lys Pro Ser Thr
385                 390                 395                 400
Lys Ala Thr Val Thr His Asp Asn Gln Lys Thr Gly Gly Tyr Lys Val
                405                 410                 415
Asp Asp Thr Val Leu Tyr Gln Leu Gln Gln Ser Cys Ala Val Leu Glu
                420                 425                 430
Lys Leu Pro Asn Ala Pro Leu Val Val Thr Ala Met Val Arg Asp Ala
                435                 440                 445
Arg Ala Lys Asp Ala Leu Thr Leu Arg Val Ala His Lys Lys Pro Val
    450                 455                 460
Lys Gly Ser Ile Val Pro Arg Phe Gln Thr Ala Ile Thr Asn Phe Lys
465                 470                 475                 480
Ala Thr Gly Lys Lys Ser Ser Gly Tyr Thr Gly Phe Gln Ala Lys Thr
                485                 490                 495
Met Phe Glu Glu Gln Ser Thr Tyr Phe Asp Ile Val Leu Gly Gly Ser
                500                 505                 510
Pro Ala Ser Gly Val Gln Phe Leu Thr Ser Gln Ala Met Pro Ser Gln
                515                 520                 525
```

Figure 4 - Continued

Cys Ser
    530

<210> 8
<211> 358
<212> PRT
<213> Fusarium graminearum

<400> 8
Met Ala Ser Ala Thr Arg Gln Phe Ala Arg Ala Ala Thr Arg Ala Thr
 1               5                  10                  15
Arg Asn Gly Phe Ala Ile Ala Pro Arg Gln Val Ile Arg Gln Gln Gly
             20                  25                  30
Arg Arg Tyr Tyr Ser Ser Glu Pro Ala Gln Lys Ser Ser Ser Ala Trp
         35                  40                  45
Ile Trp Leu Thr Gly Ala Ala Val Ala Gly Gly Ala Gly Tyr Tyr Phe
     50                  55                  60
Tyr Gly Asn Ser Ala Ser Ser Ala Thr Ala Lys Val Phe Asn Pro Ser
65                  70                  75                  80
Lys Glu Asp Tyr Gln Lys Val Tyr Asn Glu Ile Ala Ala Arg Leu Glu
                 85                  90                  95
Glu Lys Asp Asp Tyr Asp Asp Gly Ser Tyr Gly Pro Val Leu Val Arg
            100                 105                 110
Leu Ala Trp His Ala Ser Gly Thr Tyr Asp Lys Glu Thr Gly Thr Gly
            115                 120                 125
Gly Ser Asn Gly Ala Thr Met Arg Phe Ala Pro Glu Ser Asp His Gly
        130                 135                 140
Ala Asn Ala Gly Leu Ala Ala Arg Asp Phe Leu Gln Pro Val Lys
145                 150                 155                 160
Glu Lys Phe Pro Trp Ile Thr Tyr Ser Asp Leu Trp Ile Leu Ala Gly
                165                 170                 175
Val Cys Ala Ile Gln Glu Met Leu Gly Pro Ala Ile Pro Tyr Arg Pro
            180                 185                 190
Gly Arg Ser Asp Arg Asp Val Ser Gly Cys Thr Pro Asp Gly Arg Leu
        195                 200                 205
Pro Asp Ala Ser Lys Arg Gln Asp His Leu Arg Gly Ile Phe Gly Arg
    210                 215                 220
Met Gly Phe Asn Asp Gln Glu Ile Val Ala Leu Ser Gly Ala His Ala
225                 230                 235                 240
Leu Gly Arg Cys His Thr Asp Arg Ser Gly Tyr Ser Gly Pro Trp Thr
                245                 250                 255
Phe Ser Pro Thr Val Leu Thr Asn Asp Tyr Phe Arg Leu Leu Val Glu
            260                 265                 270
Glu Lys Trp Gln Trp Lys Lys Trp Asn Gly Pro Ala Gln Tyr Glu Asp
        275                 280                 285

Figure 4 - Continued

```
Lys Ser Thr Lys Ser Leu Met Met Leu Pro Ser Asp Ile Ala Leu Ile
        290             295             300
Glu Asp Lys Lys Phe Lys Pro Trp Val Glu Lys Tyr Ala Lys Asp Asn
305             310             315                         320
Asp Ala Phe Phe Lys Asp Phe Ser Asn Val Val Leu Arg Leu Phe Glu
                325             330                 335
Leu Gly Val Pro Phe Ala Gln Gly Thr Glu Asn Gln Arg Trp Thr Phe
            340             345             350
Lys Pro Thr His Gln Glu
        355

<210> 9
<211> 122
<212> PRT
<213> Chlamydomonas eugametos

<400> 9
Met Ser Leu Phe Ala Lys Leu Gly Gly Arg Glu Ala Val Glu Ala Ala
1               5               10              15
Val Asp Lys Phe Tyr Asn Lys Ile Val Ala Asp Pro Thr Val Ser Thr
            20              25              30
Tyr Phe Ser Asn Thr Asp Met Lys Val Gln Arg Ser Lys Gln Phe Ala
        35              40              45
Phe Leu Ala Tyr Ala Leu Gly Gly Ala Ser Glu Trp Lys Gly Lys Asp
    50              55              60
Met Arg Thr Ala His Lys Asp Leu Val Pro His Leu Ser Asp Val His
65              70              75                          80
Phe Gln Ala Val Ala Arg His Leu Ser Asp Thr Leu Thr Glu Leu Gly
                85              90              95
Val Pro Pro Glu Asp Ile Thr Asp Ala Met Ala Val Val Ala Ser Thr
            100             105             110
Arg Thr Glu Val Leu Asn Met Pro Gln Gln
        115             120

<210> 10
<211> 121
<212> PRT
<213> Tetrahymena pyriformis

<400> 10
Met Asn Lys Pro Gln Thr Ile Tyr Glu Lys Leu Gly Gly Glu Asn Ala
1               5               10              15
Met Lys Ala Ala Val Pro Leu Phe Tyr Lys Lys Val Leu Ala Asp Glu
            20              25              30
```

Figure 4 - Continued

```
Arg Val Lys His Phe Phe Lys Asn Thr Asp Met Asp His Gln Thr Lys
            35                  40                  45
Gln Gln Thr Asp Phe Leu Thr Met Leu Leu Gly Gly Pro Asn His Tyr
        50                  55                  60
Lys Gly Lys Asn Met Thr Glu Ala His Lys Gly Met Asn Leu Gln Asn
65                  70                  75                  80
Leu His Phe Asp Ala Ile Ile Glu Asn Leu Ala Ala Thr Leu Lys Glu
                85                  90                  95
Leu Gly Val Thr Asp Ala Val Ile Asn Glu Ala Ala Lys Val Ile Glu
            100                 105                 110
His Thr Arg Lys Asp Met Leu Gly Lys
            115                 120

<210> 11
<211> 117
<212> PRT
<213> Paramecium caudatum

<400> 11
Met Ser Leu Phe Glu Gln Leu Gly Gly Gln Ala Ala Val Gln Ala Val
  1               5                  10                  15
Thr Ala Gln Phe Tyr Ala Asn Ile Gln Ala Asp Ala Thr Val Ala Thr
            20                  25                  30
Phe Phe Asn Gly Ile Asp Met Pro Asn Gln Thr Asn Lys Thr Ala Ala
            35                  40                  45
Phe Leu Cys Ala Ala Leu Gly Gly Pro Asn Ala Trp Thr Gly Arg Asn
        50                  55                  60
Leu Lys Glu Val His Ala Asn Met Gly Val Ser Asn Ala Gln Phe Thr
65                  70                  75                  80
Thr Val Ile Gly His Leu Arg Ser Ala Leu Thr Gly Ala Gly Val Ala
                85                  90                  95
Ala Ala Leu Val Glu Gln Thr Val Ala Val Ala Glu Thr Val Arg Gly
            100                 105                 110
Asp Val Val Thr Val
            115

<210> 12
<211> 147
<212> PRT
<213> Aspergillus niger

<400> 12
Met Pro Leu Thr Pro Glu Gln Ile Lys Ile Lys Ala Thr Val Pro
  1               5                  10                  15
```

Figure 4 - Continued

```
Val Leu Gln Glu Tyr Gly Thr Lys Ile Thr Thr Ala Phe Tyr Met Asn
             20                  25                  30
Met Ser Thr Val His Pro Glu Leu Asn Ala Val Phe Asn Thr Ala Asn
             35                  40                  45
Gln Val Lys Gly His Gln Ala Arg Ala Leu Ala Gly Ala Leu Phe Ala
             50                  55                  60
Tyr Ala Ser His Ile Asp Asp Leu Gly Ala Leu Gly Pro Ala Val Glu
65                   70                  75                  80
Leu Ile Cys Asn Lys His Ala Ser Leu Tyr Ile Gln Ala Asp Glu Tyr
                 85                  90                  95
Lys Ile Val Gly Lys Tyr Leu Leu Glu Ala Met Lys Glu Val Leu Gly
             100                 105                 110
Asp Ala Cys Thr Asp Asp Ile Leu Asp Ala Trp Gly Ala Ala Tyr Trp
             115                 120                 125
Ala Leu Ala Asp Ile Met Ile Asn Arg Glu Ala Ala Leu Tyr Lys Gln
             130                 135                 140
Ser Gln Gly
145
```

<210> 13
<211> 165
<212> PRT
<213> Zea mays

<400> 13
```
Met Ala Leu Ala Glu Ala Asp Asp Gly Ala Val Val Phe Gly Glu Glu
  1               5                  10                  15
Gln Glu Ala Leu Val Leu Lys Ser Trp Ala Val Met Lys Lys Asp Ala
             20                  25                  30
Ala Asn Leu Gly Leu Arg Phe Phe Leu Lys Val Phe Glu Ile Ala Pro
             35                  40                  45
Ser Ala Glu Gln Met Phe Ser Phe Leu Arg Asp Ser Asp Val Pro Leu
             50                  55                  60
Glu Lys Asn Pro Lys Leu Lys Thr His Ala Met Ser Val Phe Val Met
65                   70                  75                  80
Thr Cys Glu Ala Ala Ala Gln Leu Arg Lys Ala Gly Lys Val Thr Val
                 85                  90                  95
Arg Glu Thr Thr Leu Lys Arg Leu Gly Ala Thr His Leu Arg Tyr Gly
             100                 105                 110
Val Ala Asp Gly His Phe Glu Val Thr Gly Phe Ala Leu Leu Glu Thr
             115                 120                 125
Ile Lys Glu Ala Leu Pro Ala Asp Met Trp Ser Leu Glu Met Lys Lys
             130                 135                 140
Ala Trp Ala Glu Ala Tyr Ser Gln Leu Val Ala Ala Ile Lys Arg Glu
145                 150                 155                 160
```

Figure 4 - Continued

```
Met Lys Pro Asp Ala
                165

<210> 14
<211> 169
<212> PRT
<213> Oryza sativa subsp. japonica

<400> 14
Met Ala Leu Val Glu Gly Asn Asn Gly Val Ser Gly Gly Ala Val Ser
  1               5                  10                  15
Phe Ser Glu Glu Gln Glu Ala Leu Val Leu Lys Ser Trp Ala Ile Met
                 20                  25                  30
Lys Lys Asp Ser Ala Asn Ile Gly Leu Arg Phe Phe Leu Lys Ile Phe
                 35                  40                  45
Glu Val Ala Pro Ser Ala Ser Gln Met Phe Ser Phe Leu Arg Asn Ser
                 50                  55                  60
Asp Val Pro Leu Glu Lys Asn Pro Lys Leu Lys Thr His Ala Met Ser
 65                  70                  75                  80
Val Phe Val Met Thr Cys Glu Ala Ala Gln Leu Arg Lys Ala Gly
                 85                  90                  95
Lys Val Thr Val Arg Asp Thr Thr Leu Lys Arg Leu Gly Ala Thr His
                100                 105                 110
Phe Lys Tyr Gly Val Gly Asp Ala His Phe Glu Val Thr Arg Phe Ala
                115                 120                 125
Leu Leu Glu Thr Ile Lys Glu Ala Val Pro Val Asp Met Trp Ser Pro
                130                 135                 140
Ala Met Lys Ser Ala Trp Ser Glu Ala Tyr Asn Gln Leu Val Ala Ala
145                 150                 155                 160
Ile Lys Gln Glu Met Lys Pro Ala Glu
                165

<210> 15
<211> 160
<212> PRT
<213> Arabidopsis thaliana

<400> 15
Met Glu Ser Glu Gly Lys Ile Val Phe Thr Glu Glu Gln Glu Ala Leu
  1               5                  10                  15
Val Val Lys Ser Trp Ser Val Met Lys Lys Asn Ser Ala Glu Leu Gly
                 20                  25                  30
Leu Lys Leu Phe Ile Lys Ile Phe Glu Ile Ala Pro Thr Thr Lys Lys
                 35                  40                  45
```

Figure 4 - Continued

```
Met Phe Ser Phe Leu Arg Asp Ser Pro Ile Pro Ala Glu Gln Asn Pro
    50                  55                  60
Lys Leu Lys Pro His Ala Met Ser Val Phe Val Met Cys Cys Glu Ser
65                  70                  75                  80
Ala Val Gln Leu Arg Lys Thr Gly Lys Val Thr Val Arg Glu Thr Thr
                85                  90                  95
Leu Lys Arg Leu Gly Ala Ser His Ser Lys Tyr Gly Val Val Asp Glu
            100                 105                 110
His Phe Glu Val Ala Lys Tyr Ala Leu Leu Glu Thr Ile Lys Glu Ala
        115                 120                 125
Val Pro Glu Met Trp Ser Pro Glu Met Lys Val Ala Trp Gly Gln Ala
    130                 135                 140
Tyr Asp His Leu Val Ala Ala Ile Lys Ala Glu Met Asn Leu Ser Asn
145                 150                 155                 160

<210> 16
<211> 147
<212> PRT
<213> Pisum sativum

<400> 16
Met Gly Phe Thr Asp Lys Gln Glu Ala Leu Val Asn Ser Ser Trp Glu
 1               5                  10                  15
Ser Phe Lys Gln Asn Leu Ser Gly Asn Ser Ile Leu Phe Tyr Thr Ile
                20                  25                  30
Ile Leu Glu Lys Ala Pro Ala Ala Lys Gly Leu Phe Ser Phe Leu Lys
            35                  40                  45
Asp Thr Ala Gly Val Glu Asp Ser Pro Lys Leu Gln Ala His Ala Glu
        50                  55                  60
Gln Val Phe Gly Leu Val Arg Asp Ser Ala Ala Gln Leu Arg Thr Lys
65                  70                  75                  80
Gly Glu Val Val Leu Gly Asn Ala Thr Leu Gly Ala Ile His Val Gln
                85                  90                  95
Arg Gly Val Thr Asp Pro His Phe Val Val Val Lys Glu Ala Leu Leu
            100                 105                 110
Gln Thr Ile Lys Lys Ala Ser Gly Asn Asn Trp Ser Glu Glu Leu Asn
        115                 120                 125
Thr Ala Trp Glu Val Ala Tyr Asp Gly Leu Ala Thr Ala Ile Lys Lys
    130                 135                 140
Ala Met Thr
145
```

Figure 4 - Continued

```
<210> 17
<211> 145
<212> PRT
<213> Vigna unguiculata

<400> 17
Met Val Ala Phe Ser Asp Lys Gln Glu Ala Leu Val Asn Gly Ala Tyr
  1               5                  10                  15
Glu Ala Phe Lys Ala Asn Ile Pro Lys Tyr Ser Val Val Phe Tyr Thr
                 20                  25                  30
Thr Ile Leu Glu Lys Ala Pro Ala Ala Lys Asn Leu Phe Ser Phe Leu
                 35                  40                  45
Ala Asn Gly Val Asp Ala Thr Asn Pro Lys Leu Thr Gly His Ala Glu
             50                  55                  60
Lys Leu Phe Gly Leu Val Arg Asp Ser Ala Ala Gln Leu Arg Ala Ser
 65                  70                  75                  80
Gly Gly Val Val Ala Asp Ala Ala Leu Gly Ala Val His Ser Gln Lys
                 85                  90                  95
Ala Val Asn Asp Ala Gln Phe Val Val Val Lys Glu Ala Leu Val Lys
                100                 105                 110
Thr Leu Lys Glu Ala Val Gly Asp Lys Trp Ser Asp Glu Leu Gly Thr
                115                 120                 125
Ala Val Glu Leu Ala Tyr Asp Glu Leu Ala Ala Ile Lys Lys Ala
            130                 135                 140
Tyr
145

<210> 18
<211> 154
<212> PRT
<213> Bos taurus

<400> 18
Met Gly Leu Ser Asp Gly Glu Trp Gln Leu Val Leu Asn Ala Trp Gly
  1               5                  10                  15
Lys Val Glu Ala Asp Val Ala Gly His Gly Gln Glu Val Leu Ile Arg
                 20                  25                  30
Leu Phe Thr Gly His Pro Glu Thr Leu Glu Lys Phe Asp Lys Phe Lys
                 35                  40                  45
His Leu Lys Thr Glu Ala Glu Met Lys Ala Ser Glu Asp Leu Lys Lys
             50                  55                  60
His Gly Asn Thr Val Leu Thr Ala Leu Gly Gly Ile Leu Lys Lys Lys
 65                  70                  75                  80
Gly His His Glu Ala Glu Val Lys His Leu Ala Glu Ser His Ala Asn
                 85                  90                  95
```

Figure 4 - Continued

```
Lys His Lys Ile Pro Val Lys Tyr Leu Glu Phe Ile Ser Asp Ala Ile
            100                 105                 110
Ile His Val Leu His Ala Lys His Pro Ser Asp Phe Gly Ala Asp Ala
        115                 120                 125
Gln Ala Ala Met Ser Lys Ala Leu Glu Leu Phe Arg Asn Asp Met Ala
    130                 135                 140
Ala Gln Tyr Lys Val Leu Gly Phe His Gly
145                 150

<210> 19
<211> 154
<212> PRT
<213> Sus scrofa

<400> 19
Met Gly Leu Ser Asp Gly Glu Trp Gln Leu Val Leu Asn Val Trp Gly
  1               5                  10                  15
Lys Val Glu Ala Asp Val Ala Gly His Gly Gln Glu Val Leu Ile Arg
            20                  25                  30
Leu Phe Lys Gly His Pro Glu Thr Leu Glu Lys Phe Asp Lys Phe Lys
        35                  40                  45
His Leu Lys Ser Glu Asp Glu Met Lys Ala Ser Glu Asp Leu Lys Lys
    50                  55                  60
His Gly Asn Thr Val Leu Thr Ala Leu Gly Gly Ile Leu Lys Lys Lys
65                  70                  75                  80
Gly His His Glu Ala Glu Leu Thr Pro Leu Ala Gln Ser His Ala Thr
                85                  90                  95
Lys His Lys Ile Pro Val Lys Tyr Leu Glu Phe Ile Ser Glu Ala Ile
            100                 105                 110
Ile Gln Val Leu Gln Ser Lys His Pro Gly Asp Phe Gly Ala Asp Ala
        115                 120                 125
Gln Gly Ala Met Ser Lys Ala Leu Glu Leu Phe Arg Asn Asp Met Ala
    130                 135                 140
Ala Lys Tyr Lys Glu Leu Gly Phe Gln Gly
145                 150

<210> 20
<211> 154
<212> PRT
<213> Equus caballus

<400> 20
Met Gly Leu Ser Asp Gly Glu Trp Gln Gln Val Leu Asn Val Trp Gly
  1               5                  10                  15
```

Figure 4 - Continued

```
Lys Val Glu Ala Asp Ile Ala Gly His Gly Gln Glu Val Leu Ile Arg
            20                  25                  30
Leu Phe Thr Gly His Pro Glu Thr Leu Glu Lys Phe Asp Lys Phe Lys
        35                  40                  45
His Leu Lys Thr Glu Ala Glu Met Lys Ala Ser Glu Asp Leu Lys Lys
    50                  55                  60
His Gly Thr Val Val Leu Thr Ala Leu Gly Gly Ile Leu Lys Lys Lys
65                  70                  75                  80
Gly His His Glu Ala Glu Leu Lys Pro Leu Ala Gln Ser His Ala Thr
                85                  90                  95
Lys His Lys Ile Pro Ile Lys Tyr Leu Glu Phe Ile Ser Asp Ala Ile
            100                 105                 110
Ile His Val Leu His Ser Lys His Pro Gly Asp Phe Gly Ala Asp Ala
        115                 120                 125
Gln Gly Ala Met Thr Lys Ala Leu Glu Leu Phe Arg Asn Asp Ile Ala
    130                 135                 140
Ala Lys Tyr Lys Glu Leu Gly Phe Gln Gly
145                 150
```

<210> 21
<211> 152
<212> PRT
<213> Nicotiana benthamiana

<400> 21
```
Met Ser Ser Phe Thr Glu Glu Gln Glu Ala Leu Val Val Lys Ser Trp
1               5                   10                  15
Asp Ser Met Lys Lys Asn Ala Gly Glu Trp Gly Leu Lys Leu Phe Leu
            20                  25                  30
Lys Ile Phe Glu Ile Ala Pro Ser Ala Lys Lys Leu Phe Ser Phe Leu
        35                  40                  45
Lys Asp Ser Asn Val Pro Leu Glu Gln Asn Ala Lys Leu Lys Pro His
    50                  55                  60
Ser Lys Ser Val Phe Val Met Thr Cys Glu Ala Ala Val Gln Leu Arg
65                  70                  75                  80
Lys Ala Gly Lys Val Val Val Arg Asp Ser Thr Leu Lys Lys Leu Gly
                85                  90                  95
Ala Thr His Phe Lys Tyr Gly Val Ala Asp Glu His Phe Glu Val Thr
            100                 105                 110
Lys Phe Ala Leu Leu Glu Thr Ile Lys Glu Ala Val Pro Glu Met Trp
        115                 120                 125
Ser Val Asp Met Lys Asn Ala Trp Gly Glu Ala Phe Asp Gln Leu Val
    130                 135                 140
Asn Ala Ile Lys Thr Glu Met Lys
145                 150
```

Figure 4 - Continued

```
<210> 22
<211> 132
<212> PRT
<213> Bacillus subtilis

<400> 22
Met Gly Gln Ser Phe Asn Ala Pro Tyr Glu Ala Ile Gly Glu Glu Leu
 1               5                  10                  15
Leu Ser Gln Leu Val Asp Thr Phe Tyr Glu Arg Val Ala Ser His Pro
                20                  25                  30
Leu Leu Lys Pro Ile Phe Pro Ser Asp Leu Thr Glu Thr Ala Arg Lys
            35                  40                  45
Gln Lys Gln Phe Leu Thr Gln Tyr Leu Gly Gly Pro Pro Leu Tyr Thr
        50                  55                  60
Glu Glu His Gly His Pro Met Leu Arg Ala Arg His Leu Pro Phe Pro
65                  70                  75                  80
Ile Thr Asn Glu Arg Ala Asp Ala Trp Leu Ser Cys Met Lys Asp Ala
                85                  90                  95
Met Asp His Val Gly Leu Glu Gly Glu Ile Arg Glu Phe Leu Phe Gly
               100                 105                 110
Arg Leu Glu Leu Thr Ala Arg His Met Val Asn Gln Thr Glu Ala Glu
           115                 120                 125
Asp Arg Ser Ser
       130

<210> 23
<211> 131
<212> PRT
<213> Corynebacterium glutamicum

<400> 23
Met Thr Thr Ser Glu Asn Phe Tyr Asp Ser Val Gly Gly Glu Glu Thr
 1               5                  10                  15
Phe Ser Leu Ile Val His Arg Phe Tyr Glu Gln Val Pro Asn Asp Asp
                20                  25                  30
Ile Leu Gly Pro Met Tyr Pro Pro Asp Asp Phe Glu Gly Ala Glu Gln
            35                  40                  45
Arg Leu Lys Met Phe Leu Ser Gln Tyr Trp Gly Gly Pro Lys Asp Tyr
        50                  55                  60
Gln Glu Gln Arg Gly His Pro Arg Leu Arg Met Arg His Val Asn Tyr
65                  70                  75                  80
Pro Ile Gly Val Thr Ala Ala Glu Arg Trp Leu Gln Leu Met Ser Asn
                85                  90                  95
Ala Leu Asp Gly Val Asp Leu Thr Ala Glu Gln Arg Glu Ala Ile Trp
               100                 105                 110
```

Figure 4 - Continued

```
Glu His Met Val Arg Ala Ala Asp Met Leu Ile Asn Ser Asn Pro Asp
            115                 120                 125
Pro His Ala
    130

<210> 24
<211> 124
<212> PRT
<213> Synechocystis sp.

<400> 24
Met Ser Thr Leu Tyr Glu Lys Leu Gly Gly Thr Thr Ala Val Asp Leu
 1               5                  10                  15
Ala Val Asp Lys Phe Tyr Glu Arg Val Leu Gln Asp Asp Arg Ile Lys
            20                  25                  30
His Phe Phe Ala Asp Val Asp Met Ala Lys Gln Arg Ala His Gln Lys
         35                  40                  45
Ala Phe Leu Thr Tyr Ala Phe Gly Gly Thr Asp Lys Tyr Asp Gly Arg
     50                  55                  60
Tyr Met Arg Glu Ala His Lys Glu Leu Val Glu Asn His Gly Leu Asn
 65                  70                  75                  80
Gly Glu His Phe Asp Ala Val Ala Glu Asp Leu Leu Ala Thr Leu Lys
                 85                  90                  95
Glu Met Gly Val Pro Glu Asp Leu Ile Ala Glu Val Ala Ala Val Ala
            100                 105                 110
Gly Ala Pro Ala His Lys Arg Asp Val Leu Asn Gln
            115                 120

<210> 25
<211> 183
<212> PRT
<213> Synechococcus sp.

<400> 25
Met Asp Val Ala Leu Leu Glu Lys Ser Phe Glu Gln Ile Ser Pro Arg
 1               5                  10                  15
Ala Ile Glu Phe Ser Ala Ser Phe Tyr Gln Asn Leu Phe His His His
            20                  25                  30
Pro Glu Leu Lys Pro Leu Phe Ala Glu Thr Ser Gln Thr Ile Gln Glu
         35                  40                  45
Lys Lys Leu Ile Phe Ser Leu Ala Ala Ile Ile Glu Asn Leu Arg Asn
     50                  55                  60
Pro Asp Ile Leu Gln Pro Ala Leu Lys Ser Leu Gly Ala Arg His Ala
 65                  70                  75                  80
```

Figure 4 - Continued

```
Glu Val Gly Thr Ile Lys Ser His Tyr Pro Leu Val Gly Gln Ala Leu
                85                  90                  95
Ile Glu Thr Phe Ala Glu Tyr Leu Ala Ala Asp Trp Thr Glu Gln Leu
                100                 105                 110
Ala Thr Ala Trp Val Glu Ala Tyr Asp Val Ile Ala Ser Thr Met Ile
                115                 120                 125
Glu Gly Ala Asp Asn Pro Ala Ala Tyr Leu Glu Pro Glu Leu Thr Phe
                130                 135                 140
Tyr Glu Trp Leu Asp Leu Tyr Gly Glu Glu Ser Pro Lys Val Arg Asn
145                 150                 155                 160
Ala Ile Ala Thr Leu Thr His Phe His Tyr Gly Glu Asp Pro Gln Asp
                165                 170                 175
Val Gln Arg Asp Ser Arg Gly
                180
```

<210> 26
<211> 118
<212> PRT
<213> Nostoc commune

<400> 26
```
Met Ser Thr Leu Tyr Asp Asn Ile Gly Gly Gln Pro Ala Ile Glu Gln
 1               5                  10                  15
Val Val Asp Glu Leu His Lys Arg Ile Ala Thr Asp Ser Leu Leu Ala
                20                  25                  30
Pro Val Phe Ala Gly Thr Asp Met Val Lys Gln Arg Asn His Leu Val
                35                  40                  45
Ala Phe Leu Ala Gln Ile Phe Glu Gly Pro Lys Gln Tyr Gly Gly Arg
        50                  55                  60
Pro Met Asp Lys Thr His Ala Gly Leu Asn Leu Gln Gln Pro His Phe
65                  70                  75                  80
Asp Ala Ile Ala Lys His Leu Gly Glu Arg Met Ala Val Arg Gly Val
                85                  90                  95
Ser Ala Glu Asn Thr Lys Ala Ala Leu Asp Arg Val Thr Asn Met Lys
                100                 105                 110
Gly Ala Ile Leu Asn Lys
                115
```

<210> 27
<211> 136
<212> PRT
<213> Bacillus megaterium

```
Met Arg Glu Lys Ile His Ser Pro Tyr Glu Leu Leu Gly Gly His
 1               5                  10                  15
Thr Ile Ser Lys Leu Val Asp Ala Phe Tyr Thr Arg Val Gly Gln His
            20                  25                  30
Pro Glu Leu Ala Pro Ile Phe Pro Asp Asn Leu Thr Glu Thr Ala Arg
            35                  40                  45
Lys Gln Lys Gln Phe Leu Thr Gln Tyr Leu Gly Gly Pro Ser Leu Tyr
    50                  55                  60
Thr Glu Glu His Gly His Pro Met Leu Arg Ala Arg His Leu Pro Phe
65                  70                  75                  80
Glu Ile Thr Pro Ser Arg Ala Lys Ala Trp Leu Thr Cys Met His Glu
                85                  90                  95
Ala Met Asp Glu Ile Asn Leu Glu Gly Pro Glu Arg Asp Glu Leu Tyr
            100                 105                 110
His Arg Leu Ile Leu Thr Ala Gln His Met Ile Asn Ser Pro Glu Gln
            115                 120                 125
Thr Asp Glu Lys Gly Phe Ser His
    130                 135
```

Figure 6

SEQ ID NO: 28

```
atggagtttg tcgcccgtca gtccatgaat gcctgtccct ttgtcaggtc aacttctacc      60
caccatttga agaagttggc agcaaacagt tctctagctg ctactgctag tcattgtccc     120
gtggttggcc ctgctctcca acagcagaga tactactctc aaccttccaa gccagcccaa     180
gcccaaacct ccgacattgc tactgggatc aagaaggatg tttctccgat ccgtatggac     240
tctaatgaaa ccgcctttga ttacaatgga atgtatgagt ctgatcttgc gaataaacgt     300
aaagataact cgtatcgtta tttcaataac atcaaccgtc tagccaagga gtttcccaag     360
gcacatcgcc agaccgaaga tgacaaggtg accgtctggt gctctaacga ctacttagga     420
atgggtaggc atcctgagat tatcaaaacc atgaaggcta ccatggacaa gtacggttcc     480
ggagcaggag gaactaggaa cattgcaggt cataaccacg ccgctatcaa tttggaaagc     540
gagttggctt gcttgaacaa gaaggaagcg gctctggtgt tttcatcatg tttcatagct     600
aacgatgcaa tcatctcgtt gttgggacaa aaaatcaaaa atttggtcat tttctctgac     660
cagtcgaatc atgcttccat gatattgggt gtgcgtaact ccaaagcgaa gaagcacatc     720
ttcaagcaca acaatttgaa ggatctggag tcgcagttag ctcagtaccc caagtcgact     780
cctaaactga tcgccttcga gtcagtttac tctatgtgtg gatctgtggc tcccattgag     840
aagatttgcg atttggctaa aaggtacggt gccctcacct tcttggatga agttcatgct     900
gttggaatgt atggtcctca tggacagggt gtagctgagc atttggactt tgatctgcat     960
ttacagtctg gaatcgccag tcctagcgtg gtggacaaac gcaccatatt ggatcgtgtc    1020
gacatgatta ctggtacttg cggaaagtca tttggtactg ttggaggtta cgttgctggt    1080
agtgccaacc taattgattg gttaagatcc tatgcgccag gtttcatttt cactaccaca    1140
cttcctcctg ctatcatggc tggtacagcc acttctgttc gtattgttag gccagacatt    1200
gaggcccgta tcaagcaaca gcttaatact cgctacgtca agactcatt tgaaaacctt     1260
ggtattccag tcattccaaa cccaagtcac attgttcctg ttctagttgg aaatgctgca    1320
gatgccaaga aggcatccga tatgttaatg aacaaacacc gtatttatgt tcaagctatt    1380
aactaccta ctgtgcctgt cggtgaagaa cgactaagga ttactcctac tccaggtcat     1440
ggaaaggaga tttgtgacca gctgatcagc gctgtcgacg atgtttttac tgagcttaat    1500
ttaccaagaa tcaacaaatg gcagtcccaa ggtggtcatt gcggtgttgg tgatgctaat    1560
tacgtaccag aacccaatct gtggactcag gaccagctca gcttgacaaa ccaagacttg    1620
cactccaatg tgcacaaccc agtgattgag cagatcgaaa cctcatcagg agtcagattg    1680
tag                                                                  1683
```

SEQ ID NO: 29

```
          10         20         30         40         50
MEFVARQSMN ACPFVRSTST HHLKKLAANS SLAATASHCP VVGPALQQQR
          60         70         80         90        100
YYSQPSKPAQ AQTSDIATGI KKDVSPIRMD SNETAFDYNG MYESDLANKR
         110        120        130        140        150
KDNSYRYFNN INRLAKEFPK AHRQTEDDKV TVWCSNDYLG MGRHPEIIKT
         160        170        180        190        200
MKATMDKYGS GAGGTRNIAG HNHAAINLES ELACLNKKEA ALVFSSCFIA
         210        220        230        240        250
NDAIISLLGQ KIKNLVIFSD QSNHASMILG VRNSKAKKHI FKHNNLKDLE
         260        270        280        290        300
SQLAQYPKST PKLIAFESVY SMCGSVAPIE KICDLAKRYG ALTFLDEVHA
         310        320        330        340        350
VGMYGPHGQG VAEHLDFDLH LQSGIASPSV VDKRTILDRV DMITGTCGKS
         360        370        380        390        400
FGTVGGYVAG SANLIDWLRS YAPGFIFTTT LPPAIMAGTA TSVRIVRADI
         410        420        430        440        450
```

Figure 6 - Continued

```
EARIKQQLNT RYVKDSFENL GIPVIPNPSH IVPVLVGNAA DAKKASDMLM
       460        470        480        490        500
NKHRIYVQAI NYPTVPVGEE RLRITPTPGH GKEICDQLIS AVDDVFTELN
       510        520        530        540        550
LPRINKWQSQ GGHCGVGDAN YVPEPNLWTQ DQLSLTNQDL HSNVHNPVIE
       560
QIETSSGVRL
```

Figure 7

Sequence of an exemplary mutant ALAS gene and protein

Gene sequence (SEQ ID NO: 30):

ATGGAGTTTGTCGCCCGTCAGTCCATGAATGCCTCTCCCTTTGTCAGGTCAACTTCTACCCACC
ATTTGAAGAAGTTGGCAGCAAACAGTTCTCTAGCTGCTACTGCTAGTCATTCTCCCGTGGTTGG
CCCTGCTCTCCAACAGCAGAGATACTACTCTCAACCTTCCAAGCCAGCCCAAGCCCAAACCTCC
GACATTGCTACTGGGATCAAGAAGGATGTTTCTCCGATCCGTATGGACTCTAATGAAACCGCCT
TTGATTACAATGGAATGTATGAGTCTGATCTTGCGAATAAACGTAAAGATAACTCGTATCGTTA
TTTCAATAACATCAACCGTCTAGCCAAGGAGTTTCCCAAGGCACATCGCCAGACCGAAGATGAC
AAGGTGACCGTCTGGTGCTCTAACGACTACTTAGGAATGGGTAGGCATCCTGAGATTATCAAAA
CCATGAAGGCTACCATGGACAAGTACGGTTCCGGAGCAGGAGGAACTAGGAACATTGCAGGTCA
TAACCACGCCGCTATCAATTTGGAAAGCGAGTTGGCTTGCTTGAACAAGAAGGAAGCGGCTCTG
GTGTTTTCATCATGTTTCATAGCTAACGATGCAATCATCTCGTTGTTGGGACAAAAAATCAAAA
ATTTGGTCATTTTCTCTGACCAGTCGAATCATGCTTCCATGATATTGGGTGTGCGTAACTCCAA
AGCGAAGAAGCACATCTTCAAGCACAACAATTTGAAGGATCTGGAGTCGCAGTTAGCTCAGTAC
CCCAAGTCGACTCCTAAACTGATCGCCTTCGAGTCAGTTTACTCTATGTGTGGATCTGTGGCTC
CCATTGAGAAGATTTGCGATTTGGCTAAAAGGTACGGTGCCCTCACCTTCTTGGATGAAGTTCA
TGCTGTTGGAATGTATGGTCCTCATGGACAGGGTGTAGCTGAGCATTTGGACTTTGATCTGCAT
TTACAGTCTGGAATCGCCAGTCCTAGCGTGGTGGACAAACGCACCATATTGGATCGTGTCGACA
TGATTACTGGTACTTGCGGAAAGTCATTTGGTACTGTTGGAGGTTACGTTGCTGGTAGTGCCAA
CCTAATTGATTGGTTAAGATCCTATGCGCCAGGTTTCATTTTCACTACCACACTTCCTCCTGCT
ATCATGGCTGGTACAGCCACTTCTGTTCGTATTGTTAGGGCCGACATTGAGGCCCGTATCAAGC
AACAGCTTAATACTCGCTACGTCAAAGACTCATTTGAAAACCTTGGTATTCCAGTCATTCCAAA
CCCAAGTCACATTGTTCCTGTTCTAGTTGGAAATGCTGCAGATGCCAAGAAGGCATCCGATATG
TTAATGAACAAACACCGTATTTATGTTCAAGCTATTAACTACCCTACTGTGCCTGTCGGTGAAG
AACGACTAAGGATTACTCCTACTCCAGGTCATGGAAAGGAGATTTGTGACCAGCTGATCAGCGC
TGTCGACGATGTTTTTACTGAGCTTAATTTACCAAGAATCAACAAATGGCAGTCCCAAGGTGGT
CATTGCGGTGTTGGTGATGCTAATTACGTACCAGAACCCAATCTGTGGACTCAGGACCAGCTCA
GCTTGACAAACCAAGACTTGCACTCCAATGTGCACAACCCAGTGATTGAGCAGATCGAAACCTC
ATCAGGAGTCAGATTGTAG

Figure 7 - Continued

Mutated codons (TGT in wild-type to TCT in mutant) are indicated in bold and double underlined.

Protein sequence (SEQ ID NO: 31):

MEFVARQSMNASPFVRSTSTHHLKKLAANSSLAATASHSPVVGPALQQQRYYSQPSKPAQAQTS
DIATGIKKDVSPIRMDSNETAFDYNGMYESDLANKRKDNSYRYFNNINRLAKEFPKAHRQTEDD
KVTVWCSNDYLGMGRHPEIIKTMKATMDKYGSGAGGTRNIAGHNHAAINLESELACLNKKEAAL
VFSSCFIANDAIISLLGQKIKNLVIFSDQSNHASMILGVRNSKAKKHIFKHNNLKDLESQLAQY
PKSTPKLIAFESVYSMCGSVAPIEKICDLAKRYGALTFLDEVHAVGMYGPHGQGVAEHLDFDLH
LQSGIASPSVVDKRTILDRVDMITGTCGKSFGTVGGYVAGSANLIDWLRSYAPGFIFTTTLPPA
IMAGTATSVRIVRADIEARIKQQLNTRYVKDSFENLGIPVIPNPSHIVPVLVGNAADAKKASDM
LMNKHRIYVQAINYPTVPVGEERLRITPTPGHGKEICDQLISAVDDVFTELNLPRINKWQSQGG
HCGVGDANYVPEPNLWTQDQLSLTNQDLHSNVHNPVIEQIETSSGVRL

Length: 560 aa
Mol wt: 61.5 kDa

Two cysteine residues present in wtALAS were mutated to serine (bold and double underlined): C12S and C39S.

Figure 8

SEQ ID NO: 32
R/L/N/A/C/S/H/I/G/Q-C-P-L/V/I/F/C-L/M/P/V

SEQ ID NO: 33
A-C-P-F-V

SEQ ID NO: 34
H-C-P-V-V

SEQ ID NO: 35
I-C-P-F-M

SEQ ID NO: 36
G-C-P-V-V

SEQ ID NO: 37
CGTCAGTCCATGAATGCCTCTCCCTTTGTCAGGTCAACTTC

SEQ ID NO: 38
GAAGTTGACCTGACAAAGGGAGAGGCATTCATGGACTGACG

SEQ ID NO: 39
GCTGCTACTGCTAGTCATTCTCCCGTGGTTGGCCCTG

SEQ ID NO: 40
CAGGGCCAACCACGGGAGAATGACTAGCAGTAGCAGC

SEQ ID NO: 41
AAACGCTGTCTTGGAACCTAATATGAC

SEQ ID NO: 42
GACGGGCGACAAACTCCATCGTTTCGAATAATTAGTTG

SEQ ID NO: 43
CAACTAATTATTCGAAACGATGGAGTTTGTCGCCCGTCAG

SEQ ID NO: 44
AATTAAATACATTTCAACTACAATCTGACTCCTGATGAGGTTTCG

SEQ ID NO: 45
CCTCATCAGGAGTCAGATTGTAGTTGAAATGTATTTAATTTG

SEQ ID NO: 46
AAACTGTCAGTTTTGGGCCATTTG

Figure 8 - Continued

SEQ ID NO: 47
GCTCTCCAACAGCAGAGATAC

SEQ ID NO: 48
GTCCATACGGATCGGAGAAAC

SEQ ID NO: 49
AGCAACATCCCTGATTCCG

SEQ ID NO: 50
ATGCGTACCTTCAATCCTGG

SEQ ID NO: 51
6-FAM/AAGCCCAAA/Zen/CCTCCGA CATTGCTA/3IABkFQ

SEQ ID NO: 52
HEX/TCGCCGTAA/Zen/GTTCTTGGTT TAGACGTTC/3IABkFQ

SEQ ID NO: 53
TAGCGCAGTCTCTATCGCTTC

SEQ ID NO: 54
CACTGGGTTGTGCACATTGG

SEQ ID NO: 55
ACAATATTCTTCTCTGCCGC

SEQ ID NO: 56
TTGATCTCGTCAAGAATGCG

SEQ ID NO: 57
TAGGTGCCACAACTTTTGGTTTC

SEQ ID NO: 58
GATCCAATGCGATGACATTCTTGT

SEQ ID NO: 59
ACCTGCAATAACTCCTCTTCTCTG

SEQ ID NO: 60
CCACTGAGGGTAGCCGAATC

SEQ ID NO: 61
GGGCTCTGAAAAACTCTTTTGG

Figure 8 - Continued

SEQ ID NO: 62
GCATGTCTCAATAACAGATCTCGACGG

SEQ ID NO: 63
AAGCCTCTTGTTTTTCTGTAAATGCAC

SEQ ID NO: 64
TGATGGCGTCCGAGATGAACTC

SEQ ID NO: 65
ATGGAGTTTGTCGCCCGTCAG

SEQ ID NO: 66
CTACAATCTGACTCCTGATGAGGTTTC

MATERIALS AND METHODS FOR PROTEIN PRODUCTION

CROSS-REFERENCE TO RELATED APPLICATIONS

This application is a divisional of U.S. application Ser. No. 16/858,443, filed on Apr. 24, 2020, which claims priority to U.S. Provisional Application Ser. No. 62/838,770, filed on Apr. 25, 2019, the contents of each of which are incorporated by reference herein in their entireties.

SEQUENCE LISTING

This application contains a Sequence Listing that has been submitted electronically as an XML file named "38767-0158002_SL_ST26.xml." The XML filed, created on Mar. 8, 2024, is 67,846 bytes in size. The material in the XML file is hereby incorporated by reference in its entirety.

TECHNICAL FIELD

This disclosure generally relates to DNA constructs and methods of using such DNA constructs to genetically engineer cells (e.g., yeast cells (e.g., methylotrophic yeast cells)).

BACKGROUND

Cells such as *Pichia pastoris* are commonly used for expression of recombinant proteins. Constructs that can be used to efficiently express one or more proteins in a cell (e.g., fungal cell, such as an *Aspergillus* cell, a *Trichoderma* cell, or a yeast cell (e.g., a methylotrophic yeast cell)) are provided herein.

SUMMARY

This document is based, at least in part, on the identification of mutations in aminolevulinic acid synthase (ALAS) that can confer increased expression of heme-binding proteins. The mutated ALAS proteins described herein can be used for the efficient expression of heme-binding proteins in *Pichia*, for example.

In one aspect, provided herein is a methylotrophic yeast cell including a first exogenous nucleic acid construct comprising a nucleotide sequence encoding an aminolevulinate synthase (ALAS) protein operably linked to a first promoter element, wherein the ALAS includes a first mutation in a first heme responsive motif (HRM) and a second exogenous nucleic acid construct comprising a nucleotide sequence encoding a heme-binding protein, wherein the second exogenous nucleic acid construct comprising a nucleotide sequence encoding the heme-binding protein is operably linked to the first promoter element or is operably linked to a second promoter element.

Implementations can have one or more of the following features. The methylotrophic yeast cell can be a *Pichia* cell, a *Candida* cell, a *Hansenula* cell, or a *Torulopsis* cell. The methylotrophic yeast cell can be a *Pichia methanolica* cell, a *Pichia pastoris* cell, a *Candida boidinii* cell, or a *Hansenula polymorpha* cell. The methylotrophic yeast cell can be a *Pichia pastoris* cell. The first mutation can be a cysteine to serine mutation. The first mutation can be a cysteine to alanine mutation. The ALAS can include a second mutation in a second HRM. The second mutation can be a cysteine to serine mutation. The second mutation can be a cysteine to alanine mutation. The first exogenous nucleic acid construct can include a nucleic acid sequence having at least 90% sequence identity to the nucleic acid sequence in SEQ ID NO: 28. The first exogenous nucleic acid construct can include a nucleic acid sequence having at least 95% sequence identity to the nucleic acid sequence in SEQ ID NO: 28. The ALAS protein can include an amino acid sequence having at least 90% sequence identity to the amino acid sequence in SEQ ID NO: 29. The ALAS protein can include an amino acid sequence having at least 95% sequence identity to the amino acid sequence in SEQ ID NO: 29. The heme-binding protein can be selected from the group consisting of a globin, a cytochrome, a cytochrome c oxidase, a ligninase, a catalase, and a peroxidase. The heme-binding protein can be selected from the group consisting of an androglobin, a chlorocruorin, a cytoglobin, an erythrocruorin, a flavohemoglobin, a globin E, a globin X, a globin Y, a hemoglobin, a histoglobin, a leghemoglobin, a myoglobin, a neuroglobin, a non-symbiotic hemoglobin, a protoglobin, and a truncated hemoglobin. The heme-binding protein can be a non-symbiotic hemoglobin. The heme-binding protein can be a leghemoglobin. The heme-binding protein can include an amino acid sequence having at least 90% sequence identity to an amino acid sequence in any one of SEQ ID NOs: 1-27. The methylotrophic yeast cell can further include a third nucleic acid construct comprising a nucleotide sequence encoding a transcription factor, wherein the third nucleic acid construct is operably linked to the first promoter element, the second promoter element, or a third promoter element. The first promoter element can include a recognition sequence for the transcription factor. The second exogenous nucleic acid construct can be operably linked to a second promoter element, and wherein the second promoter element includes a recognition sequence for the transcription factor. The third nucleic acid construct can be operably linked to the third promoter element, and wherein the third promoter element includes a recognition sequence for the transcription factor. The methylotrophic yeast cell can further include a fourth nucleic acid construct comprising a nucleotide sequence encoding a protein involved in heme biosynthesis, wherein the fourth nucleic acid construct is operably linked to the first promoter element, the second promoter element, the third promoter element, or a fourth promoter element. The protein involved in heme biosynthesis can be selected from the group consisting of ALA dehydratase, porphobilinogen deaminase, UPG III synthase, UPG III decarboxylase, CPG oxidase, PPG oxidase, and ferrochelatase. The first exogenous nucleic acid construct can be a heterologous nucleic acid construct. The second exogenous nucleic acid construct can be a heterologous nucleic acid construct. The heme-binding protein can be an exogenous heme-binding protein. The heme-binding protein can be a heterologous heme-binding protein.

In another aspect, provided herein is a method of producing a heme-binding protein in a methylotrophic yeast cell including expressing a first exogenous nucleic acid construct comprising a nucleotide sequence encoding an aminolevulinate synthase (ALAS) protein operably linked to a first promoter element, wherein the ALAS includes a first mutation in a first heme responsive motif (HRM) and expressing a second exogenous nucleic acid construct comprising a nucleotide sequence encoding a heme-binding protein, wherein the second exogenous nucleic acid construct comprising a nucleotide sequence encoding the heme-binding protein is operably linked to the first promoter element or is operably linked to a second promoter element.

Implementations can have one or more of the following features. The ALAS can include a second mutation in a second HRM. The method can produce the heme-binding protein in a titer that is at least 5% greater than a corresponding method lacking the first exogenous nucleic acid construct. The method can produce the heme-binding protein in a titer that is at least 10% greater than a corresponding method lacking the first exogenous nucleic acid construct. The method can produce the heme-binding protein in a titer that is at least 15% greater than a corresponding method lacking the first exogenous nucleic acid construct. The method can produce the heme-binding protein in a titer that is at least 20% greater than a corresponding method lacking the first exogenous nucleic acid construct. The method can produce the heme-binding protein in a titer that is at least 5% greater than a corresponding method lacking the first mutation. The method can produce the heme-binding protein in a titer that is at least 10% greater than a corresponding method lacking the first mutation. The method can produce the heme-binding protein in a titer that is at least 15% greater than a corresponding method lacking the first mutation. The method can produce the heme-binding protein in a titer that is at least 20% greater than a corresponding method lacking the first mutation. The method can produce the heme-binding protein in a titer that is at least 5% greater than a corresponding method lacking the first mutation and the second mutation. The method can produce the heme-binding protein in a titer that is at least 10% greater than a corresponding method lacking the first mutation and the second mutation. The method can produce the heme-binding protein in a titer that is at least 15% greater than a corresponding method lacking the first mutation and the second mutation. The method can produce the heme-binding protein in a titer that is at least 20% greater than a corresponding method lacking the first mutation and the second mutation. The method can be carried out in the absence of added methanol. The methylotrophic yeast cell can be a *Pichia* cell, a *Candida* cell, a *Hansenula* cell, or a *Torulopsis* cell. The methylotrophic yeast cell can be a *Pichia methanolica* cell, a *Pichia pastoris* cell, a *Candida boidinii* cell, or a *Hansenula polymorpha* cell. The methylotrophic yeast cell can be a *Pichia pastoris* cell. The first mutation can be a cysteine to serine mutation. The first mutation can be a cysteine to alanine mutation. The second mutation can be a cysteine to serine mutation. The second mutation can be a cysteine to alanine mutation. The first exogenous nucleic acid construct can include a nucleic acid sequence having at least 90% sequence identity to the nucleic acid sequence in SEQ ID NO: 28. The first exogenous nucleic acid construct can include a nucleic acid sequence having at least 95% sequence identity to the nucleic acid sequence in SEQ ID NO: 28. The ALAS protein can include an amino acid sequence having at least 90% sequence identity to the amino acid sequence in SEQ ID NO: 29. The ALAS protein can include an amino acid sequence having at least 95% sequence identity to the amino acid sequence in SEQ ID NO: 29. The heme-binding protein can be selected from the group consisting of a globin, a cytochrome, a cytochrome c oxidase, a ligninase, a catalase, and a peroxidase. The heme-binding protein can be selected from the group consisting of an androglobin, a chlorocruorin, a cytoglobin, an erythrocruorin, a flavohemoglobin, a globin E, a globin X, a globin Y, a hemoglobin, a histoglobin, a leghemoglobin, a myoglobin, a neuroglobin, a non-symbiotic hemoglobin, a protoglobin, and a truncated hemoglobin. The heme-binding protein can be a non-symbiotic hemoglobin. The heme-binding protein can be a leghemoglobin. The heterologous heme-binding protein can include an amino acid sequence having at least 90% sequence identity to an amino acid sequence in any one of SEQ ID NOs: 1-27. The method can further include expressing a third nucleic acid construct comprising a nucleotide sequence encoding a transcription factor, wherein the third nucleic acid construct is operably linked to the first promoter element, the second promoter element, or a third promoter element. The first promoter element can include a recognition sequence for the transcription factor. The second exogenous nucleic acid construct can be operably linked to a second promoter element, and wherein the second promoter element includes a recognition sequence for the transcription factor. The third nucleic acid construct can be operably linked to the third promoter element, and wherein the third promoter element includes a recognition sequence for the transcription factor. The method can further include expressing a fourth nucleic acid construct comprising a nucleotide sequence encoding a protein involved in heme biosynthesis, wherein the fourth nucleic acid construct is operably linked to the first promoter element, the second promoter element, the third promoter element, or a fourth promoter element. The protein involved in heme biosynthesis can be selected from the group consisting of ALA dehydratase, porphobilinogen deaminase, UPG III synthase, UPG III decarboxylase, CPG oxidase, PPG oxidase, and ferrochelatase. The first exogenous nucleic acid construct can be a heterologous nucleic acid construct. The second exogenous nucleic acid construct can be a heterologous nucleic acid construct. The heme-binding protein can be an exogenous heme-binding protein. The heme-binding protein can be a heterologous heme-binding protein.

In another aspect, provided herein is a *Pichia pastoris* cell including a first exogenous nucleic acid construct comprising a nucleotide sequence encoding an aminolevulinate synthase (ALAS) protein operably linked to a first promoter element, wherein the ALAS includes a first mutation in a first heme responsive motif (HRM) and a second mutation in a second HRM and a second exogenous nucleic acid construct comprising a nucleotide sequence encoding leghemoglobin, wherein the second exogenous nucleic acid construct comprising a nucleotide sequence encoding leghemoglobin is operably linked to the first promoter element, or the second exogenous nucleic acid construct comprising a nucleotide sequence encoding leghemoglobin is operably linked to a second promoter element.

Implementations can include one or more of the following features. The first mutation can be a cysteine to serine mutation. The second mutation can be a cysteine to serine mutation.

In another aspect, provided herein is a method of producing leghemoglobin, the method including expressing a first exogenous nucleic acid construct comprising a nucleotide sequence encoding an aminolevulinate synthase (ALAS) protein operably linked to a first promoter element, wherein the ALAS includes a first mutation in a first heme responsive motif (HRM) and a second mutation in a second HRM and expressing a second exogenous nucleic acid construct comprising a nucleotide sequence encoding leghemoglobin, wherein the second exogenous nucleic acid construct comprising a nucleotide sequence encoding leghemoglobin is operably linked to the first promoter element, or the second exogenous nucleic acid construct comprising a nucleotide sequence encoding leghemoglobin is operably linked to a second promoter element.

Implementations can have one or more of the following features. The method can produce the leghemoglobin in a titer that is at least 5% greater than a corresponding method lacking the first exogenous nucleic acid construct. The method can produce the leghemoglobin in a titer that is at least 10% greater than a corresponding method lacking the first exogenous nucleic acid construct. The method can produce the leghemoglobin in a titer that is at least 15% greater than a corresponding method lacking the first exogenous nucleic acid construct. The method can produce the leghemoglobin in a titer that is at least 20% greater than a corresponding method lacking the first exogenous nucleic acid construct. The method can produce the leghemoglobin in a titer that is at least 5% greater than a corresponding method lacking the first mutation and the second mutation. The method can produce the leghemoglobin in a titer that is at least 10% greater than a corresponding method lacking the first mutation and the second mutation. The method can produce the leghemoglobin in a titer that is at least 15% greater than a corresponding method lacking the first mutation and the second mutation. The method can produce the leghemoglobin in a titer that is at least 20% greater than a corresponding method lacking the first mutation and the second mutation. The method can be carried out in the absence of added methanol.

In another aspect, provided herein is a *Pichia pastoris* cell including a first exogenous nucleic acid construct comprising a nucleotide sequence encoding a protein with at least 90% sequence identity to SEQ ID NO: 29, wherein the nucleic acid encodes a serine residue in a position corresponding to position 12 of SEQ ID NO: 29, and wherein the nucleic acid encodes a serine residue in a position corresponding to position 39 of SEQ ID NO: 29, operably linked to a first promoter element.

Implementations can include one or more of the following features. The *Pichia pastoris* cell can further include a second exogenous nucleic acid construct comprising a nucleotide sequence encoding a protein with at least 90% sequence identity to any of SEQ ID NOs: 1-27, wherein the second exogenous nucleic acid construct is operably linked to the first promoter element, or the second exogenous nucleic acid construct is operably linked to a second promoter element. The *Pichia pastoris* cell can further include a second exogenous nucleic acid construct comprising a nucleotide sequence encoding a protein with at least 90% sequence identity to SEQ ID NO: 4, wherein the second exogenous nucleic acid construct is operably linked to the first promoter element, or the second exogenous nucleic acid construct is operably linked to a second promoter element.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the disclosure are set forth in the accompanying drawings and the description below. Other features, objects, and advantages of the disclosure will be apparent from the description and drawings, and from the claims. The word "comprising" in the claims may be replaced by "consisting essentially of" or with "consisting of," according to standard practice in patent law.

DESCRIPTION OF THE DRAWINGS

FIG. 4 provides the sequences of exemplary heme-binding proteins (SEQ ID NOs: 1-27).

FIG. 6 provides the nucleic acid sequence (SEQ ID NO: 28) and amino acid sequence (SEQ ID NO: 29) of wild-type ALAS.

FIG. 7 provides the nucleic acid sequence (SEQ ID NO: 30) and amino acid sequence (SEQ ID NO: 31) of an exemplary mutant ALAS.

FIG. 8 provides the sequences of SEQ ID NOs: 32-66.

DETAILED DESCRIPTION

This document is related to materials and methods for protein production. In particular, this document is related to materials and method for the production of heme and heme-binding proteins.

Methylotrophic yeast, such as *Pichia pastoris*, are commonly used to produce recombinant proteins. *Pichia* strains are typically able to grow using methanol as the sole carbon source. It will be understood that *Pichia pastoris* has been reclassified as *Komagataella* species, such as *Komagataella phaffii*, *Komagataella pastoris*, or *Komagataella pseudopastoris*, though the term '*Pichia pastoris*' is still in use and may refer to any appropriate *Komagataella* species. Commonly, laboratory strains of *P. pastoris* are *Komagataella phaffii*.

Figure 1:
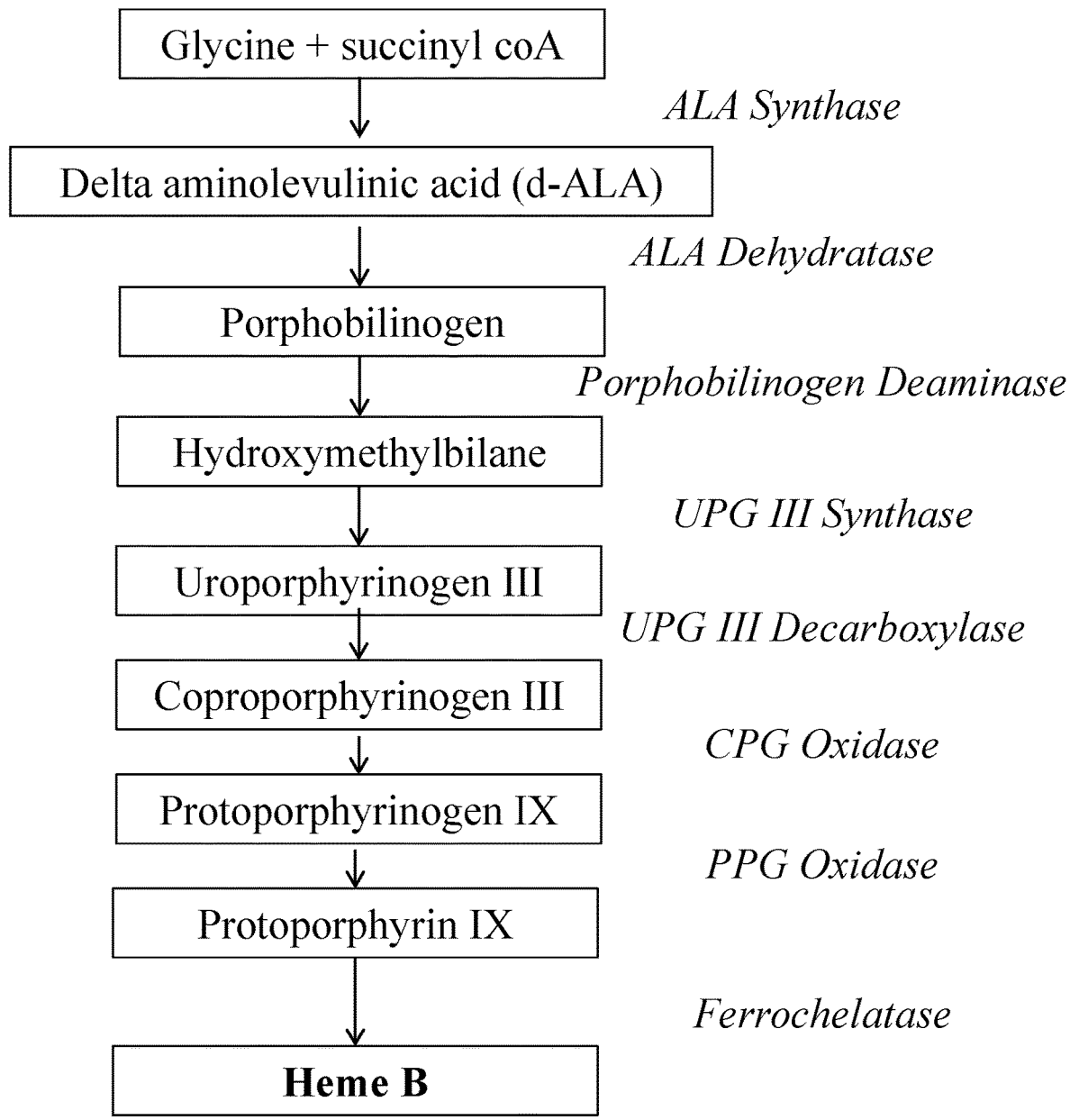
FIG. 1 provides a schematic depicting the steps involved in the heme biosynthesis pathway.
Figure 2:
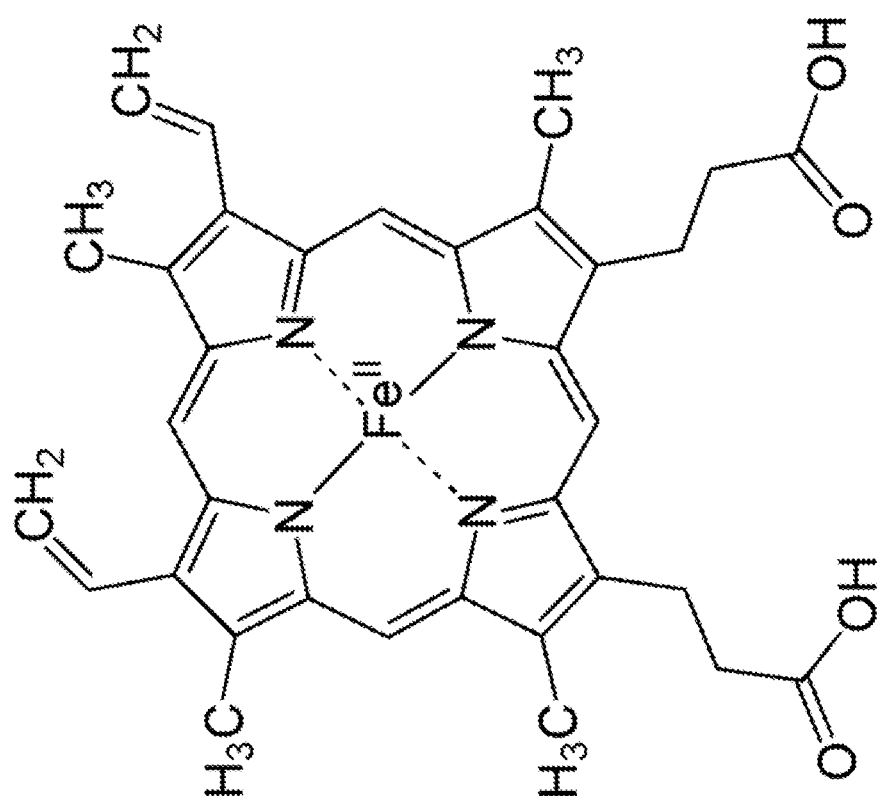
FIG. 2 provides a structure of Heme b.
Figure 3:
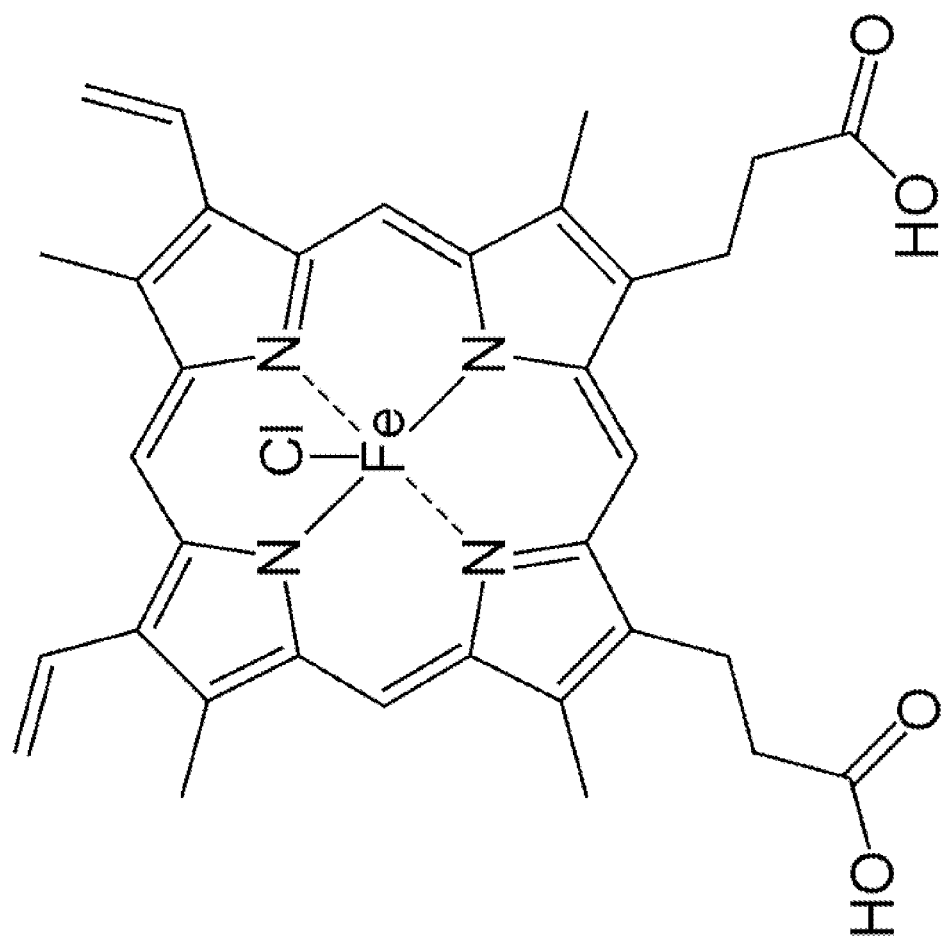
FIG. 3 provides a structure of hemin.

Proteins that bind heme include cytochromes, catalase, myoglobin and hemoglobin among others. Aminolevulinic acid synthase (ALAS) is an enzyme (EC 2.3.1.37) that catalyzes the first step in heme biosynthesis (See FIG. 1 for a diagram of a Heme b biosynthesis pathway), catalyzing the transformation of glycine and succinyl-CoA to aminolevulinic acid. ALAS is translocated to the mitochondria for this step of heme biosynthesis. Aminolevulinic acid is transformed by other enzymes (e.g., ALA dehydratase (ALAD), porphobilinogen deaminase (PBGD), uroporphyrinogen III synthase (UPG3S), uroporphyrinogen III decarboxylase (UPG3D), coprotoporphyrinogen oxidase (COPROX), protoporphyrinogen IX oxidase (PROTOX), and/or ferrochelatase (FC)) to Heme b (FIG. 2). In some cases, the action of ALAS can be rate-limiting for the heme biosynthesis pathway. Other hemes (e.g., Heme o, Heme a, Heme c) can be made through the action of enzymes on Heme b. Hemin (FIG. 3) is a complex of protoporphyrin IX (e.g., the protoporphyrin of Heme b) with a ferric (+3 oxidation state) iron and a chloride ligand.

As used herein, "intermediate of the heme biosynthesis pathway" refers to one or more of: delta aminolevulinic acid (d-ALA), porphobilinogen, hydroxymethylbilane, uroporphyrinogen III, coproporphyrinogen III, protoporphyrinogen IX, or protoporphyrin IX. In some embodiments, an intermediate of the heme biosynthesis pathway can be selected from the group consisting of delta aminolevulinic acid (d-ALA), porphobilinogen, hydroxymethylbilane, uroporphyrinogen III, coproporphyrinogen III, protoporphyrinogen IX, and protoporphyrin IX. In some embodiments, an intermediate of the heme biosynthesis pathway can be selected from the group consisting of porphobilinogen, hydroxymethylbilane, uroporphyrinogen III, coproporphyrinogen III, protoporphyrinogen IX, or protoporphyrin IX.

Translocation of some ALAS proteins to the mitochondria can be affected by one or more heme regulatory motifs (HRMs; sometimes also called heme responsive motifs)

contained within the ALAS protein. Many HRMs include a C-P motif, and the cysteine is often an axial ligand for heme. In some embodiments, a HRM has a sequence of R/L/N/A/C/S/H/I/G/Q-C-P-L/V/I/F/C-L/M/P/V (SEQ ID NO: 32) (e.g., a HRM can have a sequence of A-C-P-F-V (SEQ ID NO: 33), H-C-P-V-V (SEQ ID NO: 34), I-C-P-F-M (SEQ ID NO: 35), or G-C-P-V-V (SEQ ID NO: 36); sec, e.g., FIG. 8). Some organisms have 3 HRMs in their ALAS sequence, while other organisms (e.g., a methylotrophic yeast such as *Pichia pastoris*) have two. In general, a HRM can be called HRM1, HRM2, HRM3, and so forth, depending on where the HRM occurs in the protein sequence, e.g., the first-occurring HRM in the protein sequence (read as N-terminus to C-terminus) would be called HRM1. Mutation of the cysteine (e.g., to serine or alanine) in the HRMs can increase the translocation of ALAS to the mitochondria (see, e.g., González-Domínguez, et al., Yeast. 2001 Jan. 15; 18(1):41-8. (PubMed ID (PMID) 11124700); Munakata et al., J Biochem. 2004 August; 136(2):233-8. (PMID 15496594); Dailey et al, Biochem J. 2005 Mar. 1; 386(Pt 2):381-6. (PMID 15482256)), each of which is herein incorporated by reference in its entirety). Without being bound by any particular theory, it is believed that heme binding to the HRMs of wild type ALAS can inhibit the translocation of ALAS to the mitochondria in a negative feedback manner. Heme is also believed to be involved in the degradation of some ALAS proteins (see, e.g., Kubota, et al., J Biol Chem. 2016 Sep. 23; 291(39):20516-29. doi: 10.1074/jbc.M116.719161. Epub 2016 Aug. 5. (PMID 27496948), incorporated by reference herein in its entirety).

It will be appreciated that a "first HRM" can be an HRM in any part of a protein sequence; a "first HRM" can be, but is not necessarily, the first-occurring HRM (HRM1) in a protein sequence. In some embodiments, a first HRM is HRM1, and a second HRM is HRM2. In some embodiments, a first HRM is HRM1, and a second HRM is HRM3. In some embodiments, a first HRM is HRM2, and a second HRM is HRM1. In some embodiments, a first HRM is HRM2, and a second HRM is HRM3. In some embodiments, a first HRM is HRM3, and a second HRM is HRM1. In some embodiments, a first HRM is HRM3, and a second HRM is HRM2.

In some embodiments, a mutation in a nucleic acid can be an insertion, a deletion, or a substitution. In some embodiments, a mutation in a nucleic acid can be a substitution (e.g., a guanosine to cytosine mutation). In some embodiments, a substitution in a coding sequence (e.g., encoding a protein) can be a silent mutation (e.g., the same amino acid is encoded). In some embodiments, a substitution in a coding sequence can be a nonsynonymous mutation (e.g., a missense mutation or a nonsense mutation). In some embodiments, a substitution in a coding sequence can be a missense mutation (e.g., a different amino acid is encoded). In some embodiments, a substitution in a coding sequence can be nonsense mutation (e.g., a premature stop codon is encoded). In some embodiments, a mutation in a nucleic acid can can be a deletion. It will be understood that mutations can be used to alter an endogenous nucleic acid, using, for example, CRISPR, TALEN, and/or Zinc-finger nucleases.

In some embodiments, a mutation in a protein sequence can be an insertion, a deletion, or a substitution. It will be understood that a mutation in a nucleic acid that encodes a protein can cause a mutation in a protein sequence. In some embodiments, a mutation in a protein sequence is a substitution (e.g., a cysteine to serine mutation, a cysteine to alanine mutation, a cysteine to valine mutation, a cysteine to leucine mutation, a cysteine to isoleucine mutation, a cysteine to glycine mutation, a cysteine to phenylalanine mutation, a cysteine to threonine mutation, a cysteine to methionine mutation, a cysteine to tryptophan mutation, a cysteine to tyrosine mutation, a cysteine to asparagine mutation, a cysteine to glutamine mutation, a cysteine to proline mutation, a cysteine to arginine mutation, a cysteine to histidine mutation, a cysteine to lysine mutation, a cysteine to aspartic acid mutation, or a cysteine to glutamic acid mutation). In some embodiments, a mutation in a protein sequence can be a deletion.

In some embodiments, an ALAS protein as described herein can include a mutation in at least one HRM; for example, a first HRM, a second HRM, a third HRM, a fourth HRM, a fifth HRM, and so forth.

In some embodiments, an ALAS protein as described herein can include a mutation in at least one HRM (e.g., a first HRM). In some embodiments, an ALAS protein as described herein can include a mutation in a single HRM (e.g., a first HRM or a second HRM). In some embodiments, an ALAS protein as described herein can include a mutation in a cysteine of at least one HRM (e.g., a first HRM). In some embodiments, an ALAS protein as described herein can include a mutation in a cysteine in a single HRM (e.g., a first HRM or a second HRM).

In some embodiments, an ALAS protein as described herein can include a mutation in at least two HRMs (e.g., a first HRM and a second HRM). In some embodiments, an ALAS protein as described herein can include a mutation in each of two HRMs (e.g., a first HRM and a second HRM). In some embodiments, the mutation in the first HRM and the mutation in the second HRM can be the same (e.g., both cysteine to serine or alanine mutations). In some embodiments, the mutation in the first HRM and the mutation in the second HRM can be different (e.g., one is a cysteine to serine mutation and one is a cysteine to alanine mutation). In some embodiments, an ALAS protein as described herein can include a mutation in a cysteine of at least two HRMs (e.g., a first HRM and a second HRM). In some embodiments, an ALAS protein as described herein can include a mutation in a cysteine in each of two HRMs (e.g., a first HRM and a second HRM). In some embodiments, the mutation in the first HRM and the mutation in the second HRM can be the same (e.g., both cysteine to serine or alanine mutations). In some embodiments, the mutation in the first HRM and the mutation in the second HRM can be different (e.g., one is a cysteine to serine mutation and one is a cysteine to alanine mutation).

In some embodiments, an ALAS protein as described herein can include a mutation in at least three HRMs (e.g., a first HRM, a second HRM, and a third HRM). In some embodiments, an ALAS protein as described herein can include a mutation in each of three HRMs (e.g., a first HRM, a second HRM, and a third HRM). In some embodiments, an ALAS protein as described herein can include a mutation in a cysteine at least three HRMs (e.g., a first HRM, a second HRM, and a third HRM). In some embodiments, an ALAS protein as described herein can include a mutation in a cysteine in each of three HRMs (e.g., a first HRM, a second HRM, and a third HRM). In some embodiments, the mutation in each of the first HRM, the second HRM, and the third HRM can be the same (e.g., both cysteine to serine or alanine mutations). In some embodiments, the mutation in one or two of the three HRMs can be different.

In some embodiments, a substitution (a mutation to a different amino acid) can be a substitution for an amino acid (e.g., a cysteine) in a HRM. In some embodiments, a mutation in a first HRM can be a substitution for an amino acid (e.g., a cysteine) in the first HRM. In some embodiments, a mutation in a second HRM can be a substitution for an amino acid (e.g., a cysteine) in the second HRM. In some embodiments, a mutation in a third HRM can be a substitution for an amino acid (e.g., a cysteine) in the third HRM. A substitution can be any appropriate substitution. In some embodiments, a different amino acid can be selected from group consisting of arginine, histidine, lysine, serine, threonine, asparagine, glutamine, selenocysteine, glycine, proline, alanine, isoleucine, leucine, methionine, phenylalanine, tryptophan, tyrosine, and valine. In some embodiments, a different amino acid can be selected from group consisting of arginine, histidine, lysine, serine, threonine, asparagine, glutamine, selenocysteine, glycine, proline, alanine, isoleucine, leucine, methionine, aspartic acid, glutamic acid, phenylalanine, tryptophan, tyrosine, and valine. In some embodiments, a different amino acid is selected from a nonpolar aliphatic amino acid (e.g., glycine, proline, alanine, isoleucine, leucine, methionine, or valine), an aromatic amino acid (e.g., phenylalanine, tryptophan, or tyrosine), a polar uncharged amino acid (e.g., serine, threonine, asparagine, or glutamine), or a positively charged amino acid (arginine, histidine, or lysine). In some embodiments, the different amino acid is serine. In some embodiments, the different amino acid is alanine. In some embodiments, the different amino acid is phenylalanine. In some embodiments, the different amino acid is aspartic acid. In some embodiments, the different amino acid is histidine.

Surprisingly, when an ALAS protein with a cysteine to serine mutation in each of its two HRMs is co-expressed with an exogenous heme-binding protein, the titer of the exogenous heme-binding protein can increase significantly.

Generally, a "titer" is the measurement of the amount of a substance in solution. As used herein, the "titer" of a heme-binding protein refers to the overall amount of the polypeptide, whether or not it is bound to heme, unless otherwise specified. The titer of a protein can be measured by suitable method, such as high-performance liquid chromatography (HPLC or UPLC), liquid chromatography-mass spectrometry (LC-MS), an enzyme-linked immunosorbent assay (ELISA), enzyme activity measurements, iron measurement techniques such as atomic absorption spectroscopy, LC-MS, or ultraviolet and/or visible light spectroscopy.

Mutations in ALAS, such as those described herein, can be used to increase heme production. In some embodiments, the titer of a heme-binding protein can be increased. In some embodiments, the titer of a leghemoglobin (LegH) can be increased. The materials and methods of this disclosure can be useful to increase the production of heme.

The materials and methods described herein can have applications in many industries. For example, heme proteins can be used in food. As another example, heme proteins (e.g., hemoglobins, cytochrome P450s) can be produced for research purposes (e.g., to study drug metabolism). Heme proteins can also be used in industry (e.g., catalases, laccases, and/or peroxidases for uses such as washing detergents, pulp bleaching, lignin degradation). Another potential application for heme proteins is in biocatalysis (e.g. cytochrome P450s, lipoxygenases, and/or laccases can be used for the production of pharmaceutical and commodity chemicals). Some heme proteins can be used as therapeutic agents (e.g., nitric oxide synthases or as part of a blood replacement). In some cases, heme proteins can be used for electronic purposes (e.g. for the production of renewable electricity). As another example, heme therapy can be a treatment option for patients with acute porphyrias, a group of eight genetic diseases that result from inability to produce heme.

Nucleic acid constructs (sometimes also called nucleic acid molecules) are provided herein that allow for genetically engineering a cell (e.g., fungal cell, such as an *Aspergillus* cell, a *Trichoderma* cell, or a yeast cell (e.g., a methylotrophic yeast cell)) to produce a mutant ALAS. In addition, nucleic acid constructs are provided herein that allow for genetically engineering a cell (e.g., fungal cell, such as an *Aspergillus* cell, a *Trichoderma* cell, or a yeast cell (e.g., a methylotrophic yeast cell)) to increase the expression of a heme-binding protein. In some embodiments, nucleic acid constructs are provided herein that allow for genetically engineering a cell (e.g., fungal cell, such as an *Aspergillus* cell, a *Trichoderma* cell, or a yeast cell (e.g., a methylotrophic yeast cell)) to increase the expression of a heme-binding protein from an inducible promoter in the absence of the inducing molecule.

Nucleic acid constructs are provided herein that allow for genetically engineering a cell. A cell can be any appropriate cell. For example, a cell can be a bacterial cell (e.g., an *E. coli* cell, a *B. subtilis* cell, or a *Lactococcus lactis* cell), a fungal cell, an algal cell, a plant cell, an insect cell, or a mammalian cell. In some embodiments, a cell can be a fungal cell. In some embodiments, a cell can be a filamentous fungus cell. In some embodiments, a cell can be an *Aspergillus* or *Trichoderma* cell. In some embodiments, a cell can be a yeast cell. Non-limiting examples of yeast cells include *Pichia* (e.g., *Pichia methanolica*, *Pichia pastoris*), *Candida* (e.g., (*Candida boidinii*) cells, *Hansenula* (e.g., *Hansemila polymorpha*) cells, *Torulopsis* cells, and *Sacharomyces* (e.g., *Sacharomyces cerevisae*) cells. In some embodiments, a cell can be a methylotrophic yeast cell. Non-limiting examples of methylotrophic yeast cells include *Pichia* cells, *Candida* cells, *Hansenula* cells, and *Torulopsis* cells. In some embodiments, a cell can be a *Pichia* cell or a *Sacharomyces* cell. In some embodiments, a cell is a eukaryotic cell. In some embodiments, a cell is a fungal cell. In some embodiments, a cell is a plant cell. In some embodiments, a cell is an algal cell. In some embodiments, a cell is a yeast cell. In some embodiments, a cell is a *Saccharomyces cerevisiae* cell. In some embodiments, a cell is a methylotrophic yeast cell. While the methods are exemplified herein using a *Pichia* species (e.g., *P. pastoris*), other cells can be used, such as other species of the *Pichia* genus or species from any of the *Candida*, *Hansenula*, *Pichia*, and *Torulopsis* genera. Non-limiting examples of species of methylotrophic yeast include *Pichia methanolica*, *Pichia pastoris*, *Candida boidinii*, and *Hansenula polymorpha*.

Accordingly, in one aspect, this document provides materials and methods for expressing protein. In some embodiments, this document provides a cell (e.g., fungal cell, such as an *Aspergillus* cell, a *Trichoderma* cell, or a yeast cell (e.g., a methylotrophic yeast cell)) including a first nucleic acid construct comprising a nucleotide sequence encoding an ALAS protein. In some embodiments, the first nucleic acid encodes an ALAS protein operably linked to a first promoter element. In some embodiments, an ALAS protein includes at least 1 HRM (e.g., 1, 2, 3, or more HRMs). In some embodiments, an ALAS protein includes at least 2 HRMs (e.g., 2, 3 or more HRMs). In some embodiments, an ALAS protein includes at least 3 HRMs (e.g., 3 or more HRMs). In some embodiments, the ALAS protein includes a mutation in a first HRM (sometimes also called "a first mutation in a first HRM"). In some embodiments, the ALAS protein includes a mutation in a second HRM (sometimes also called "a second mutation in a second HRM"). In some embodiments, the ALAS protein includes a mutation in a first HRM and a mutation in a second HRM. In some embodiments, the first HRM is HRM1. In some embodiments, the second HRM is HRM2. In some embodiments, the ALAS protein includes a mutation in a third HRM (sometimes also called "a third mutation in a third HRM"). In some embodiments, the ALAS protein includes a mutation in a first HRM, a mutation in a second HRM, and a mutation in a third HRM.

In some embodiments, the mutation in the first HRM is a substitution. In some embodiments, the mutation in the first HRM is a cysteine substitution. In some embodiments, the mutation in the first HRM is a cysteine to serine mutation. In some embodiments, the mutation in the first HRM is a cysteine to alanine mutation. In some embodiments, the mutation in the first HRM is a cysteine to phenylalanine mutation. In some embodiments, the mutation in the first HRM is a cysteine to aspartic acid mutation. In some embodiments, the mutation in the first HRM is a cysteine to histidine mutation.

In some embodiments, the mutation in the second HRM is a substitution. In some embodiments, the mutation in the second HRM is a cysteine substitution. In some embodiments, the mutation in the second HRM is a cysteine to serine mutation. In some embodiments, the mutation in the second HRM is a cysteine to alanine mutation. In some embodiments, the mutation in the second HRM is a cysteine to phenylalanine mutation. In some embodiments, the mutation in the second HRM is a cysteine to aspartic acid mutation. In some embodiments, the mutation in the second HRM is a cysteine to histidine mutation.

In some embodiments, the mutation in the third HRM is a substitution. In some embodiments, the mutation in the third HRM is a cysteine substitution. In some embodiments, the mutation in the third HRM is a cysteine to serine mutation. In some embodiments, the mutation in the third HRM is a cysteine to alanine mutation. In some embodiments, the mutation in the third HRM is a cysteine to phenylalanine mutation. In some embodiments, the mutation in the third HRM is a cysteine to aspartic acid mutation. In some embodiments, the mutation in the third HRM is a cysteine to histidine mutation.

In some embodiments, the mutation in the first HRM corresponds to a mutation in residue 12 in SEQ ID NO: 29. In some embodiments, the mutation in the second HRM corresponds to a mutation in residue 39 in SEQ ID NO: 29. In some embodiments, the mutation in the first HRM is a cysteine to serine mutation corresponding to a cysteine to serine mutation in residue 12 in SEQ ID NO: 29. In some embodiments, the mutation in the first HRM is a cysteine to alanine mutation corresponding to a cysteine to alanine mutation in residue 12 in SEQ ID NO: 29. In some embodiments, the mutation in the first HRM is a cysteine to phenylalanine mutation corresponding to a cysteine to phenylalanine mutation in residue 12 in SEQ ID NO: 29. In some embodiments, the mutation in the first HRM is a cysteine to histidine mutation corresponding to a cysteine to histidine mutation in residue 12 in SEQ ID NO: 29. In some embodiments, the mutation in the second HRM is a cysteine to serine mutation corresponding to a cysteine to serine mutation in residue 39 in SEQ ID NO: 29. In some embodiments, the mutation in the second HRM is a cysteine to alanine mutation corresponding to a cysteine to alanine mutation in residue 39 in SEQ ID NO: 29. In some embodiments, the mutation in the second HRM is a cysteine to phenylalanine mutation corresponding to a cysteine to phenylalanine mutation in residue 39 in SEQ ID NO: 29. In some embodiments, the mutation in the second HRM is a cysteine to histidine mutation corresponding to a cysteine to histidine mutation in residue 39 in SEQ ID NO: 29.

In some embodiments, the first nucleic acid includes a mutation corresponding to a guanosine to cytosine mutation at nucleotide position 35 in SEQ ID NO: 28. In some embodiments, the first nucleic acid includes a mutation corresponding to a thymine to guanosine mutation at nucleotide position 34 in SEQ ID NO: 28 and a guanosine to cytosine mutation at nucleotide position 35 in SEQ ID NO: 28. In some embodiments, the first nucleic acid includes a mutation corresponding to a guanosine to cytosine mutation at nucleotide position 116 in SEQ ID NO: 28. In some embodiments, the first nucleic acid includes a mutation corresponding to a thymine to guanosine mutation in nucleotide position 115 in SEQ ID NO: 28 and a guanosine to cytosine mutation at nucleotide position 116 in SEQ ID NO: 28. It will be appreciated that cysteine to serine mutations can be accomplished by mutations at nucleotides other than those specifically disclosed herein. It will be appreciated that cysteine to alanine mutations can be accomplished by mutations at nucleotides other than those specifically disclosed herein. In some embodiments, the first nucleic acid construct includes SEQ ID NO: 30. In some embodiments, the ALAS protein has the sequence of SEQ ID NO: 31. (See, e.g., FIG. 7).

As used herein, "operably linked" means that a promoter or other expression element(s) are positioned relative to a nucleic acid coding sequence in such a way as to direct or regulate expression of the coding sequence (e.g., in-frame).

A "corresponding" amino acid position (or substitution) in a protein sequence different from a reference protein sequence (e.g., in the ALAS protein sequence of a different organism compared to a reference ALAS protein sequence, such as SEQ ID NO: 29) can be identified by performing a sequence alignment between the protein sequences of interest. It will be understood that in some cases, a gap exists in a protein alignment. Similarly, a "corresponding" nucleic acid position (or substitution) in a nucleic acid sequence different from a reference nucleic acid sequence (e.g., in the ALAS nucleic acid sequence of a different organism compared to a reference ALAS nucleic acid sequence, such as SEQ ID NO: 28) can be identified by performing a sequence alignment between the nucleic acid sequences of interest. It will be understood that in some cases, a gap exists in a nucleic acid alignment. As used herein, a nucleotide or amino acid position "relative to" a reference sequence can be the corresponding nucleotide or amino acid position in a reference sequence.

Nucleic acid molecules used in the methods described herein are typically DNA, but RNA molecules can be used under the appropriate circumstances. As used herein, "exogenous" refers to any nucleic acid sequence that is introduced into a cell from, for example, the same or a different organism or a nucleic acid generated synthetically (e.g., a codon-optimized nucleic acid sequence). For example, an exogenous nucleic acid can be a nucleic acid from one microorganism (e.g., one genus or species of methylotrophic yeast) that is introduced into a different genus or species of methylotrophic yeast; however, an exogenous nucleic acid also can be a nucleic acid from a methylotrophic yeast that is introduced recombinantly into a methylotrophic yeast as an additional copy despite the presence of a corresponding native nucleic acid sequence, or a nucleic acid from a methylotrophic yeast that is introduced recombinantly into a methylotrophic yeast containing one or more mutations, insertions, or deletions compared to the sequence native to the methylotrophic yeast. For example, *P. pastoris* contains an endogenous nucleic acid encoding an ALAS; an additional copy of the *P. pastoris* ALAS nucleic acid (e.g., introduced recombinantly into *P. pastoris*) is considered to be exogenous. Similarly, an "exogenous" protein is a protein encoded by an exogenous nucleic acid.

In some instances, an exogenous nucleic acid can be a heterologous nucleic acid. As used herein, a "heterologous" nucleic acid refers to any nucleic acid sequence that is not native to an organism (e.g., a heterologous nucleic acid can be a nucleic acid from one microorganism (e.g., one genus or species of methylotrophic yeast, whether or not it has been codon-optimized) that is introduced into a different genus or species of methylotrophic yeast)). Similarly, a "heterologous" protein is a protein encoded by a heterologous nucleic acid.

A nucleic acid molecule is considered to be exogenous to a host organism when any portion thereof (e.g., a promoter sequence or a sequence of an encoded protein) is exogenous to the host organism. A nucleic acid molecule is considered to be heterologous to a host organism when any portion thereof (e.g., a promoter sequence or a sequence of an encoded protein) is heterologous to the host organism.

In some embodiments, this document provides a cell (e.g., fungal cell, such as an *Aspergillus* cell, a *Trichoderma* cell, or a yeast cell (e.g., a methylotrophic yeast cell)) comprising a first nucleic acid construct as disclosed herein and a second nucleic acid construct comprising a nucleotide sequence encoding a heme-binding protein. In some embodiments, the second nucleic acid encodes a heme-binding protein operably linked to the first promoter element. In some embodiments, the second nucleic acid encodes a heme-binding protein operably linked to a second promoter element. In some embodiments, a heme-binding protein can be an exogenous heme-binding protein. In some embodiments, a heme-binding protein can be a heterologous heme-binding protein. In some embodiments, a heme-binding protein can be selected from the group consisting of a globin (PF00042 in the Pfam database), a cytochrome (e.g., a cytochrome P450, a cytochrome a, a cytochrome b, a cytochrome c), a cytochrome c oxidase, a ligninase, a catalase, and a peroxidase. In some embodiments, a globin can be selected from the group consisting of an androglobin, a chlorocruorin, a cytoglobin, an erythrocruorin, a flavohemoglobin, a globin E, a globin X, a globin Y, a hemoglobin (e.g., a beta hemoglobin, an alpha hemoglobin), a histoglobin, a leghemoglobin, a myoglobin, a neuroglobin, a non-symbiotic hemoglobin, a protoglobin, and a truncated hemoglobin (e.g., a HbN, a HbO, a Glb3, a cyanoglobin). In some embodiments, the heme-binding protein can be a non-symbiotic hemoglobin. In some embodiments, the heme-binding protein can be a leghemoglobin. In some embodiments, the heme-binding protein can be soybean leghemoglobin (LegH). A reference amino acid sequence for LegH is provided in FIG. 4 as SEQ ID NO: 4. LegH is a protein that binds to heme, which results in a characteristic absorption at 415 nm and a distinct red color. The LegH protein (also known as LGB2) is naturally found in root nodules of soybean (see, for example, UniprotKB Accession No. P02236). Sec, also, WO 2014/110539 and WO 2014/110532, each of which is herein incorporated by reference in its entirety. In some embodiments, a heme-binding protein can have an amino acid sequence that is at least 70% (e.g., at least 75%, 80%, 85%, 90%, 91%, 92%, 93%, 94%, 95%, 96%, 97%, 98%, or 99%) identical to the amino acid sequence set forth in any of SEQ ID NOs: 1-27 (FIG. 4). In some embodiments, a heme-binding protein can have an amino acid sequence set forth in any of SEQ ID NOs: 1-27. In some embodiments, a heme-binding protein uses heme as a cofactor. As used herein, a "cofactor" is a molecule or ion that is directly involved in enzyme catalysis. In some embodiments, a heme-binding protein may or may not be an enzyme. In some embodiments, the heme-binding protein may or may not be part of the heme biosynthesis pathway. In some embodiments, the heme-binding protein may or may not be an ALAS. In some embodiments, the heme-binding protein may or may not be a ferrochelatase. In some embodiments, the heme-binding protein may or may not be a coprotoporphyrinogen oxidase. In some embodiments, the heme binding protein may or may not be ALAD, PBGD, UPG3S, UPG3D, COPROX, PROTOX, or FC. In some embodiments, a heme-binding protein has an amino acid sequence that is at least 70% (e.g., at least 75%, 80%, 85%, 90%, or 95%) identical to an amino acid sequence in any of SEQ ID NOs: 1-27. In some embodiments, a heme-binding protein is a bacteria-derived heme-binding protein, a yeast-derived heme-binding protein, an algae-derived heme-binding protein, a fungus-derived heme-binding protein, or a plant-derived heme-binding protein.

As used herein, a "bacteria-derived protein", "yeast-derived protein", "algae-derived protein", "fungus-derived protein", or "plant-derived protein" refers to the immediate source of the protein, and can mean any protein that is produced in a bacterium, a yeast, an algae, a fungus, or a plant, respectively, independently of whether the protein is natively expressed in the bacterium, yeast, algae, fungus, or plant, respectively.

Provided herein are methods of producing an ALAS protein. Also provided herein are methods of producing an ALAS protein using any of the cells (e.g., fungal cells, such as *Aspergillus* cells, *Trichoderma* cells, or yeast cells (e.g., methylotrophic yeast cells)) described herein. Also provided herein are methods of producing an ALAS protein using any of the nucleic acid constructs described herein. In some embodiments, provided herein are methods comprising expressing a first nucleic acid construct comprising a nucleotide sequence encoding an ALAS protein comprising a mutation in a first HRM. In some embodiments, the titer of an ALAS protein can be increased by at least 5% (e.g., at least 6%, 7%, 8%, 9%, 10%, 15%, 20%, 25%, 30%, 40%, 50%, 60%, 70%, 80%, 90%, 100%, 120%, 140%, 150%, 160%, 180%, 200%, 220%, 240%, 250%, or more) compared to a corresponding method lacking a nucleic acid construct comprising a nucleotide sequence encoding an ALAS protein comprising a mutation in a first HRM. In some embodiments, the titer of an ALAS protein can be increased by at least 5% (e.g., at least 6%, 7%, 8%, 9%, 10%, 15%, 20%, 25%, 30%, 40%, 50%, 60%, 70%, 80%, 90%, 100%, 120%, 140%, 150%, 160%, 180%, 200%, 220%, 240%, 250%, or more) compared to a corresponding method expressing a nucleic acid encoding an ALAS protein that does not comprise a mutation in a first HRM. In some embodiments, provided herein are methods comprising expressing a first nucleic acid construct comprising a nucleotide sequence encoding an ALAS protein comprising a mutation in a first HRM and a mutation in a second HRM. In some embodiments, the titer of an ALAS protein can be increased by at least 5% (e.g., at least 6%, 7%, 8%, 9%, 10%, 15%, 20%, 25%, 30%, 40%, 50%, 60%, 70%, 80%, 90%, 100%, 120%, 140%, 150%, 160%, 180%, 200%, 220%, 240%, 250%, or more) compared to a corresponding method lacking a nucleic acid construct comprising a nucleotide sequence encoding an ALAS protein comprising a mutation in a first HRM and a mutation in a second HRM. In some embodiments, the titer of an ALAS protein can be increased by at least 5% (e.g., at least 6%, 7%, 8%, 9%, 10%, 15%, 20%, 25%, 30%, 40%, 50%, 60%, 70%, 80%, 90%, 100%, 120%, 140%, 150%, 160%, 180%, 200%, 220%, 240%, 250%, or more) compared to a corresponding method expressing a nucleic acid encoding an ALAS protein that does not comprise a mutation in a first HRM and a mutation in a second HRM.

Provided herein are methods of producing a tetrapyrrole or a derivative thereof. Also provided herein are methods of producing a tetrapyrrole or a derivative thereof using any of the cells (e.g., fungal cells, such as *Aspergillus* cells, *Trichoderma* cells, or yeast cells (e.g., methylotrophic yeast cells)) described herein. Also provided herein are methods of producing a tetrapyrrole or a derivative thereof using any of the nucleic acid constructs described herein. In some embodiments, provided herein are methods of producing a tetrapyrrole or a derivative thereof comprising expressing a first nucleic acid construct comprising a nucleotide sequence encoding an ALAS protein comprising a mutation in a first HRM. In some embodiments, the titer of a tetrapyrrole or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM. In some embodiments, the titer of a tetrapyrrole or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM. In some embodiments, provided herein are methods of producing a tetrapyrrole or a derivative thereof comprising expressing a first nucleic acid construct comprising a nucleotide sequence encoding an ALAS protein comprising a mutation in a first HRM and a second mutation in a second HRM. In some embodiments, the titer of a tetrapyrrole or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM and a mutation in a second HRM. In some embodiments, the titer of a tetrapyrrole or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM and a mutation in a second HRM. In some embodiments, a tetrapyrrole or a derivative thereof is a chlorin (e.g., a chlorophyll) or a derivative thereof. In some embodiments, a tetrapyrrole or a derivative thereof is a precorrin, a co-precorrin, a corrin (e.g., vitamin B12), or a derivative thereof. In some embodiments, a tetrapyrrole or a derivative thereof is a porphyrin or a derivative thereof. In some embodiments, a tetrapyrrole or a derivative thereof is a heme or a derivative thereof. In some embodiments, a tetrapyrrole or a derivative thereof is heme B. In some embodiments, a tetrapyrrole or a derivative thereof is a metabolic product of heme (e.g., bilirubin or a derivative thereof).

Provided herein are methods of producing an intermediate of the heme biosynthesis pathway, a heme (e.g., heme B, heme o, heme a, heme c), a corrin (e.g., Vitamin B12), a chlorophyll, or a derivative thereof. Also provided herein are methods of producing an intermediate of the heme biosynthesis pathway, a heme, a corrin, a chlorophyll, or a derivative thereof using any of the cells (e.g., fungal cells, such as *Aspergillus* cells, *Trichoderma* cells, or yeast cells (e.g., methylotrophic yeast cells)) described herein. Also provided herein are methods of producing an intermediate of the heme biosynthesis pathway, a heme, a corrin, a chlorophyll, or a derivative thereof using any of the nucleic acid constructs described herein. In some embodiments, provided herein are methods of producing an intermediate of the heme biosynthesis pathway, a heme, a corrin, a chlorophyll, or a derivative thereof comprising expressing a first nucleic acid construct comprising a nucleotide sequence encoding an ALAS protein comprising a mutation in a first HRM. In some embodiments, the titer of an intermediate of the heme biosynthesis pathway, a heme, a corrin, a chlorophyll, or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM. In some embodiments, the titer of an intermediate of the heme biosynthesis pathway, a heme, a corrin, a chlorophyll, or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM. In some embodiments, provided herein are methods of producing an intermediate of the heme biosynthesis pathway, a heme, a corrin, a chlorophyll, or a derivative thereof comprising expressing a first nucleic acid construct comprising a nucleotide sequence encoding an ALAS protein comprising a mutation in a first HRM and a mutation in a second HRM. In some embodiments, the titer of an intermediate of the heme biosynthesis pathway, a heme, a corrin, a chlorophyll, or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM and a mutation in a second HRM. In some embodiments, the titer of an intermediate of the heme biosynthesis pathway, a heme, a corrin, a chlorophyll, or a derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM and a mutation in a second HRM. In some embodiments, an intermediate of the heme biosynthesis pathway, a heme, or a derivative thereof is a heme. In some embodiments, an intermediate of the heme biosynthesis pathway, a heme, or a derivative thereof is heme B.

Provided herein are methods of producing a heme (e.g., heme B, heme o, heme a, heme c) or a derivative thereof. Also provided herein are methods of producing a heme or derivative thereof using any of the cells (e.g., fungal cells, such as *Aspergillus* cells, *Trichoderma* cells, or yeast cells (e.g., methylotrophic yeast cells)) described herein. Also provided herein are methods of producing a heme or derivative thereof using any of the nucleic acid constructs described herein. In some embodiments, provided herein are methods of producing a heme or derivative thereof comprising expressing a first nucleic acid construct comprising a nucleotide sequence encoding an ALAS protein comprising a mutation in a first HRM. In some embodiments, the titer of a heme or derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM. In some embodiments, the titer of a heme or derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM. In some embodiments, provided herein are methods of producing a heme or derivative thereof comprising expressing a first nucleic acid construct comprising a nucleotide sequence encoding an ALAS protein comprising a mutation in a first HRM and a mutation in a second HRM. In some embodiments, the titer of a heme or derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method lacking a nucleic acid construct comprising a nucleotide sequence encoding an ALAS protein comprising a mutation in a first HRM and a mutation in a second HRM. In some embodiments, the titer of a heme or derivative thereof can be increased by at least 5% (e.g., at least 10%, 20%, 30%, 40%, 50%, 60%, 70%, 80%, 90%, 100%, 120%, 140%, 150%, 160%, 180%, 200%, 220%, 240%, 250%, 280%, 300%, 320%, 340%, 350%, or more) compared to a corresponding method expressing a nucleic acid encoding an ALAS protein that does not comprise a mutation in a first HRM and a mutation in a second HRM. In some embodiments, a heme or a derivative thereof is heme B.

Provided herein are methods of producing a heme-binding protein. Also provided herein are methods of producing a heme-binding protein using any of the cells (e.g., fungal cells, such as *Aspergillus* cells, *Trichoderma* cells, or yeast cells (e.g., methylotrophic yeast cells)) described herein. Also provided herein are methods of producing a heme-binding protein using any of the nucleic acid constructs described herein. In some embodiments, provided herein are methods comprising expressing a first nucleic acid construct comprising a nucleotide sequence encoding an ALAS protein comprising a mutation in a first HRM and expressing a second nucleic acid construct comprising a nucleotide sequence encoding a heme-binding protein. In some embodiments, provided herein are methods comprising expressing a first nucleic acid construct comprising a nucleotide sequence encoding an ALAS protein comprising a mutation in a first HRM and expressing a second nucleic acid construct comprising a nucleotide sequence encoding a heme-binding protein. In some embodiments, provided herein are methods comprising expressing a first nucleic acid construct comprising a nucleotide sequence encoding an ALAS protein comprising a mutation in a first HRM and a mutation in a second HRM and expressing a second nucleic acid construct comprising a nucleotide sequence encoding a heme-binding protein. In some embodiments, provided herein are methods comprising expressing a first nucleic acid construct comprising a nucleotide sequence encoding an ALAS protein comprising a mutation in a first HRM and a mutation in a second HRM and expressing a second nucleic acid construct comprising a nucleotide sequence encoding a heme-binding protein. In some embodiments of any of the methods described herein, the methods allow for an increase in the titer of a heme-binding protein. In some embodiments, the titer of a heme-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method lacking a nucleic acid construct comprising a nucleotide sequence encoding an ALAS protein comprising a mutation in a first HRM. In some embodiments, the titer of a heme-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method expressing a nucleic acid encoding an ALAS protein that does not comprise a mutation in a first HRM. In some embodiments, the titer of a heme-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method lacking a nucleic acid construct comprising a nucleotide sequence encoding an ALAS protein comprising a mutation in a first HRM and a mutation in a second HRM. In some embodiments, the titer of a heme-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method expressing a nucleic acid encoding an ALAS protein that does not comprise a mutation in a first HRM and a mutation in a second HRM.

Provided herein are methods of producing a tetrapyrrole-binding protein. Also provided herein are methods of producing a tetrapyrrole-binding protein using any of the cells (e.g., fungal cells, such as *Aspergillus* cells, *Trichoderma* cells, or yeast cells (e.g., methylotrophic yeast cells)) described herein. Also provided herein are methods of producing a tetrapyrrole-binding protein using any of the nucleic acid constructs described herein. In some embodiments, provided herein are methods comprising expressing a first nucleic acid construct comprising a nucleotide sequence encoding an ALAS protein comprising a mutation in a first HRM and expressing a second nucleic acid construct comprising a nucleotide sequence encoding a tetrapyrrole-binding protein. In some embodiments, provided herein are methods comprising expressing a first nucleic acid construct comprising a nucleotide sequence encoding an ALAS protein comprising a mutation in a first HRM and expressing a second nucleic acid construct comprising a nucleotide sequence encoding a tetrapyrrole-binding protein. In some embodiments, provided herein are methods comprising expressing a first nucleic acid construct comprising a nucleotide sequence encoding an ALAS protein comprising a mutation in a first HRM and a mutation in a second HRM and expressing a second nucleic acid construct comprising a nucleotide sequence encoding a tetrapyrrole-binding protein. In some embodiments, provided herein are methods comprising expressing a first nucleic acid construct comprising a nucleotide sequence encoding an ALAS protein comprising a mutation in a first HRM and a mutation in a second HRM and expressing a second nucleic acid construct comprising a nucleotide sequence encoding a tetrapyrrole-binding protein. In some embodiments of any of the methods described herein, the methods allow for an increase in the titer of a tetrapyrrole-binding protein. In some embodiments, the titer of a tetrapyrrole-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method lacking a nucleic acid construct comprising a nucleotide sequence encoding an ALAS protein comprising a mutation in a first HRM. In some embodiments, the titer of a tetrapyrrole-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method expressing a nucleic acid encoding an ALAS protein that does not comprise a mutation in a first HRM. In some embodiments, the titer of a tetrapyrrole-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method lacking a nucleic acid construct comprising a nucleotide sequence encoding an ALAS protein comprising a mutation in a first HRM and a mutation in a second HRM. In some embodiments, the titer of a tetrapyrrole-binding protein can be increased by at least 5% (e.g., at least 6%, 7%, 8%, 9%, 10%, 11%, 12%, 13%, 14%, 15%, 16%, 17%, 18%, 19%, 20%, 21%, 22%, 23%, 24%, 25%, 30%, 35%, 40%, 45%, 50%, or more) compared to a corresponding method expressing a nucleic acid encoding an ALAS protein that does not comprise a mutation in a first HRM and a mutation in a second HRM. In some embodiments, a tetrapyrrole is a chlorin (e.g., a chlorophyll) or a derivative thereof. In some embodiments, a tetrapyrrole is a precorrin, a co-precorrin, a corrin (e.g., vitamin B12), or a derivative thereof. In some embodiments, a tetrapyrrole is a porphyrin or a derivative thereof. In some embodiments, a tetrapyrrole is a heme or a derivative thereof. In some embodiments, a tetrapyrrole is heme B. In some embodiments, a tetrapyrrole is a metabolic product of heme (e.g., bilirubin or a derivative thereof).

As used herein, a "corresponding method" is a method that is essentially identical to a reference method in all ways except for the identified difference. For example, a corresponding method expressing a nucleic acid encoding an ALAS protein that does not comprise a mutation in a first HRM and a mutation in a second HRM would be the same in all aspects (e.g., genetic makeup of cell, temperature and time of culture, and so forth), except that the corresponding method would express a nucleic acid encoding an ALAS protein that does not comprise a mutation in a first HRM and a mutation in a second HRM.

Genetically engineering a cell (e.g., fungal cell, such as an *Aspergillus* cell, a *Trichoderma* cell, or a yeast cell (e.g., a methylotrophic yeast cell)) typically includes introducing a recombinant nucleic acid molecule (also called a nucleic acid construct) into the cell. As described herein, a recombinant nucleic acid molecule typically includes an exogenous nucleic acid that encodes a protein (e.g., a protein involved in heme biosynthesis, a heme-binding protein, or a transcription factor) operably linked to at least one promoter element (e.g., an inducible or constitutive promoter element). In some embodiments, a recombinant nucleic acid molecule can include a linear sequence of two or more protein-coding sequences operably linked to the same or separate promoter elements (e.g., a first promoter operably linked to a first nucleic acid encoding a first protein and a second promoter operably linked to a second nucleic acid encoding a second protein, or a promoter operably linked to a first nucleic acid encoding a first protein and a second nucleic acid encoding a second protein). In some cases, a recombinant nucleic acid molecule including at least one promoter operably linked to a nucleotide sequence encoding a protein can be called a cassette.

A recombinant nucleic acid can include expression elements. Expression elements include nucleic acid sequences that direct and regulate expression of nucleic acid coding sequences. One example of an expression element is a promoter sequence. Expression elements also can include introns, enhancer sequences, response elements, or inducible elements that modulate expression of a nucleic acid. Expression elements can be of bacterial, yeast, insect, mammalian, or viral origin, and vectors can contain a combination of elements from different origins.

Nucleic acids can be detected using any number of amplification techniques (sec, e.g., *PCR Primer: A Laboratory Manual*, 1995, Dieffenbach & Dveksler, Eds., Cold Spring Harbor Laboratory Press, Cold Spring Harbor, NY; and U.S. Pat. Nos. 4,683,195; 4,683,202; 4,800,159; and 4,965,188) with an appropriate pair of oligonucleotides (e.g., primers). A number of modifications to the original PCR method have been developed and can be used to detect selected nucleic acids.

Methanol utilization is typically initiated by the conversion of methanol to formaldehyde by the action of alcohol oxidase. *Pichia pastoris* contains two genes for alcohol oxidases, AOX1 and AOX2. Strains with reduced alcohol oxidase activity ("methanol utilization slow" or MutS strains) can produce more of a recombinant protein expressed from the AOX1 promoter than strains that do not have reduced alcohol oxidase activity. Strains mutated in both AOX genes and completely lacking alcohol oxidase activity cannot metabolize methanol, but can still be induced for expression from the AOX1 promoter by methanol. These strains retain the ability to use other carbon sources for growth, but still express heterologous proteins from the AOX1 promoter upon the addition of methanol. Because these strains do not metabolize methanol ("methanol utilization minus" or Mut− strains), much less methanol is required for induction of protein expression, and strains carrying these mutations avoid issues related to methanol feeding in large-scale fermentations. See, for example, Chiruvolu et al., 1997, Enzyme Microb. Technol., 21:277-83.

Suitable transcription factors, and nucleic acids encoding transcription factors (e.g., exogenous nucleic acids encoding transcription factors), include, for example, Mxr1 from a *P. pastoris*. A representative *K. pastoris* Mxr1 nucleic acid sequence can be found, for example, in GenBank Accession No. DQ395124, while a representative *K. pastoris* Mxr1 protein sequence can be found, for example, in GenBank Accession No. ABD57365. In some embodiments, the transcription factor is a Mit1 sequence from *K. phaffii* (see, for example, UniParc Accession No. UPI0001A4D18B). Suitable transcription factors also can be found in *Hansemila polymorpha* (e.g., the Adr1 sequence; see, for example, GenBank Accession No. AEOI02000005, bases 858873 to 862352, for the nucleic acid sequence and GenBank Accession No. ESX01253 for the amino acid sequence) and *Candida boidinii* (e.g., the Trm1 sequence; see, for example, GenBank Accession No. AB365355 for the nucleic acid sequence and GenBank Accession No. BAF99700 for the amino acid sequence; and Trm2 sequence; see, for example, GenBank Accession No. AB548760 for the nucleic acid sequence and GenBank Accession No. BAJ07608 for the amino acid sequence).

Transcription factors such as Mxr1 may be normally expressed at low levels. In some embodiments, it is desirable to place an exogenous nucleic acid (e.g., a transcription factor) under control of a promoter that is inducible.

Methanol-regulated transcription factors in *Pichia* can bind to an AOX1 promoter and act cooperatively with Mxr1 to activate transcription from an AOX1 promoter. In some embodiments, two methanol-regulated transcription factors (e.g., Mxr1 and Mit1) can be operably linked to a methanol inducible promoter element.

There are a number of inducible promoters that can be used when genetically engineering cells (e.g., fungal cells such as *Aspergillus, Trichoderma* cells, or yeast cells (e.g., methylotrophic yeast cells)). Suitable methanol inducible promoters include pAOX1, (e.g., a pAOX1 such as the promoter for *K. pastoris* AOX1 (see, for example, the promoter for GenBank Accession No. U96967.1) or a promoter described in U.S. Provisional Patent Application No. 62/835,338, filed Apr. 17, 2019, incorporated herein by reference in its entirety), as well as other methanol-inducible promoters, or promoter elements therefrom. These include, without limitation, a pAOX2 promoter (e.g., from *K. phaffii* or *K. pastoris* (see, for example, GenBank Accession No. X79871.1)), an alcohol oxidase (AOD1) promoter from, e.g., *Candida boidinii* (see, for example, GenBank Accession No. E06147.1), the alcohol oxidase (MOX) promoter from *Hansenula polymorpha* (see, for example, GenBank Accession No. AJ313360.1), the MOD1 or MOD2 promoter from *Pichia methanolica* (see, for example, Raymond et al., 1998, Yeast, 14:11-23; and Nakagawa et al., 1999, Yeast, 15:1223-30), the DHAS promoter from *P. pastoris* (see, for example, the promoter for GenBank Accession No. FJ752551) or a promoter element therefrom, the formaldehyde dehydrogenase (FLD1) promoter from *K. pastoris* (see, for example, GenBank Accession No. KJ755994.1), or the PEX8 promoter from *P. pastoris* (see, for example, Kranthi et al., 2010, Yeast, 27:705-11). Typically, these promoters can be induced by methanol. Suitable constitutive promoters and constitutive promoter elements include, without limitation, the *P. pastoris* promoter (or a portion thereof) from the transcriptional elongation factor EF-1α gene (TEF1), which is strongly transcribed in a constitutive manner. Other suitable constitutive promoters (or promoter elements therefrom) also can be used, including, without limitation, the glyceraldehyde-3-phosphate dehydrogenase (GAPDH) promoter from *K. pastoris* (see, for example, the promoter for GenBank Accession No. U62648.1), the promoter from the potential glycosyl phosphatidyl inositol (GPI)-anchored protein, GCW14p (PAS_chr1-4_0586) from *K. phaffii* (see, for example, the promoter for GenBank Accession No. XM_002490678), and the promoter from the 3-phosphoglycerate kinase gene (PGK1) from *K. pastoris* (see, for example, GenBank Accession No. AY288296). It will be appreciated that a choice of promoter may be influenced by the expression system. For example, for expression in *K. phaffii*, a *K. phaffii* promoter might be chosen, while for expression in *C. boidinii*, a *C. boidinii* promoter might be chosen. However, in some cases, a promoter from one organism (e.g., *K. phaffii*) may be appropriate to be used in another organism (e.g., *C. boidinii* or *K. pastoris*). Further, it is noted that a combination of inducible (e.g., methanol-inducible) and constitutive promoters (or promoter elements therefrom) can be combined to further increase the expression of any of the nucleic acids operably linked thereto.

Any of the encoded proteins as described herein can be operably linked to an inducible promoter element (e.g., a methanol-inducible promoter element) or a constitutive promoter element. Inducible promoters and elements therefrom are discussed above. Constitutive promoters and constitutive promoter elements are known in the art. For example, a commonly used constitutive promoter from *P. pastoris* is the promoter, or a portion thereof, from the transcriptional elongation factor EF-1α gene (TEF1), which is strongly transcribed in a constitutive manner. Other constitutive promoters, or promoter elements therefrom, however, can be used, including, without limitation, the glyceraldehyde-3-phosphate dehydrogenase (GAPDH) promoter from *K. pastoris* (see, for example, the promoter for GenBank Accession No. U62648.1), the promoter from the potential glycosyl phosphatidyl inositol (GPI)-anchored protein, GCW14p (PAS_chr1-4_0586), from *K. phaffii* (see, for example, the promoter for GenBank Accession No. XM_002490678), or the promoter from the 3-phosphoglycerate kinase gene (PGK1) from *K. pastoris* (see, for example, the promoter for GenBank Accession No. AY288296).

In some embodiments, any of the cells (e.g., fungal cell, such as an *Aspergillus* cell, a *Trichoderma* cell, or a yeast cell (e.g., a methylotrophic yeast cell)) herein can further include a third nucleic acid construct comprising a nucleotide sequence encoding a third protein operably linked to the first promoter element, the second promoter element, or a third promoter element. In some embodiments, any of the cells (e.g., fungal cell, such as an *Aspergillus* cell, a *Trichoderma* cell, or a yeast cell (e.g., a methylotrophic yeast cell)) herein can further include a fourth nucleic acid construct comprising a nucleotide sequence encoding a fourth protein operably linked to the first promoter element, the second promoter element, the third promoter element, or a fourth promoter element. In some embodiments, the third protein can be a transcription factor. In some embodiments, the fourth protein can be a transcription factor. In some embodiments, any of the promoter elements herein (e.g., a first promoter element, a second promoter element, a third promoter element, or a fourth promoter element) can contain one or more recognition sequences for a transcription factor. Therefore, in some embodiments, a feedback loop may be constructed such that the transcription factor drives the expression of additional copies of the transcription factor, as well as the expression of one or more of an ALAS and a heme-binding protein. In some embodiments, a transcription factor can be Mxr1 (see, e.g., U.S. Pat. No. 9,938,327, which is incorporated by reference in its entirety). In some embodiments, a third protein can be a protein involved in heme biosynthesis. In some embodiments, a fourth protein can be a protein involved in heme biosynthesis. In some embodiments, a protein involved in heme biosynthesis can be selected from the group consisting of δ-aminolevulinic acid dehydratase (ALAD), porphobilinogen deaminase (PBGD), uroporphyrinogen III synthase (UPG3S), uroporphyrinogen III decarboxylase (UPG3D), coproporphyrinogen oxidase (COPROX), protoporphyrinogen IX oxidase (PROTOX), and/or ferrochelatase (FC). In some embodiments, a protein involved in heme biosynthesis can be selected from the group consisting of δ-aminolevulinic acid dehydratase (ALAD), porphobilinogen deaminase (PBGD), uroporphyrinogen III synthase (UPG3S), uroporphyrinogen III decarboxylase (UPG3D), coproporphyrinogen oxidase (COPROX), and/or protoporphyrinogen IX oxidase (PROTOX).

Previous studies in *Saccharomyces cerevisiae* identified ALA dehydratase and porphobilinogen deaminase as rate limiting enzymes in heme biosynthesis (see, for example, Hoffman et al., 2003, Biochem. Biophys. Res. Commun., 310(4):1247-53). However, heterologous expression of individual heme enzymes in *P. pastoris* from the glyceraldehyde-3-phosphate dehydrogenase (GAP) promoter failed to overcome limitations associated with the expression of a recombinant protein containing a heme (see Krainer et al., 2015, Microb. Cell Fact., 13; 14:4). Expression of a recombinant heme containing protein in *P. pastoris* can be achieved by co-expressing one or more enzymes of the heme biosynthetic pathway from methanol-inducible promoters, although it would be appreciated that one or more of the genes involved in the heme biosynthetic pathway could be expressed from one or more constitutive promoters (see, e.g., U.S. Pat. No. 9,938,327, which is incorporated by reference in its entirety).

In addition, it is noted that a first nucleic acid encoding a first protein (e.g., an ALAS protein) operably linked to a promoter element as described herein can be physically separate from a second nucleic acid encoding a second protein (e.g., a heme-binding protein) operably linked to a promoter element (that is, the first and second nucleic acids can be completely separate molecules). Alternatively, a first nucleic acid encoding a first protein operably linked to a promoter element and a second nucleic acid encoding a second protein operably linked to a promoter element can be included in the same nucleic acid construct. In some embodiments, a first nucleic acid encoding a first protein operably linked to a promoter element can be contiguous with a second nucleic acid encoding a second protein operably linked to a promoter element. It would be appreciated by a skilled artisan that, if the second nucleic acid molecule encoding a second protein is contiguous with the first nucleic acid encoding a protein of interest, a single promoter, or promoter element therefrom, can be used to drive transcription of both or all of the genes (e.g., the nucleic acid encoding the first protein as well as the second protein).

Methods of introducing nucleic acids into cells (e.g., fungal cells, such as *Aspergillus* cells, *Trichoderma* cells, or yeast cells (e.g., methylotrophic yeast cells)) are known in the art, and include, without limitation, transduction, electroporation, biolistic particle delivery, and chemical transformation.

In addition, methods of culturing cells (e.g., fungal cells, such as *Aspergillus* cells, *Trichoderma* cells, or yeast cells (e.g., methylotrophic yeast cells)) are known in the art. See, for example, *Pichia* Protocols, *Methods In Molecular Biology*, 389, Cregg, Ed., 2007, $2^{nd}$ Ed., Humana Press, Inc. Under some circumstances, it may be desirable to introduce or add methanol to the culture media, although, as demonstrated herein, methanol is not required to obtain efficient expression at high levels of one or more proteins of interest. Under some circumstances (e.g., when one or more nucleic acids encoding enzyme(s) involved in heme biosynthesis are expressed), it may be desirable to supplement the culture media with iron or a pharmaceutically or metabolically acceptable (or GRAS) salt thereof.

The recombinant nucleic acid molecules described herein can be stably integrated into the genome of the cell (e.g., the fungal cell, such as *Aspergillus* cell, *Trichoderma* cell, or yeast cell (e.g., the methylotrophic yeast cell)), or can be extrachromosomally expressed from a replication-competent plasmid. Methods of achieving both are known and used in the art.

The methods provided herein also can include purifying the expressed protein. As used herein, an "enriched" protein is a protein that accounts for at least 5% (e.g., at least 6%, 7%, 8%, 9%, 10%, 15%, 20%, 25%, 30%, 35%, 40%, 45%, 50%, 55%, 60%, or more) by dry weight, of the mass of the production cell (e.g., fungal cell, such as *Aspergillus* cell, *Trichoderma* cell, or yeast cell (e.g., methylotrophic yeast cell)), or at least 10% (e.g., at least 15%, 20%, 25%, 30%, 35%, 40%, 45%, 50%, 55%, 60%, 65%, 70%, 75%, 80%, 90%, 95%, or 99%) by dry weight, the mass of the production cell lysate (e.g., excluding cell wall or membrane material). As used herein, a "purified" protein is a protein that has been separated or purified from cellular components that naturally accompany it. Typically, the protein is considered "purified" when it is at least 60% (e.g., at least 65%, 70% 75%, 80%, 85%, 90%, 95%, or 99%) by dry weight, free from the proteins and naturally occurring molecules with which it is naturally associated.

As used herein, nucleic acids can include DNA and RNA, and includes nucleic acids that contain one or more nucleotide analogs or backbone modifications. A nucleic acid can be single stranded or double stranded, which usually depends upon its intended use. Also provided are nucleic acids and polypeptides that differ from a given sequence. Nucleic acids and polypeptides can have at least 50% sequence identity (e.g., at least 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99% sequence identity) to a given nucleic acid or polypeptide sequence.

In calculating percent sequence identity, two sequences are aligned and the number of identical matches of nucleotides or amino acid residues between the two sequences is determined. The number of identical matches is divided by the length of the aligned region (i.e., the number of aligned nucleotides or amino acid residues) and multiplied by 100 to arrive at a percent sequence identity value. It will be appreciated that the length of the aligned region can be a portion of one or both sequences up to the full-length size of the shortest sequence. It also will be appreciated that a single sequence can align with more than one other sequence and hence, can have different percent sequence identity values over each aligned region.

The alignment of two or more sequences to determine percent sequence identity can be performed using the computer program ClustalW and default parameters, which allows alignments of nucleic acid or polypeptide sequences to be carried out across their entire length (global alignment). Chenna et al., 2003, *Nucleic Acids Res.,* 31(13): 3497-500. ClustalW calculates the best match between a query and one or more subject sequences, and aligns them so that identities, similarities and differences can be determined. Gaps of one or more residues can be inserted into a query sequence, a subject sequence, or both, to maximize sequence alignments. For fast pairwise alignment of nucleic acid sequences, the default parameters can be used (i.e., word size: 2; window size: 4; scoring method: percentage; number of top diagonals: 4; and gap penalty: 5); for an alignment of multiple nucleic acid sequences, the following parameters can be used: gap opening penalty: 10.0; gap extension penalty: 5.0; and weight transitions: yes. For fast pairwise alignment of polypeptide sequences, the following parameters can be used: word size: 1; window size: 5;

scoring method: percentage; number of top diagonals: 5; and gap penalty: 3. For multiple alignment of polypeptide sequences, the following parameters can be used: weight matrix: blosum; gap opening penalty: 10.0; gap extension penalty: 0.05; hydrophilic gaps: on; hydrophilic residues: Gly, Pro, Ser, Asn, Asp, Gln, Glu, Arg, and Lys; and residue-specific gap penalties: on. ClustalW can be run, for example, at the Baylor College of Medicine Search Launcher website or at the European Bioinformatics Institute website on the World Wide Web.

Changes can be introduced into a nucleic acid molecule, thereby leading to changes in the amino acid sequence of the encoded polypeptide. For example, changes can be introduced into nucleic acid coding sequences using mutagenesis (e.g., site-directed mutagenesis, PCR-mediated mutagenesis, transposon mutagenesis, chemical mutagenesis, UV mutagenesis or radiation induced mutagenesis) or by chemically synthesizing a nucleic acid molecule having such changes. Such nucleic acid changes can lead to conservative and/or non-conservative amino acid substitutions at one or more amino acid residues. A "conservative amino acid substitution" is one in which one amino acid residue is replaced with a different amino acid residue having a similar side chain (see, for example, Dayhoff et al., 1978, *Atlas of Protein Sequence and Structure,* 5(Suppl. 3):345-352, which provides frequency tables for amino acid substitutions), and a non-conservative substitution is one in which an amino acid residue is replaced with an amino acid residue that does not have a similar side chain. Nucleic acid and/or polypeptide sequences may be modified as described herein to improve one or more properties such as, without limitation, increased expression (e.g., transcription and/or translation), tighter regulation, deregulation, loss of catabolite repression, modified specificity, secretion, thermostability, solvent stability, oxidative stability, protease resistance, catalytic activity, and/or color.

As used herein, an "isolated" nucleic acid molecule is a nucleic acid molecule that is free of sequences that naturally flank one or both ends of the nucleic acid in the genome of the organism from which the isolated nucleic acid molecule is derived (e.g., a cDNA or genomic DNA fragment produced by PCR or restriction endonuclease digestion). Such an isolated nucleic acid molecule is generally introduced into a vector (e.g., a cloning vector, or an expression vector) for convenience of manipulation or to generate a fusion nucleic acid molecule, discussed in more detail below. In addition, an isolated nucleic acid molecule can include an engineered nucleic acid molecule such as a recombinant or a synthetic nucleic acid molecule.

Vectors as described herein can be introduced into a host cell (e.g., fungal cell, such as an *Aspergillus* cell, a *Trichoderma* cell, or a yeast cell (e.g., a methylotrophic yeast cell)). As used herein, "host cell" refers to the particular cell into which the nucleic acid is introduced and also includes the progeny of such a cell that carry the vector. A host cell can be any prokaryotic or eukaryotic cell. For example, nucleic acids can be expressed in bacterial cells such as *E. coli*, or in insect cells, yeast or mammalian cells (such as Chinese hamster ovary cells (CHO) or COS cells). Other suitable host cells are known to those skilled in the art. Many methods for introducing nucleic acids into host cells, both in vivo and in vitro, are well known to those skilled in the art and include, without limitation, electroporation, calcium phosphate precipitation, polyethylene glycol (PEG) transformation, heat shock, lipofection, microinjection, and viral-mediated nucleic acid transfer.

Nucleic acids can be isolated using techniques routine in the art. For example, nucleic acids can be isolated using any method including, without limitation, recombinant nucleic acid technology, and/or the polymerase chain reaction (PCR). General PCR techniques are described, for example in *PCR Primer: A Laboratory Manual*, Dieffenbach & Dveksler, Eds., Cold Spring Harbor Laboratory Press, 1995. Recombinant nucleic acid techniques include, for example, restriction enzyme digestion and ligation, which can be used to isolate a nucleic acid. Isolated nucleic acids also can be chemically synthesized, either as a single nucleic acid molecule or as a series of oligonucleotides.

Polypeptides can be purified from natural sources (e.g., a biological sample) by known methods such as DEAE ion exchange, gel filtration, and hydroxyapatite chromatography. A polypeptide also can be purified, for example, by expressing a nucleic acid in an expression vector. In addition, a purified polypeptide can be obtained by chemical synthesis. The extent of purity of a polypeptide can be measured using any appropriate method, e.g., column chromatography, polyacrylamide gel electrophoresis, or HPLC analysis.

A construct or vector containing a nucleic acid (e.g., a nucleic acid that encodes a polypeptide) also is provided. Constructs or vectors, including expression constructs or vectors, are commercially available or can be produced by recombinant DNA techniques routine in the art. A construct or vector containing a nucleic acid can have expression elements operably linked to such a nucleic acid, and further can include sequences such as those encoding a selectable marker (e.g., an antibiotic resistance gene). A construct or vector containing a nucleic acid can encode a chimeric or fusion polypeptide (i.e., a polypeptide operatively linked to a heterologous polypeptide, which can be at either the N-terminus or C-terminus of the polypeptide). Representative heterologous polypeptides include those that can be used in purification of the encoded polypeptide (e.g., 6×His tag, glutathione S-transferase (GST)).

Nucleic acids also can be detected using hybridization. Hybridization between nucleic acids is discussed in detail in Sambrook et al. (1989, *Molecular Cloning: A Laboratory Manual,* 2nd Ed., Cold Spring Harbor Laboratory Press, Cold Spring Harbor, NY; Sections 7.37-7.57, 9.47-9.57, 11.7-11.8, and 11.45-11.57). Sambrook et al. discloses suitable Southern blot conditions for oligonucleotide probes less than about 100 nucleotides (Sections 11.45-11.46). The Tm between a sequence that is less than 100 nucleotides in length and a second sequence can be calculated using the formula provided in Section 11.46. Sambrook et al. additionally discloses Southern blot conditions for oligonucleotide probes greater than about 100 nucleotides (see Sections 9.47-9.54). The Tm between a sequence greater than 100 nucleotides in length and a second sequence can be calculated using the formula provided in Sections 9.50-9.51 of Sambrook et al.

The conditions under which membranes containing nucleic acids are prehybridized and hybridized, as well as the conditions under which membranes containing nucleic acids are washed to remove excess and non-specifically bound probe, can play a significant role in the stringency of the hybridization. Such hybridizations and washes can be performed, where appropriate, under moderate or high stringency conditions. For example, washing conditions can be made more stringent by decreasing the salt concentration in the wash solutions and/or by increasing the temperature at which the washes are performed. Simply by way of example, high stringency conditions typically include a wash of the membranes in 0.2×SSC at 65° C.

In addition, interpreting the amount of hybridization can be affected, for example, by the specific activity of the labeled oligonucleotide probe, by the number of probe-binding sites on the template nucleic acid to which the probe has hybridized, and by the amount of exposure of an autoradiograph or other detection medium. It will be readily appreciated by those of ordinary skill in the art that although any number of hybridization and washing conditions can be used to examine hybridization of a probe nucleic acid molecule to immobilized target nucleic acids, it is more important to examine hybridization of a probe to target nucleic acids under identical hybridization, washing, and exposure conditions. Preferably, the target nucleic acids are on the same membrane.

A nucleic acid molecule is deemed to hybridize to a nucleic acid but not to another nucleic acid if hybridization to a nucleic acid is at least 5-fold (e.g., at least 6-fold, 7-fold, 8-fold, 9-fold, 10-fold, 20-fold, 50-fold, or 100-fold) greater than hybridization to another nucleic acid. The amount of hybridization can be quantitated directly on a membrane or from an autoradiograph using, for example, a PhosphorImager or a Densitometer (Molecular Dynamics, Sunnyvale, CA).

Polypeptides can be detected using antibodies. Techniques for detecting polypeptides using antibodies include enzyme linked immunosorbent assays (ELISAs), Western blots, immunoprecipitations and immunofluorescence. An antibody can be polyclonal or monoclonal. An antibody having specific binding affinity for a polypeptide can be generated using methods well known in the art. The antibody can be attached to a solid support such as a microtiter plate using methods known in the art. In the presence of a polypeptide, an antibody-polypeptide complex is formed.

Detection (e.g., of an amplification product, a hybridization complex, or a polypeptide) is usually accomplished using detectable labels. The term "label" is intended to encompass the use of direct labels as well as indirect labels. Detectable labels include enzymes, prosthetic groups, fluorescent materials, luminescent materials, bioluminescent materials, and radioactive materials.

Methods are described herein that can be used to generate a strain that lacks sequences for selection (i.e., that lacks a selectable marker). These methods include using a circular plasmid DNA vector and a linear DNA sequence; the circular plasmid DNA vector contains a selection marker and an origin of DNA replication (also known as an autonomously replicating sequence (ARS)), and the linear DNA sequence contains sequences for integration into the genome (e.g., the *Pichia* genome) by homologous recombination. The linear DNA molecule additionally can include nucleic acid sequences encoding one or more proteins of interest such as, without limitation, an ALAS, a heme-binding protein, or a third protein (e.g., a transcription factor or a protein involved in heme biosynthesis).

Cells (e.g., *Pichia* cells) can be transformed with both DNA molecules and the transformants selected by the presence of the selectable marker on the circular plasmid. Transformants then can be screened for integration of the linear DNA molecule into the genome using, for example, PCR. Once transformants with the correct integration of the marker-free linear DNA molecule are identified, the cells can be grown in the absence of selection for the circular plasmid. Because the marker-bearing plasmid is not stably maintained in the absence of selection, the plasmid is lost, often very quickly, after selection is relaxed. The resulting strain carries the integrated linear DNA in the absence of heterologous sequences for selection. Therefore, this approach can be used to construct strains (e.g., *Pichia* strains) that lack a selectable marker (e.g., a heterologous selection marker) with little to no impact on recombinant protein yield.

In accordance with the present disclosure, there may be employed conventional molecular biology, microbiology, biochemical, and recombinant DNA techniques within the skill of the art. Such techniques are explained fully in the literature. The materials and methods of the disclosure will be further described in the following examples, which do not limit the scope of the methods and compositions of matter described in the claims.

The materials and methods of the disclosure will be further described in the following examples, which do not limit the scope the claims.

EXEMPLARY EMBODIMENTS

Embodiment 1 is a cell comprising:
  a first exogenous nucleic acid construct comprising a nucleotide sequence encoding an aminolevulinate synthase (ALAS) protein operably linked to a first promoter element, wherein the ALAS comprises at least a first heme responsive motif (HRM), and wherein the ALAS comprises a mutation in the first HRM; and
  a second exogenous nucleic acid construct comprising a nucleotide sequence encoding a heme-binding protein,
wherein the second exogenous nucleic acid construct comprising a nucleotide sequence encoding the heme-binding protein is operably linked to the first promoter element or is operably linked to a second promoter element.

Embodiment 2 is the cell of embodiment 1, wherein the cell is a fungal cell.

Embodiment 3 is the cell of embodiment 2, wherein the cell is an *Aspergillus* or *Trichoderma* cell.

Embodiment 4 is the cell of any one of embodiments 1-3, wherein the cell is a yeast cell.

Embodiment 5 is the cell of embodiment 4, wherein the yeast cell is a methylotrophic yeast cell.

Embodiment 6 is the cell of embodiment 5, wherein the methylotrophic yeast cell is a *Pichia* cell, a *Candida* cell, a *Hansenula* cell, or a *Torulopsis* cell.

Embodiment 7 is the cell of any one of embodiments 5-6, wherein the methylotrophic yeast cell is a *Pichia methanolica* cell, a *Pichia pastoris* cell, a *Candida boidinii* cell, or a *Hansenula polymorpha* cell.

Embodiment 8 is the cell of any one of embodiments 5-7, wherein the methylotrophic yeast cell is a *Pichia pastoris* cell.

Embodiment 9 is the cell of any one of embodiments 1-8, wherein the mutation in the first HRM is a mutation from a cysteine to a different amino acid.

Embodiment 10 is the cell of any one of embodiments 1-9, wherein the ALAS protein comprises a second HRM, and wherein the ALAS protein comprises a mutation in the second HRM.

Embodiment 11 is the cell of embodiment 10, wherein the mutation in the second HRM is a mutation from a cysteine to a different amino acid.

Embodiment 12 is the cell of embodiment 10 or embodiment 11, wherein the different amino acid is the same for the mutation in the first HRM and the mutation in the second HRM.

Embodiment 13 is the cell of embodiment 10 or embodiment 11, wherein the different amino acid is not the same for the mutation in the first HRM and the mutation in the second HRM.

Embodiment 14 is the cell of any one of embodiments 10-13, wherein the ALAS protein comprises a third HRM, and wherein the ALAS protein comprises a mutation in the third HRM.

Embodiment 15 is the cell of embodiment 14, wherein the mutation in the third HRM is a mutation from a cysteine to a different amino acid.

Embodiment 16 is the cell of embodiment 15, wherein the different amino acid is the same for the mutation in the first HRM, the mutation in the second HRM, and the mutation in the third HRM.

Embodiment 17 is the cell of any one of embodiments 9-16, wherein the different amino acid is selected from the group consisting of arginine, histidine, lysine, serine, threonine, asparagine, glutamine, selenocysteine, glycine, proline, alanine, isoleucine, leucine, methionine, glutamic acid, aspartic acid, phenylalanine, tryptophan, tyrosine, and valine.

Embodiment 18 is the cell of any one of embodiments 9-16, wherein the different amino acid is selected from a nonpolar aliphatic amino acid, an aromatic amino acid, a polar uncharged amino acid, or a positively charged amino acid.

Embodiment 19 is the cell of embodiment 18, wherein the nonpolar aliphatic amino acid is selected from the group consisting of glycine, proline, alanine, isoleucine, leucine, methionine, and valine.

Embodiment 20 is the cell of embodiment 18, wherein the aromatic amino acid is selected from the group consisting of phenylalanine, tryptophan, and tyrosine.

Embodiment 21 is the cell of embodiment 18, wherein the polar uncharged amino acid is selected from the group consisting of a polar uncharged amino acid serine, threonine, asparagine, or glutamine.

Embodiment 22 is the cell of embodiment 18, wherein the positively charged amino acid is selected from the group consisting of arginine, histidine, and lysine.

Embodiment 23 is the cell of any one of embodiments 9-22, wherein the different amino acid is serine.

Embodiment 24 is the cell of any one of embodiments 9-22, wherein the different amino acid is alanine.

Embodiment 25 is the cell of any one of embodiments 9-22, wherein the different amino acid is phenylalanine.

Embodiment 26 is the cell of any one of embodiments 9-22, wherein the different amino acid is histidine.

Embodiment 27 is the cell of any one of embodiments 1-26, wherein the first HRM is HRM1.

Embodiment 28 is the cell of any one of embodiments 10-27, wherein the second HRM is HRM2.

Embodiment 29 is the cell of any one of embodiments 1-26, wherein the first HRM is HRM2.

Embodiment 30 is the cell of any one of embodiments 10-27, wherein the second HRM is HRM1.

Embodiment 31 is the cell of any one of embodiments 1-30, wherein the first exogenous nucleic acid construct comprises a nucleic acid sequence having at least 90% sequence identity to the nucleic acid sequence in SEQ ID NO: 28.

Embodiment 32 is the cell of any one of embodiments 1-30, wherein the first exogenous nucleic acid construct comprises a nucleic acid sequence having at least 95% sequence identity to the nucleic acid sequence in SEQ ID NO: 28.

Embodiment 33 is the cell of any one of embodiments 1-30, wherein the first exogenous nucleic acid construct comprises the nucleic acid sequence in SEQ ID NO: 30.

Embodiment 34 is the cell of any one of embodiments 1-32, wherein the ALAS protein comprises an amino acid sequence having at least 90% sequence identity to the amino acid sequence in SEQ ID NO: 29.

Embodiment 35 is the cell of any one of embodiments 1-32, wherein the ALAS protein comprises an amino acid sequence having at least 95% sequence identity to the amino acid sequence in SEQ ID NO: 29.

Embodiment 36 is the cell of any one of embodiments 1-35, wherein the ALAS protein comprises the amino acid sequence in SEQ ID NO: 31.

Embodiment 37 is the cell of any one of embodiments 1-36, wherein the heme-binding protein is selected from the group consisting of a globin, a cytochrome, a cytochrome c oxidase, a ligninase, a catalase, and a peroxidase.

Embodiment 38 is the cell of any one of embodiments 1-36, wherein the heme-binding protein is selected from the group consisting of an androglobin, a chlorocruorin, a cytoglobin, an erythrocruorin, a flavohemoglobin, a globin E, a globin X, a globin Y, a hemoglobin, a histoglobin, a leghemoglobin, a myoglobin, a neuroglobin, a non-symbiotic hemoglobin, a protoglobin, and a truncated hemoglobin.

Embodiment 39 is the cell of any one of embodiments 1-36, wherein the heme-binding protein is a non-symbiotic hemoglobin.

Embodiment 40 is the cell of any one of embodiments 1-36, wherein the heme-binding protein is a leghemoglobin.

Embodiment 41 is the cell of any one of embodiments 1-40, wherein the heme-binding protein comprises an amino acid sequence having at least 90% sequence identity to an amino acid sequence in any one of SEQ ID NOs: 1-27.

Embodiment 42 is the cell of any one of embodiments 1-41, further comprising a third nucleic acid construct comprising a nucleotide sequence encoding a transcription factor, wherein the third nucleic acid construct is operably linked to the first promoter element, the second promoter element, or a third promoter element.

Embodiment 43 is the cell of embodiment 42, wherein the first promoter element comprises a recognition sequence for the transcription factor.

Embodiment 44 is the cell of any one of embodiments 42 or 43, wherein the second exogenous nucleic acid construct is operably linked to a second promoter element, and wherein the second promoter element comprises a recognition sequence for the transcription factor.

Embodiment 45 is the cell any one of embodiments 42 or 43, wherein the third nucleic acid construct is operably linked to the third promoter element, and wherein the third promoter element comprises a recognition sequence for the transcription factor.

Embodiment 46 is the cell of any one of embodiments 1-45, further comprising a fourth nucleic acid construct comprising a nucleotide sequence encoding a protein involved in heme biosynthesis, wherein the fourth nucleic acid construct is operably linked to the first promoter element, the second promoter element, the third promoter element, or a fourth promoter element.

Embodiment 47 is the cell of embodiment 46, wherein the protein involved in heme biosynthesis is selected from the group consisting of ALA dehydratase, porphobilinogen deaminase, UPG III synthase, UPG III decarboxylase, CPG oxidase, PPG oxidase, and ferrochelatase.

Embodiment 48 is the cell of any one of embodiments 1-47, wherein the first exogenous nucleic acid construct is a heterologous nucleic acid construct.

Embodiment 49 is the cell of any one of embodiments 1-48, wherein the second exogenous nucleic acid construct is a heterologous nucleic acid construct.

Embodiment 50 is the cell of any one of embodiments 1-47, wherein the heme-binding protein is an exogenous heme-binding protein.

Embodiment 51 is the cell of any one of embodiments 1-47 or 50, wherein the heme-binding protein is a heterologous heme-binding protein.

Embodiment 52 is a method of producing a heme-binding protein in a cell comprising:
  expressing a first exogenous nucleic acid construct comprising a nucleotide sequence encoding an aminolevulinate synthase (ALAS) protein operably linked to a first promoter element, wherein the ALAS comprises at least a first heme responsive motif (HRM), and wherein the ALAS comprises a mutation in the first HRM; and
  expressing a second exogenous nucleic acid construct comprising a nucleotide sequence encoding a heme-binding protein,
wherein the second exogenous nucleic acid construct comprising a nucleotide sequence encoding the heme-binding protein is operably linked to the first promoter element or is operably linked to a second promoter element.

Embodiment 53 is the method of 52, wherein the method produces the heme-binding protein in a titer that is at least 5% greater than a corresponding method lacking the first exogenous nucleic acid construct.

Embodiment 54 is the method of embodiment 52 or embodiment 53, wherein the method produces the heme-binding protein in a titer that is at least 10% greater than a corresponding method lacking the first exogenous nucleic acid construct.

Embodiment 55 is the method of embodiment 52 or embodiment 53, wherein the method produces the heme-binding protein in a titer that is at least 15% greater than a corresponding method lacking the first exogenous nucleic acid construct.

Embodiment 56 is the method of embodiment 52 or embodiment 53, wherein the method produces the heme-binding protein in a titer that is at least 20% greater than a corresponding method lacking the first exogenous nucleic acid construct.

Embodiment 57 is the method of embodiment 52, wherein the method produces the heme-binding protein in a titer that is at least 5% greater than a corresponding method lacking the mutation in the first HRM.

Embodiment 58 is the method of embodiment 52, wherein the method produces the heme-binding protein in a titer that is at least 10% greater than a corresponding method lacking the mutation in the first HRM.

Embodiment 59 is the method of embodiment 52, wherein the method produces the heme-binding protein in a titer that is at least 15% greater than a corresponding method lacking the mutation in the first HRM.

Embodiment 60 is the method of embodiment 52, wherein the method produces the heme-binding protein in a titer that is at least 20% greater than a corresponding method lacking the mutation in the first HRM.

Embodiment 61 is the method of any one of embodiments 52-60, wherein the method is carried out in the absence of added methanol.

Embodiment 62 is the method of any one of embodiments 52-61, wherein the cell is a fungal cell.

Embodiment 63 is the method of embodiment 62, wherein the cell is an *Aspergillus* or *Trichoderma* cell Embodiment 64 is the method of any one of embodiments 62-63, wherein the cell is a yeast cell.

Embodiment 65 is the method of embodiment 64, wherein the yeast cell is a methylotrophic yeast cell.

Embodiment 66 is the method of embodiment 65, wherein the methylotrophic yeast cell is a *Pichia* cell, a *Candida* cell, a *Hansenula* cell, or a *Torulopsis* cell.

Embodiment 67 is the method of any one of embodiments 65-66, wherein the methylotrophic yeast cell is a *Pichia methanolica* cell, a *Pichia pastoris* cell, a *Candida boidinii* cell, or a *Hansenula polymorpha* cell.

Embodiment 68 is the method of any one of embodiments 51-53, wherein the methylotrophic yeast cell is a *Pichia pastoris* cell.

Embodiment 69 is the method of any one of embodiments 52-68, wherein the mutation in the first HRM is a mutation from a cysteine to a different amino acid.

Embodiment 70 is the method of any one of embodiments 52-69, wherein the ALAS protein comprises a second HRM, and wherein the ALAS protein comprises a mutation in the second HRM.

Embodiment 71 is the method of embodiment 70, wherein the method produces the heme-binding protein in a titer that is at least 5% greater than a corresponding method lacking the mutations in the first HRM and second HRM.

Embodiment 72 is the method of embodiment 70, wherein the method produces the heme-binding protein in a titer that is at least 10% greater than a corresponding method lacking the mutations in the first HRM and second HRM.

Embodiment 73 is the method of embodiment 70, wherein the method produces the heme-binding protein in a titer that is at least 15% greater than a corresponding method lacking the mutations in the first HRM and second HRM.

Embodiment 74 is the method of embodiment 70, wherein the method produces the heme-binding protein in a titer that is at least 20% greater than a corresponding method lacking the mutations in the first HRM and second HRM.

Embodiment 75 is the method of any one of embodiments 70-74, wherein the mutation in the second HRM is a mutation from a cysteine to a different amino acid.

Embodiment 76 is the method of any one of embodiments 70-75, wherein the different amino acid is the same for the mutation in the first HRM and the mutation in the second HRM.

Embodiment 77 is the method of any one of embodiments 70-75, wherein the different amino acid is not the same for the mutation in the first HRM and the mutation in the second HRM.

Embodiment 78 is the cell of any one of embodiments 70-77, wherein the ALAS protein comprises a third HRM, and wherein the ALAS protein comprises a mutation in the third HRM.

Embodiment 79 is the cell of embodiment 78, wherein the mutation in the third HRM is a mutation from a cysteine to a different amino acid.

Embodiment 80 is the cell of embodiment 79, wherein the different amino acid is the same for the mutation in the first HRM, the mutation in the second HRM, and the mutation in the third HRM.

Embodiment 81 is the method any one of embodiments 69-80, wherein the different amino acid is selected from the group consisting of arginine, histidine, lysine, serine, threonine, asparagine, glutamine, selenocysteine, glycine, proline, alanine, isoleucine, leucine, methionine, aspartic acid, glutamic acid, phenylalanine, tryptophan, tyrosine, and valine.

Embodiment 82 is the method of any one of embodiments 69-80, wherein the different amino acid is selected from a nonpolar aliphatic amino acid, an aromatic amino acid, a polar uncharged amino acid, or a positively charged amino acid.

Embodiment 83 is the method of embodiment 82, wherein the nonpolar aliphatic amino acid is selected from the group consisting of glycine, proline, alanine, isoleucine, leucine, methionine, and valine.

Embodiment 84 is the method of embodiment 82, wherein the aromatic amino acid is selected from the group consisting of phenylalanine, tryptophan, and tyrosine.

Embodiment 85 is the cell of embodiment 82, wherein the polar uncharged amino acid is selected from the group consisting of a polar uncharged amino acid serine, threonine, asparagine, or glutamine.

Embodiment 86 is the method of embodiment 82, wherein the positively charged amino acid is selected from the group consisting of arginine, histidine, and lysine.

Embodiment 87 is the method of any one of embodiments 69-86, wherein the different amino acid is serine.

Embodiment 88 is the method of any one of embodiments 69-86, wherein the different amino acid is alanine.

Embodiment 89 is the method of any one of embodiments 69-86, wherein the different amino acid is phenylalanine.

Embodiment 90 is the method of any one of embodiments 69-86, wherein the different amino acid is histidine.

Embodiment 91 is the cell of any one of embodiments 52-90, wherein the first HRM is HRM1.

Embodiment 92 is the cell of any one of embodiments 70-91, wherein the second HRM is HRM2.

Embodiment 93 is the cell of any one of embodiments 52-90, wherein the first HRM is HRM2.

Embodiment 94 is the cell of any one of embodiments 70-91, wherein the second HRM is HRM1.

Embodiment 95 is the method of any one of embodiments 52-94, wherein the first exogenous nucleic acid construct comprises a nucleic acid sequence having at least 90% sequence identity to the nucleic acid sequence in SEQ ID NO: 28.

Embodiment 96 is the method of any one of embodiments 52-95, wherein the first exogenous nucleic acid construct comprises a nucleic acid sequence having at least 95% sequence identity to the nucleic acid sequence in SEQ ID NO: 28.

Embodiment 97 is the method of any one of embodiments 52-96, wherein the first exogenous nucleic acid construct comprises the nucleic acid sequence in SEQ ID NO: 30.

Embodiment 98 is the method of any one of embodiments 52-97, wherein the ALAS protein comprises an amino acid sequence having at least 90% sequence identity to the amino acid sequence in SEQ ID NO: 29.

Embodiment 99 is the method of any one of embodiments 52-98, wherein the ALAS protein comprises an amino acid sequence having at least 95% sequence identity to the amino acid sequence in SEQ ID NO: 29.

Embodiment 100 is the method of any one of embodiments 52-99, wherein the ALAS protein comprises the amino acid sequence in SEQ ID NO: 31.

Embodiment 101 is the method of any one of embodiments 52-100, wherein the heme-binding protein is selected from the group consisting of a globin, a cytochrome, a cytochrome c oxidase, a ligninase, a catalase, and a peroxidase.

Embodiment 102 is the method of any one of embodiments 52-100, wherein the heme-binding protein is selected from the group consisting of an androglobin, a chlorocruorin, a cytoglobin, an erythrocruorin, a flavohemoglobin, a globin E, a globin X, a globin Y, a hemoglobin, a histoglobin, a leghemoglobin, a myoglobin, a neuroglobin, a non-symbiotic hemoglobin, a protoglobin, and a truncated hemoglobin.

Embodiment 103 is the method of any one of embodiments 52-100, wherein the heme-binding protein is a non-symbiotic hemoglobin.

Embodiment 104 is the method of any one of embodiments 52-100, wherein the heme-binding protein is a leghemoglobin.

Embodiment 105 is the method of any one of embodiments 52-100, wherein the heterologous heme-binding protein comprises an amino acid sequence having at least 90% sequence identity to an amino acid sequence in any one of SEQ ID NOs: 1-27.

Embodiment 106 is the method of any one of embodiments 52-105, further comprising expressing a third nucleic acid construct comprising a nucleotide sequence encoding a transcription factor, wherein the third nucleic acid construct is operably linked to the first promoter element, the second promoter element, or a third promoter element.

Embodiment 107 is the method of embodiment 106, wherein the first promoter element comprises a recognition sequence for the transcription factor.

Embodiment 108 is the method of embodiment 107, wherein the second exogenous nucleic acid construct is operably linked to a second promoter element, and wherein the second promoter element comprises a recognition sequence for the transcription factor.

Embodiment 109 is the method of any one of embodiments 107-108, wherein the third nucleic acid construct is operably linked to the third promoter element, and wherein the third promoter element comprises a recognition sequence for the transcription factor.

Embodiment 110 is the method of any one of embodiments 52-109, further comprising expressing a fourth nucleic acid construct comprising a nucleotide sequence encoding a protein involved in heme biosynthesis, wherein the fourth nucleic acid construct is operably linked to the first promoter element, the second promoter element, the third promoter element, or a fourth promoter element.

Embodiment 111 is the method of embodiment 110, wherein the protein involved in heme biosynthesis is selected from the group consisting of ALA dehydratase, porphobilinogen deaminase, UPG III synthase, UPG III decarboxylase, CPG oxidase, PPG oxidase, and ferrochelatase.

Embodiment 112 is the method of any one of embodiments 52-111, wherein the first exogenous nucleic acid construct is a heterologous nucleic acid construct.

Embodiment 113 is the method of any one of embodiments 52-112, wherein the second exogenous nucleic acid construct is a heterologous nucleic acid construct.

Embodiment 114 is the method of any one of embodiments 52-113, wherein the heme-binding protein is an exogenous heme-binding protein.

Embodiment 115 is the method of any one of embodiments 52-111 or 114, wherein the heme-binding protein is a heterologous heme-binding protein.

EXAMPLES

Example 1

Polymerase Chain Reaction

Genes of interest were amplified from genomic DNA or plasmid DNA templates using Phusion High-fidelity PCR master mix (New England Biolabs, Cat #M0531), 0.6 µM each of forward and reverse primers and 10-50 ng of template DNA. The reaction conditions were as follows:

| 1 cycle | Initial Denaturation | 98° C. | 1 min |
|---|---|---|---|
| 25 cycles | Denaturation | 98° C. | 10 sec |
| | Annealing | 60° C. | 20 sec |
| | Extension | 72° C. | 30 sec per kb |
| 1 cycle | Final Extension | 72° C. | 5 min |
| | Hold | 4° C. | Forever |

*Pichia pastoris* ALAS gene (KEGG identifier PAS_chr2-1_0716, which can be accessed at the Kyoto Encyclopedia of Genes and Genomes (KEGG) website) was amplified using primers (ATGGAGTTTGTCGCCCGTCAG; SEQ ID NO: 65) and (CTACAATCTGACTCCTGATGAGGTTTC; SEQ ID NO: 66) from genomic DNA. In the examples, wtALAS denotes this native sequence of ALAS (SEQ ID NO: 28).

Example 2

Cloning of ALAS and Mutagenesis

PCR product was purified using NucleoSpin Gel and PCR Clean-Up (Takara Bio, Cat #740609) and cloned in pCR-BluntII-TOPO vector using Zero Blunt TOPO PCR Cloning Kit (Thermo Fisher Scientific, Cat #K280020) following the manufacturer's recommendation. Site directed mutagenesis was carried out on the resulting vector (40 ng of purified plasmid) using two sets of primers (set1: CGTCAGTCCATGAATGCCTCTCCCTTTGTCAGGTCAACTTC; SEQ ID NO: 37 and GAAGTTGACCTGACAAAGGGAGAGGCATTCATGGACTGACG; SEQ ID NO: 38, set2: GCTGCTACTGCTAGTCATTCTCCCGTGGTTGGCCCTG; SEQ ID NO: 39 and CAGGGCCAACCACGGGAGAATGACTAGCAGTAGCAGC; SEQ ID NO: 40) and QuikChange II XL Site-Directed Mutagenesis Kit (Agilent, Cat #200521) to create mutALAS carrying mutations of cysteine residues at positions 12 and 39 to serine residues (SEQ ID NO: 30). In the Examples, mutALAS specifically denotes these two mutations unless specified otherwise. The reaction conditions were as follows:

| 1 cycle | Initial Denaturation | 95° C. | 1 min |
|---|---|---|---|
| 18 cycles | Denaturation | 95° C. | 50 sec |
| | Annealing | 60° C. | 50 sec |
| | Extension | 68° C. | 11 min |
| 1 cycle | Final Extension | 68° C. | 7 min |
| | Hold | 4° C. | Forever |

Single cysteine to serine mutation, C12S or C39S was performed by site directed mutagenesis on vector carrying wtALAS using primer set1 (SEQ ID NO: 37, SEQ ID NO: 38) and set2 (SEQ ID NO: 39, SEQ ID NO: 40) respectively.

Example 3

Figure 5:
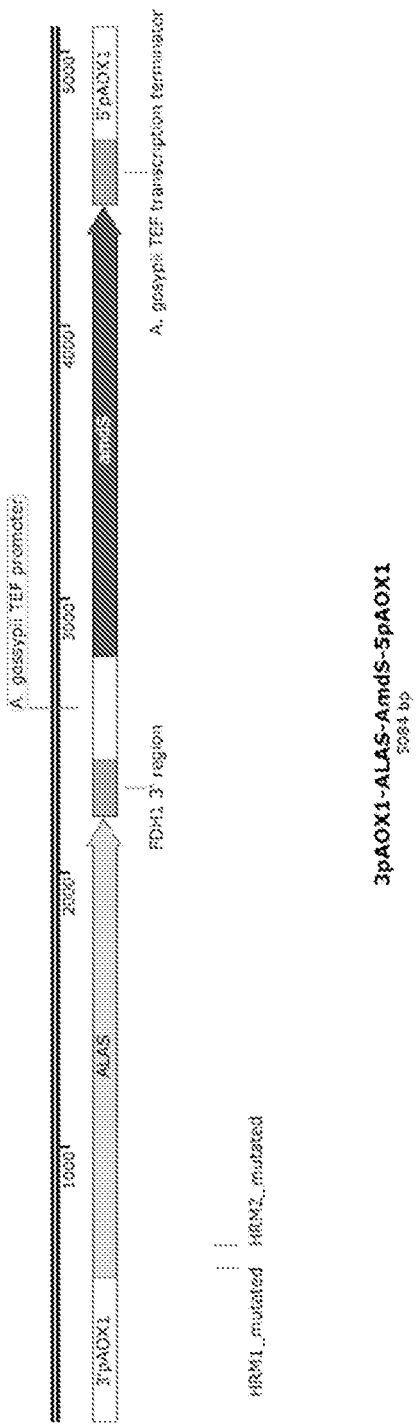
FIG. 5 provides an exemplary construct diagram of a mutated ALAS.

Construction of ALAS (Wild-Type or Mutated, C12S, C39S) Gene Integration Cassette Integration cassette of wtALAS or mutALAS was designed such that gene integration occurred under the methanol-inducible alcohol oxidase 1 (AOX1) promoter element from *Pichia pastoris* and before the translation stop signal immediately followed by the transcription terminator sequence from the *Pichia pastoris* FDH1 gene. The linear constructs contained the 3' half of the promoter element, followed by ALAS gene (wild-type or mutant), followed by the FDH1 transcription terminator. This was immediately followed by the selection cassette containing the pTEF promoter element from *Ashbya gossypii*, the acetamidase gene (amdS) from *Aspergillus nidulans* and the TEF terminator from *Ashbya gossypii*. Finally, the construct contained the 5' half of the promoter element (See, e.g., FIG. 5).

Overlapping PCR was used to create the linear constructs [3'pAOX1-ALAS (wt/mut)-FDH1tt-pTEF-amdS-TEFtt-5'pAOX1). Primers Used to Amplify the Linear Constructs:

| Overlapping PCR | Primer sequences | SEQ ID NO: |
|---|---|---|
| PCR1 | AAACGCTGTCTTGGAACCTAATATGAC | 41 |
| | GACGGGCGACAAACTCCATCGTTTCGA ATAATTAGTTG | 42 |
| PCR2 | CAACTAATTATTCGAAACGATGGAGTTT GTCGCCCGTCAG | 43 |
| | AATTAAATACATTTCAACTACAATCTGA CTCCTGATGAGGTTTCG | 44 |
| PCR3 | CCTCATCAGGAGTCAGATTGTAGTTGAA ATGTATTTAATTTG | 45 |
| | AAACTGTCAGTTTTGGGCCATTTG | 46 |

Individual PCR reaction conditions were performed as indicated above. PCR products were purified using NucleoSpin Gel and PCR Clean-Up (Takara Bio, Cat #740609). The final overlapping PCR product was performed using 0.5 U Platinum Pfx DNA Polymerase (Thermo Fisher Scientific, Cat #11708039), 1× amplification buffer, 0.3 mM dNTPs and 1 mM MgCl$_2$ by mixing the three purified PCR amplicons in an equimolar ratio in a 2-part PCR reaction. The PCR conditions were:

Part 1:

| 1 cycle | Initial Denaturation | 94° C. | 2 min |
|---|---|---|---|
| 15 cycles | Denaturation | 94° C. | 15 sec |
| | Annealing | 58° C. | 30 sec |
| | Extension | 68° C. | 5 min |
| | Hold | 4° C. | |

Following part 1, the reaction mixes were spiked with primers AAACGCTGTCTTGGAACCTAATATGAC (SEQ ID NO: 41) and AAACTGTCAGTTTTGGGCCATTTG (SEQ ID NO: 46) (0.3 uM final concentration) and 1.5 U Pfx and continued to part 2.

Part 2:

| 1 cycle | Initial Denaturation | 94° C. | 2 min |
|---|---|---|---|
| 20 cycles | Denaturation | 94° C. | 15 sec |
| | Annealing | 58° C. | 30 sec |
| | Extension | 68° C. | 5 min |
| | Hold | 4° C. | Forever |

Sequences of exemplary mutant nucleic acids (e.g., SEQ ID NO: 30) and proteins (e.g., SEQ ID NO: 31) are provided in FIG. 7.

Expression plasmids of wtALAS and mutALAS were constructed in an autonomous replicating vector (panARS) under a modified pAOX1 followed by the transcription terminator sequence from the *Pichia pastoris* FDH1 gene. The vector conferred resistance to G418 (Geneticin). Cloning of inserts GFP, wtALAS and mutALAS in the vector was performed using Gibson Assembly Master Mix (New England Biolabs, catalog #E2611L) following manufacturer's recommendation.

Example 4

Preparation of *P. pastoris* Transformation-Competent Cells

Selected strains of *P. pastoris* (*K. phaffii*) were grown to mid-exponential growth phase (~2 OD) in 25 ml YPD medium. Cells were collected by centrifugation at 930×g for 15 minutes. The cell pellet was resuspended in 2 ml of a solution of 80% YPD and 200 mM HEPES, pH 6.8. 75 µl of 1 M DTT was added. The resuspended cell pellet was mixed at 100 rpm at 30° C. for 25 minutes. A 40 ml volume of ice cold, sterile water was added to the suspension, and the cells were collected by centrifugation at 1125×g for 15 minutes and placed on ice. The cell pellet was resuspended in 40 ml ice cold water and collected as before for two additional wash steps. The cell pellet was then resuspended in 20 ml of ice cold 1 M sorbitol and collected by centrifugation as before. The final cell pellet was suspended in 0.3 ml ice cold, sterile 1 M sorbitol, aliquoted and frozen at −80° C.

Example 5

Transformation into *P. pastoris*

For genome integration, 100-300 ng of linearized DNA was transformed into 30 µl of electrocompetent *P. pastoris* cells using a 1 mm gap GenePulser cuvette (Bio-Rad, Cat #1652083) with a GenePulser (Bio-Rad) set at 1.15 kV. 1 ml of YPD/1M sorbitol (1:1 vol/vol) was added immediately to the cells. The cells were allowed to recover for 3 h at 30° C. with shaking at 100 rpm. 100 µl of the recovery mixture was plated on yeast carbon base plates containing 5 mM acetamide (Teknova, Cat #Y5216). Plates were incubated at 30° C. for 48 hours. Individual clones were streaked onto yeast carbon base plates containing acetamide to obtain single colonies and the isolated colonies were used to do colony PCR or gDNA prep to confirm gene integration into the chromosome and sequence the integration construct.

For plasmid DNA transformation, the same steps were followed as for genome integration except that after electroporation and recovery of cells, 50-100 µl of the recovery mixture was plated on YPD plates containing 300 ug/ml G418 (Geneticin).

Example 6

Construction of Strains St2, St3, St5 and St6

A high yielding parent strain (St1) had pre-existing recombinant ALAS under the methanol-inducible strong promoter pAOX1 (alcohol oxidase 1) in addition to other pAOX1-driven heme enzymes, the carbon-responsive transcription factor MxR1 and multiple copies of LegH. A low yielding parent LegH strain (St4) lacked recombinant MxR1, ALAS and other heme enzymes except aminolevulinate dehydratase (ALAD).

Competent St1 cells (Table 1; a high LegH titer strain) were transformed with each of the linear cassettes (for wtALAS and mutALAS) and transformants containing the amdS selection cassette were selected based on their ability to grow on agar plates containing acetamide as the sole nitrogen source. The resulting strains (St2 and St3 with integrated cassette for wtALAS and mutALAS respectively, Table 1) were purified, isolated and the presence of pAOX1 driven wtALAS or mutALAS was verified by colony PCR and sequencing. Similarly, competent St4 cells (a low LegH titer strain) were transformed with linear cassettes for wtALAS and mutALAS to obtain St5 and St6 respectively.

TABLE 1

Strains with LegH integrated in genome

| Parent | 1 extra copy of recombinant wtALAS added | 1 extra copy of recombinant mutALAS added |
|---|---|---|
| High LegH titer strain (Strain St1) | Strain St2 | Strain St3 |
| Low LegH titer strain (Strain St4) | Strain St5 | Strain St6 |

Example 7

ALAS Gene Copy Number Analysis

ALAS gene copy number in different strains was measured by probe-based qPCR. Briefly, genomic DNA (20 ng) was amplified with 1× PrimeTime gene expression mastermix (Integrated DNA Technologies, Cat #1055770) and PrimeTime qPCR Probe Assays in a real-time qPCR CFX96 machine (Bio-Rad). qPCR normalization was performed with respect to actin. A double delta Ct analysis method was followed to calculate the relative copy number of gene of interest between strains. Primer and probe sequences were:

| Gene | Primer sequence | SEQ ID. NO. | Probe sequence | SEQ ID. NO. |
|---|---|---|---|---|
| ALAS | GCTCTCCAACA GCAGAGATAC | 47 | 6-FAM/AAGCCCAAA/ Zen/CCTCCGACATTG CTA/3IABkFQ | 51 |
|  | GTCCATACGGA TCGGAGAAAC | 48 | | |
| Actin | AGCAACATCC CTGATTCCG | 49 | HEX/TCGCCGTAA/ Zen/GTTCTTGGTT TAGACGTTC/ 3IABkFQ | 52 |
|  | ATGCGTACCTT CAATCCTGG | 50 | | |

The engineered strains (Table 1) contained identical number of extra ALAS gene copies, either one copy of wtALAS or mutALAS, as measured by qPCR of ALAS normalized to actin levels. Hence, ALAS gene dosage was ruled out for any difference in the phenotype of the resulting strains (e.g., St2 vs St3 and St5 vs St6).

Example 8

PCR Detection of Heme Enzyme, MxR1, LegH and Mb Genes

Strain characterization was done by PCR for pAOX1-driven recombinant heme biogenesis pathway enzyme, MxR1 and LegH genes. Forward primer sequence for PCR was TAGCGCAGTCTCTCTATCGCTTC (SEQ ID NO: 53) specific to pAOX1. Reverse primer was specific to each gene of interest as shown below.

| Gene | Reverse Primer | Amplicon size | SEQ ID NO: |
|---|---|---|---|
| 5-aminolevulinate synthase | CACTGGGTTG TGCACATTGG | 1995 bp | 54 |
| Delta-aminolevulinate dehydratase | ACAATATTCT TCTCTGCCGC | 1268 bp | 55 |
| Phorphobilinogen deaminase | TTGATCTCGTC AAGAATGCG | 1358 bp | 56 |
| Uroporphyrinogen III synthase | TAGGTGCCACAA CTTTTGGTTTC | 1102 bp | 57 |
| Uroporphyrinogen decarboxylase | GATCCAATGCGA TGACATTCTTGT | 1430 bp | 58 |
| Coproporphyrinogen III oxidase | ACCTGCAATAAC TCCTCTTCTCTG | 1301 bp | 59 |
| Protoporphyrinogen oxidase | CCACTGAGGGTA GCCGAATC | 2027 bp | 60 |
| Ferrochelatase | GGGCTCTGAAAA ACTCTTTTGG | 1486 bp | 61 |
| MxR1 | GCATGTCTCAATAA CAGATCTCGACGG | 629 bp | 62 |
| LegH | AAGCCTCTTGTTTT TCTGTAAATGCAC | 382 bp | 63 |
| Bovine Mb | TGATGGCGTCCGA GATGAACTC | 688 bp | 64 |

Results of these reactions are shown below.

| Recombinant Gene (under pAOX1) | St1 | St2 | St3 | St4 | St5 | St6 | St7 |
|---|---|---|---|---|---|---|---|
| 5-aminolevulinate synthase | x | x | x | — | x | x | x |
| Delta-aminolevulinate dehydratase | x | x | x | x | x | x | x |
| Phorphobilinogen deaminase | x | x | x | — | — | — | x |
| Uroporphyrinogen III synthase | x | x | x | — | — | — | x |
| Uroporphyrinogen decarboxylase | x | x | x | — | — | — | x |
| Coproporphyrinogen III oxidase | x | x | x | — | — | — | x |
| Protoporphyrinogen oxidase | x | x | x | — | — | — | x |
| Ferrochelatase | x | x | x | — | — | — | x |
| MxR1 | x | x | x | — | — | — | x |
| LegH | x | x | x | x | x | x | — |
| Mb (Bovine Myoglobin) | — | — | — | — | — | — | x |

Example 9

Shake Flask Cultivation of Strains St4, St5 and St6

The strains were inoculated into growth media (1% yeast extract, 2% peptone, supplemented with 1% glycerol) overnight at 30° C. with shaking at 200 rpm. The next day the overnight cultures were diluted to an OD600 of 0.5-0.7 with YP media supplemented with 1% methanol and 1% dextrose. The cultures were grown for 48 hours and harvested by centrifugation at ~4000 g for 15 mins at 4° C.

The low LegH titer strain, St4, didn't have a pre-existing copy of recombinant ALAS, unlike St1. Integrating a copy of mutALAS (St6) led to a ~30% improvement in LegH titer compared to St5 (wtALAS). The titer calculation is based on LegH content as measured by a liquid chromatography method as described in Example 13.

The relative LegH titer is shown in Table 2.

TABLE 2

|  | St5 | St6 |
|---|---|---|
| Relative LegH titer | 1.00 | 1.32 |

Example 10

2 L Cultivation of Strains St1, St2 and St3

Strains St1, St2 and St3 were grown in 2 L fermentation tanks in media containing dextrose as the principal carbon source at 30° C. No methanol was used. In the background of a high LegH titer strain (St1) that contained pre-existing recombinant ALAS, St3 overexpressing mutALAS improved LegH titer by >30% over the parent St1. When compared to wtALAS (in St2), mutALAS (in St3) resulted in a 20% improvement in LegH titer. The titer calculation is based on LegH content as measured by a liquid chromatography method as described in Example 13.

The relative LegH titer is shown in Table 3.

TABLE 3

|  | St1 | St2 | St3 |
|---|---|---|---|
| Relative LegH titer | 1.00 | 1.10 | 1.37 |

Hence, mutating both the ALAS HRMs and overexpressing the mutated ALAS (mutALAS) in *Pichia* strains with different LegH titer led to further improvement in LegH titer. Furthermore, this suggested that mutALAS improved LegH titer independent of the strain genetic makeup (MxR1 and heme enzymes other than ALAS), and presence of methanol.

Example 11

MutALAS Improved Heme Levels

A quantitative assay for total heme based on reversed-phase high-performance liquid chromatography indicated that strains with mutALAS accumulated more heme levels than wtALAS containing strains. Shown in Table 4 is heme quantification in strain St3 (mutALAS) vs strain St2 (wtALAS). Additionally, mutALAS increased heme loading in multiple strains.

TABLE 4

|  | St2 | St3 |
|---|---|---|
| Relative heme titer | 1.00 | 2.7 |

Example 12

ALAS Protein Levels with MutALAS

It is generally believed that heme regulates ALAS levels in a feedback fashion to regulate its own levels. At the protein level, the ALAS level was higher 3-fold in St3 (mutALAS) compared to St2 (wtALAS) (Table 5) as quantitated by shotgun mass spectrometry, when the strains were grown in 2 L fermenter tanks with dextrose.

TABLE 5

|  | St2 | St3 |
|---|---|---|
| Relative ALAS titer | 1.00 | 3.3 |

Example 13

Quantification of Leghemoglobin

Cell broth samples were pelleted down (at 4000×g, 4° C., 30 min) and decanted. The pellet samples were then diluted four times with lysis buffer (150 mM NaCl, 50 mM Potassium Phosphate, pH 7.4). 300 uL of each resuspension was dispensed into a 96 well deep plate with 120 uL of beads (Zirconium/silica beads (0.5 mm)) per well for cell lysis. The lysis was done with a mini bead beater for 3 minutes, then the plate was cooled down on ice for 5 minutes, and followed with another 2 minutes of bead beating. The plate was then spun down (at 4000×g, 4° C., 30 min). The supernatant was filtered through a 0.2 um filter plate (at 4000×g, 4° C., 60 min).

The filtered lysate was loaded onto a UHPLC with a size-exclusion column (Acquity BEH SEC column, 200 Å, 1.7 um, 4.6×150 mm). Method parameters: 1) Mobile phase: 5 mM NaCl, 50 mM Potassium Phosphate, (pH 7.4); 2) Flow rate: 0.3 mL/min; 3) Injection volume: 10 uL; 4) Run time: 15 min; 5) Sample tray temperature: 4 C. A calibration curve was built with a purified LegH standard using absorbance at 280 nm and 415 nm. The quantification was done using peak area with valley-to-valley peak integration method. The absorbance at 280 nm is proportional to the amount of the polypeptide present and the absorbance at 415 nm is proportional to the amount of heme present. Where a peak is seen at the same elution time at both wavelengths, a heme containing protein is detected.

Example 14 mutALAS Improved Levels of Bovine Myoglobin

In addition to LegH, the production of bovine myoglobin was evaluated. Strain, St7, was generated by integrating myoglobin cDNA of *Bos taurus* (NM_173881.2) in a strain containing recombinant copies of heme enzymes and MxR1 (St7 characterization is described in Example 8) integrated under pAOX1.

Three expression plasmids for expression of GFP (control), wtALAS and mutALAS were constructed as described in Example 3. Three strains, St8, St9 and St10 were generated using a method as described in Example 5 by transforming these three plasmids overexpressing GFP, wtALAS and mutALAS respectively in strain S7, as shown in Table 6. Episomal expression of wtALAS or mutALAS was obtained by growing transformants using a method described in Example 9, except that the growth media was supplemented with 300 ug/ml G418.

TABLE 6

| Plasmid | expressing | Host strain | Host strain expressing | Resulting Strain |
|---|---|---|---|---|
| 1 | GFP | St7 | Mb | St8 |
| 2 | wtALAS |  |  | St9 |
| 3 | mutALAS (C12S, C39S) |  |  | St10 |

The cells were pelleted, and shotgun proteomics by LC-MS was performed to quantitate Mb. When normalized to the myoglobin level in Strain St8 (GFP), the average myoglobin levels in St9 and St10 were as shown in Table 7.

TABLE 7

| Strains | Normalized Myoglobin levels |
|---|---|
| St8 (GFP) | 1 |
| St9 (wt ALAS) | 1.60 |
| St10 (mutALAS) | 2.58 |

Example 15

Mutations to Other Amino Acids

In addition to cysteine to serine mutations, additional mutations were evaluated. Expression plasmids of mutA- LAS variants were constructed by gene synthesis and cloning in an autonomous replicating vector (panARS) under a modified pAOX1 followed by the FDH1 transcription terminator sequence. Furthermore, these plasmids were transformed in strain St1, using a method as described in Example 5 and the resulting transformants produced LegH when cultured, using a method described in Example 9, except that the growth media was supplemented with 300 ug/ml G418. The titer of LegH produced by these strains was normalized to the titer of LegH produced by wtALAS, as determined by the method described in Example 13. The results are shown in Table 8.

TABLE 8

| Variant | Normalized LegH titer fold |
|---|---|
| C12, C39 (wtALAS) | 1 |
| C12S, C39S (mutALAS) | 1.14 |
| C12A, C39A | 1.22 |
| C12D, C39D | 0.91 |
| C12F, C39F | 1.17 |
| C12H, C39H | 1.12 |

Example 16

Single Cysteine to Serine Mutants in *Pichia pastoris*

In addition to evaluating the double mutant (C12S, C39S) of ALAS in *P. pastoris*, single cysteine to serine mutants were also evaluated. Single mutations were created in wtALAS by site directed mutagenesis as described in Example 2. Expression_plasmids for expression of wtALAS, mutALAS and single ALAS mutants (C12S and C39S) were constructed as described in Example 3 and were transformed in strain St1, using a method as described in Example 5. The resulting transformants produced LegH when cultured, using a method described in Example 9, except that the growth media was supplemented with 300 ug/ml G418. The titer of LegH produced by these strains was normalized to the titer of LegH produced by wtALAS, as determined by the method described in Example 13. The results are shown in Table 9.

TABLE 9

| Variant | Normalized LegH titer fold |
|---|---|
| C12, C39 (wtALAS) | 1 |
| C12S, C39S | 1.27 |
| C12S | 1.03 |
| C39S | 1.01 |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

```
                                 SEQUENCE LISTING

Sequence total quantity: 66
SEQ ID NO: 1            moltype = AA  length = 161
FEATURE                 Location/Qualifiers
source                  1..161
                        mol_type = protein
                        organism = Vigna radiata
SEQUENCE: 1
MTTTLERGFT EEQEALVVKS WNVMKKNSGE LGLKFFLKIF EIAPSAQKLF SFLRDSTVPL   60
EQNPKLKPHA VSVFVMTCDS AVQLRKAGKV TVRESNLKKL GATHFRTGVA NEHFEVTKFA  120
LLETIKEAVP EMWSPAMKNA WGEAYDQLVD AIKYEMKPPS S                      161

SEQ ID NO: 2            moltype = AA  length = 133
FEATURE                 Location/Qualifiers
source                  1..133
                        mol_type = protein
                        organism = Methylacidiphilum infernorum
SEQUENCE: 2
MIDQKEKELI KESWKRIEPN KNEIGLLFYA NLFKEEPTVS VLFQNPISSQ SRKLMQVLGI   60
LVQGIDNLEG LIPTLQDLGR RHKQYGVVDS HYPLVGDCLL KSIQEYLGQG FTEEAKAAWT  120
KVYGIAAQVM TAE                                                     133

SEQ ID NO: 3            moltype = AA  length = 139
FEATURE                 Location/Qualifiers
source                  1..139
                        mol_type = protein
                        organism = Aquifex aeolicus
SEQUENCE: 3
MLSEETIRVI KSTVPLLKEH GTEITARMYE LLFSKYPKTK ELFAGASEEQ PKKLANAIIA   60
YATYIDRLEE LDNAISTIAR SHVRRNVKPE HYPLVKECLL QAIEEVLNPG EEVLKAWEEA  120
YDFLAKTLIT LEKKLYSQP                                               139

SEQ ID NO: 4            moltype = AA  length = 145
FEATURE                 Location/Qualifiers
source                  1..145
                        mol_type = protein
                        organism = Glycine max
SEQUENCE: 4
```

```
MGAFTEKQEA LVSSSFEAPK ANIPQYSVVF YTSILEKAPA AKDLFSFLSN GVDPSNPKLT    60
GHAEKLFGLV RDSAGQLKAN GTVVADAALG SIHAQKAITD PQFVVVKEAL LKTIKEAVGD   120
KWSDELSSAW EVAYDELAAA IKKAF                                        145

SEQ ID NO: 5           moltype = AA   length = 162
FEATURE                Location/Qualifiers
source                 1..162
                       mol_type = protein
                       organism = Hordeum vulgare
SEQUENCE: 5
MSAAEGAVVF SEEKEALVLK SWAIMKKDSA NLGLRFFLKI FEIAPSARQM FPPFLRDSDVP   60
LETNPKLKTH AVSVFVMTCE AAAQLRKAGK ITVRETTLKR LGGTHLKYGV ADGHFEVTRF   120
ALLETIKEAL PADMWGPEMR NAWGEAYDQL VAAIKQEMKP AE                     162

SEQ ID NO: 6           moltype = AA   length = 1153
FEATURE                Location/Qualifiers
source                 1..1153
                       mol_type = protein
                       organism = Magnaporthe oryzae
SEQUENCE: 6
MDGAVRLDWT GLDLTGHEIH DGVPIASRVQ VMVSFPLFKD QHIIMSSKES PSRKSSTIGQ    60
STRNGSCQAD TQKGQLPPVG EKPKPVKENP MKKLKEMSQR PLPTQHGDGT YPTEKKLTGI   120
GEDLKHIRGY DVKTLLAMVK SKLKGEKLKD DKTMLMERVM QLVARLPTES KKRAELTDSL   180
INELWESLDH PPLNYLGPEH SYRTPDGSYN HPFNPQLGAA GSRYARSVIP TVTPPGALPD   240
PGLIFDSIMG RTPNSYRKHP NNVSSILWYW ATIIIHDIFW TDPRDINTNK SSSYLDLAPL   300
YGNSQEMQDS IRTFKDGRMK PDCYADKRLA GMPPGVSVLL IMFNRFHNHV AENLALINEG   360
GRFNKPSDLL EGEAREAAWK KYDNDLFQVA RLVTSGLYIN ITLVDYVRNI VNLNRVDTTW   420
TLDPRQDAGA HVGTADGAER GTGNAVSAEF NLCYRWHSCI SEKDSKFVEA QFQNIFGKPA   480
SEVRPDEMWK GFAKMEQNTP ADPGQRTFGG FKRGPDGKFD DDDLVRCISE AVEDVAGAFG   540
ARNVPQAMKV VETMGIIQGR KWNVAGLNEF RKHPHLKPYS TFEDINSDPG VAEALRRLYD   600
HPDNVELYPG LVAEEDKQPM VPGVGIAPTY TISRVVLSDA VCLVRGDRFY TTDFTPRNLT   660
NWGYKEVDYD LSVNHGCVFY KLFIRAFPNH FKQNSVYAHY PMVVPSENKR ILEALGRADL   720
FDFEAPKYIP PRVNITSYGG AEYILETQEK YKVTWHEGLG FLMGEGGLKF MLSGDDPLHA   780
QQRKCMAAQL YKDGWTEAVK AFYAGMMEEL LVSKSYFLGN NKHRHVDIIR DVGNMVHVHF   840
ASQVFGLPLK TAKNPTGVFT EQEMYGILAA IFTTIFFDLD PSKSFPLRTK TREVCQKLAK   900
LVEANVKLIN KIPWSRGMFV GKPAKDEPLS IYGKTMIKGL KAHGLSDYDI AWSHVVPTSG   960
AMVPNQAQVF AQAVDYYLSP AGMHYIPEIH MVALQPSTPE TDALLLGYAM EGIRLAGTFG  1020
SYREAAVDDV VKEDNGRQVP VKAGDRVFVS FVDAARDPKH FPDPEVVNPR RPAKKYIHYG  1080
VGPHACLGRD ASQIAITEMF RCLFRRRNVR RVPGPQGELK KVPRPGGFYV YMREDWGGLF  1140
PFPVTMRVMW DDE                                                   1153

SEQ ID NO: 7           moltype = AA   length = 530
FEATURE                Location/Qualifiers
source                 1..530
                       mol_type = protein
                       organism = Fusarium oxysporum
SEQUENCE: 7
MKGSATLAFA LVQFSAASQL VWPSKWDEVE DLLYMQGGFN KRGFADALRT CEFGSNVPGT    60
QNTAEWLRTA FHDAITHDAK AGTGGLDASI YWESSRPENP GKAFNNTFGF FSGFHNPRAT   120
ASDLTALGTV LAVGACNGPR IPFRAGRIDA YKAGPAGVPE PSTNLKDTFA AFTKAGFTKE   180
EMTAMVACGH AIGGVHSVDF PEIVGIKADP NNDTNVPFQK DVSSFHNGIV TEYLAGTSKN   240
PLVASKNATF HSDKRIFDND KATMKKLSTK AGFNSMCADI LTRMIDTVPK SVQLTPVLEA   300
YDVRPYITEL SLNNKNKIHF TGSVRVRITN NIRDNNDLAI NLIYVGRDGK KVTVPTQQVT   360
FQGGTSFGAG EVFANFEFDT TMDAKNGITK FFIQEVKPST KATVTHDNQK TGGYKVDDTV   420
LYQLQQSCAV LEKLPNAPLV VTAMVRDARA KDALTLRVAH KKPVKGSIVP RFQTAITNFK   480
ATGKKSSGYT GFQAKTMFEE QSTYFDIVLG GSPASGVQFL TSQAMPSQCS              530

SEQ ID NO: 8           moltype = AA   length = 358
FEATURE                Location/Qualifiers
source                 1..358
                       mol_type = protein
                       organism = Fusarium graminearum
SEQUENCE: 8
MASATRQFAR AATRATRNGF AIAPRQVIRQ QGRRYYSSEP AQKSSSAWIW LTGAAVAGGA    60
GYYFYGNSAS SATAKVFNPS KEDYQKVYNE IAARLEEKDD YDDGSYGPVL VRLAWHASGT   120
YDKETGTGGS NGATMRFAPE SDHGANAGLA AARDFLQPVK EKFPWITYSD LWILAGVCAI   180
QEMLGPAIPY RPGRSDRDVS GCTPGRLPD ASKRQDHLRG IFGRMGFNDQ EIVALSGAHA   240
LGRCHTDRSG YSGPWTFSPT VLTNDYFRLL VEEKWQWKKW NGPAQYEDKS TKSLMMLPSD   300
IALIEDKKFK PWVEKYAKDN DAFFKDFSNV VLRLFELGVP FAQGTENQRW TFKPTHQE    358

SEQ ID NO: 9           moltype = AA   length = 122
FEATURE                Location/Qualifiers
source                 1..122
                       mol_type = protein
                       organism = Chlamydomonas eugametos
SEQUENCE: 9
MSLFAKLGGR EAVEAAVDKF YNKIVADPTV STYFSNTDMK VQRSKQFAFL AYALGGASEW    60
KGKDMRTAHK DLVPHLSDVH FQAVARHLSD TLTELGVPPE DITDAMAVVA STRTEVLNMP   120
QQ                                                                 122
```

```
SEQ ID NO: 10            moltype = AA  length = 121
FEATURE                  Location/Qualifiers
source                   1..121
                         mol_type = protein
                         organism = Tetrahymena pyriformis
SEQUENCE: 10
MNKPQTIYEK LGGENAMKAA VPLFYKKVLA DERVKHFFKN TDMDHQTKQQ TDFLTMLLGG     60
PNHYKGKNMT EAHKGMNLQN LHFDAIIENL AATLKELGVT DAVINEAAKV IEHTRKDMLG    120
K                                                                   121

SEQ ID NO: 11            moltype = AA  length = 117
FEATURE                  Location/Qualifiers
source                   1..117
                         mol_type = protein
                         organism = Paramecium caudatum
SEQUENCE: 11
MSLFEQLGGQ AAVQAVTAQF YANIQADATV ATFFNGIDMP NQTNKTAAFL CAALGGPNAW     60
TGRNLKEVHA NMGVSNAQFT TVIGHLRSAL TGAGVAAALV EQTVAVAETV RGDVVTV      117

SEQ ID NO: 12            moltype = AA  length = 147
FEATURE                  Location/Qualifiers
source                   1..147
                         mol_type = protein
                         organism = Aspergillus niger
SEQUENCE: 12
MPLTPEQIKI IKATVPVLQE YGTKITTAFY MNMSTVHPEL NAVFNTANQV KGHQARALAG     60
ALFAYASHID DLGALGPAVE LICNKHASLY IQADEYKIVG KYLLEAMKEV LGDACTDDIL    120
DAWGAAYWAL ADIMINREAA LYKQSQG                                       147

SEQ ID NO: 13            moltype = AA  length = 165
FEATURE                  Location/Qualifiers
source                   1..165
                         mol_type = protein
                         organism = Zea mays
SEQUENCE: 13
MALAEADDGA VVFGEEQEAL VLKSWAVMKK DAANLGLRFF LKVFEIAPSA EQMFSFLRDS     60
DVPLEKNPKL KTHAMSVFVM TCEAAAQLRK AGKVTVRETT LKRLGATHLR YGVADGHFEV    120
TGFALLETIK EALPADMWSL EMKKAWAEAY SQLVAAIKRE MKPDA                    165

SEQ ID NO: 14            moltype = AA  length = 169
FEATURE                  Location/Qualifiers
source                   1..169
                         mol_type = protein
                         organism = Oryza sativa
SEQUENCE: 14
MALVEGNNGV SGGAVSFSEE QEALVLKSWA IMKKDSANIG LRFFLKIFEV APSASQMFSF     60
LRNSDVPLEK NPKLKTHAMS VFVMTCEAAA QLRKAGKVTV RDTTLKRLGA THFKYGVGDA    120
HFEVTRFALL ETIKEAVPVD MWSPAMKSAW SEAYNQLVAA IKQEMKPAE                169

SEQ ID NO: 15            moltype = AA  length = 160
FEATURE                  Location/Qualifiers
source                   1..160
                         mol_type = protein
                         organism = Arabidopsis thaliana
SEQUENCE: 15
MESEGKIVFT EEQEALVVKS WSVMKKNSAE LGLKLFIKIF EIAPTTKKMF SFLRDSPIPA     60
EQNPKLKPHA MSVFVMCCES AVQLRKTGKV TVRETTLKRL GASHSKYGVV DEHFEVAKYA    120
LLETIKEAVP EMWSPEMKVA WGQAYDHLVA AIKAEMNLSN                          160

SEQ ID NO: 16            moltype = AA  length = 147
FEATURE                  Location/Qualifiers
source                   1..147
                         mol_type = protein
                         organism = Pisum sativum
SEQUENCE: 16
MGFTDKQEAL VNSSWESFKQ NLSGNSILFY TIILEKAPAA KGLFSFLKDT AGVEDSPKLQ     60
AHAEQVFGLV RDSAAQLRTK GEVVLGNATL GAIHVQRGVT DPHFVVVKEA LLQTIKKASG    120
NNWSEELNTA WEVAYDGLAT AIKKAMT                                        147

SEQ ID NO: 17            moltype = AA  length = 145
FEATURE                  Location/Qualifiers
source                   1..145
                         mol_type = protein
                         organism = Vigna unguiculata
SEQUENCE: 17
MVAFSDKQEA LVNGAYEAFK ANIPKYSVVF YTTILEKAPA AKNLFSFLAN GVDATNPKLT     60
GHAEKLFGLV RDSAAQLRAS GGVVADAALG AVHSQKAVND AQFVVVKEAL VKTLKEAVGD    120
KWSDELGTAV ELAYDELAAA IKKAY                                          145
```

```
SEQ ID NO: 18              moltype = AA   length = 154
FEATURE                    Location/Qualifiers
source                     1..154
                           mol_type = protein
                           organism = Bos taurus
SEQUENCE: 18
MGLSDGEWQL VLNAWGKVEA DVAGHGQEVL IRLFTGHPET LEKFDKFKHL KTEAEMKASE    60
DLKKHGNTVL TALGGILKKK GHHEAEVKHL AESHANKHKI PVKYLEFISD AIIHVLHAKH   120
PSDFGADAQA AMSKALELFR NDMAAQYKVL GFHG                               154

SEQ ID NO: 19              moltype = AA   length = 154
FEATURE                    Location/Qualifiers
source                     1..154
                           mol_type = protein
                           organism = Sus scrofa
SEQUENCE: 19
MGLSDGEWQL VLNVWGKVEA DVAGHGQEVL IRLFKGHPET LEKFDKFKHL KSEDEMKASE    60
DLKKHGNTVL TALGGILKKK GHHEAELTPL AQSHATKHKI PVKYLEFISE AIIQVLQSKH   120
PGDFGADAQG AMSKALELFR NDMAAKYKEL GFQG                               154

SEQ ID NO: 20              moltype = AA   length = 154
FEATURE                    Location/Qualifiers
source                     1..154
                           mol_type = protein
                           organism = Equus caballus
SEQUENCE: 20
MGLSDGEWQQ VLNVWGKVEA DIAGHGQEVL IRLFTGHPET LEKFDKFKHL KTEAEMKASE    60
DLKKHGTVVL TALGGILKKK GHHEAELKPL AQSHATKHKI PIKYLEFISD AIIHVLHSKH   120
PGDFGADAQG AMTKALELFR NDIAAKYKEL GFQG                               154

SEQ ID NO: 21              moltype = AA   length = 152
FEATURE                    Location/Qualifiers
source                     1..152
                           mol_type = protein
                           organism = Nicotiana benthamiana
SEQUENCE: 21
MSSFTEEQEA LVVKSWDSMK KNAGEWGLKL FLKIFEIAPS AKKLFSFLKD SNVPLEQNAK    60
LKPHSKSVFV MTCEAAVQLR KAGKVVVRDS TLKKLGATHF KYGVADEHFE VTKFALLETI   120
KEAVPEMWSV DMKNAWGEAF DQLVNAIKTE MK                                 152

SEQ ID NO: 22              moltype = AA   length = 132
FEATURE                    Location/Qualifiers
source                     1..132
                           mol_type = protein
                           organism = Bacillus subtilis
SEQUENCE: 22
MGQSFNAPYE AIGEELLSQL VDTFYERVAS HPLLKPIFPS DLTETARKQK QFLTQYLGGP    60
PLYTEEHGHP MLRARHLPFP ITNERADAWL SCMKDAMDHV GLEGEIREFL FGRLELTARH   120
MVNQTEAEDR SS                                                       132

SEQ ID NO: 23              moltype = AA   length = 131
FEATURE                    Location/Qualifiers
source                     1..131
                           mol_type = protein
                           organism = Corynebacterium glutamicum
SEQUENCE: 23
MTTSENFYDS VGGEETFSLI VHRFYEQVPN DDILGPMYPP DDFEGAEQRL KMFLSQYWGG    60
PKDYQEQRGH PRLRMRHVNY PIGVTAAERW LQLMSNALDG VDLTAEQREA IWEHMVRAAD   120
MLINSNPDPH A                                                        131

SEQ ID NO: 24              moltype = AA   length = 124
FEATURE                    Location/Qualifiers
source                     1..124
                           mol_type = protein
                           organism = Synechocystis sp.
SEQUENCE: 24
MSTLYEKLGG TTAVDLAVDK FYERVLQDDR IKHFFADVDM AKQRAHQKAF LTYAFGGTDK    60
YDGRYMREAH KELVENHGLN GEHFDAVAED LLATLKEMGV PEDLIAEVAA VAGAPAHKRD   120
VLNQ                                                                124

SEQ ID NO: 25              moltype = AA   length = 183
FEATURE                    Location/Qualifiers
source                     1..183
                           mol_type = protein
                           organism = Synechococcus sp.
SEQUENCE: 25
MDVALLEKSF EQISPRAIEF SASFYQNLFH HHPELKPLFA ETSQTIQEKK LIFSLAAIIE    60
NLRNPDILQP ALKSLGARHA EVGTIKSHYP LVGQALIETF AEYLAADWTE QLATAWVEAY  120
```

```
DVIASTMIEG ADNPAAYLEP ELTFYEWLDL YGEESPKVRN AIATLTHFHY GEDPQDVQRD    180
SRG                                                                 183

SEQ ID NO: 26           moltype = AA  length = 118
FEATURE                 Location/Qualifiers
source                  1..118
                        mol_type = protein
                        organism = Nostoc commune
SEQUENCE: 26
MSTLYDNIGG QPAIEQVVDE LHKRIATDSL LAPVFAGTDM VKQRNHLVAF LAQIFEGPKQ    60
YGGRPMDKTH AGLNLQQPHF DAIAKHLGER MAVRGVSAEN TKAALDRVTN MKGAILNK     118

SEQ ID NO: 27           moltype = AA  length = 136
FEATURE                 Location/Qualifiers
source                  1..136
                        mol_type = protein
                        organism = Bacillus megaterium
SEQUENCE: 27
MREKIHSPYE LLGGEHTISK LVDAFYTRVG QHPELAPIFP DNLTETARKQ KQFLTQYLGG    60
PSLYTEEHGH PMLRARHLPF EITPSRAKAW LTCMHEAMDE INLEGPERDE LYHRLILTAQ  120
HMINSPEQTD EKGFSH                                                  136

SEQ ID NO: 28           moltype = DNA  length = 1683
FEATURE                 Location/Qualifiers
source                  1..1683
                        mol_type = genomic DNA
                        organism = Pichia pastoris
SEQUENCE: 28
atggagtttg tcgcccgtca gtccatgaat gcctgtccct tgtcaggtc aacttctacc     60
caccatttga agaagttggc agcaaacagt tctctagctg ctactgctag tcattgtccc   120
gtggttggcc ctgctctcca acagcagaga tactactctc aaccttccaa gccagcccaa   180
gcccaaacct ccgacattgc tactgggatc aagaaggatg tttctccgat ccgtatggac   240
tctaatgaaa ccgcctttga ttacaatgga atgtatgagt ctgatcttgc gaataaacgt   300
aaagataact cgtatcgtta tttcaataac atcaaccgtc tagccaagga gtttcccaag   360
gcacatcgcc agaccgaaga tgacaaggtg accgtctggt gctctaacga ctacttagga   420
atgggtaggc atcctgagat tatcaaaacc atgaaggcta ccatggacaa gtacggttcc   480
ggagcaggag gaactaggaa cattgcaggt cataaccacg ccgctatcaa tttggaaagc   540
gagttggctt gcttgaacaa gaaggaagcg gctctggtgt tttcatcatg tttcatagct   600
aacgatgcaa tcatctcgtt gttgggacaa aaaatcaaaa atttggtcat tttctctgac   660
cagtcgaatc atgcttccat gatattgggt gtgcgtaact ccaaagcgaa gaagcacatc   720
ttcaagcaca acaatttgaa ggatctggag tcgcagttag ctcagtaccc caagtcgact   780
cctaaactga tcgccttcga gtcagtttac tctatgtgtg gatctgtggc tcccattgag   840
aagatttgcg atttggctaa aaggtacggt gccctcacct tcttggatga agttcatgct   900
gttggaatgt atggtcctca tggacagggt gtagctgagc attttggactt tgatctgcat   960
ttacagtctg gaatcgccag tcctagcgtg gtggacaaac gcaccatatt ggatcgtgtc  1020
gacatgatta ctggtacttg cggaaagtca tttggtactg ttggaggtta cgttgctggt  1080
agtgccaacc taattgattg gttaagatcc tatgcgccag gtttcatttt cactaccaca  1140
cttcctcctg ctatcatggc tggtacagcc acttctgttc gtattgttag ggccgacatt  1200
gaggcccgta tcaagcaaca gcttaatact cgctacgtca aagactcatt tgaaaacctt  1260
ggtattccag tcattccaaa cccaagtcac attgttcctg ttctagttgg aaatgctgca  1320
gatgccaaga aggcatccga tatgttaatg aacaaacacc gtatttatgt tcaagctatt  1380
aactacccta ctgtgcctgt cggtgaagaa cgactaagga ttactcctac tccaggtcat  1440
ggaaaggaga tttgtgacca gctgatcagc gctgtcgacg atgtttttac tgagcttaat  1500
ttaccaagaa tcaacaaatg gcagtcccaa ggtggtcatt gcggtgttgg tgatgctaat  1560
tacgtaccag aacccaatct gtggactcag accagctca gcttgacaaa ccaagacttg   1620
cactccaatg tgcacaaccc agtgattgag cagatcgaaa cctcatcagg agtcagattg  1680
tag                                                               1683

SEQ ID NO: 29           moltype = AA  length = 560
FEATURE                 Location/Qualifiers
source                  1..560
                        mol_type = protein
                        organism = Pichia pastoris
SEQUENCE: 29
MEFVARQSMN ACPFVRSTST HHLKKLAANS SLAATASHCP VVGPALQQQR YYSQPSKPAQ    60
AQTSDIATGI KKDVSPIRMD SNETAFDYNG MYESDLANKR KDNSYRYFNN INRLAKEFPK   120
AHRQTEDDKV TVWCSNDYLG MGRHPEIIKT MKATMDKYGS GAGGTRNIAG HNHAAINLES   180
ELACLNKKEA ALVFSSCFIA NDAIISLLGQ KIKNLVIFSD QSNHASMILG VRNSKAKKHI   240
FKHNNLKDLE SQLAQYPKST PKLIAFESVY SMCGSVAPIE KICDLAKRYG ALTFLDEVHA   300
VGMYGPHGQG VAEHLDFDLH LQSGIASPSV VDKRTILDRV DMITGTCGKS FGTVGGYVAG   360
SANLIDWLRS YAPGFIFTTT LPPAIMAGTA TSVRIVRADI EARIKQQLNT RYVKDSFENL   420
GIPVIPNPSH IVPVLVGNAA DAKKASDMLM NKHRIYVQAI NYPTVPVGEE RLRITPTPGH   480
GKEICDQLIS AVDDVFTELN LPRINKWQSQ GGHCGVGDAN YVPEPNLWTQ DQLSLTNQDL   540
HSNVHNPVIE QIETSSGVRL                                              560

SEQ ID NO: 30           moltype = DNA  length = 1683
FEATURE                 Location/Qualifiers
source                  1..1683
                        mol_type = other DNA
```

```
                        organism = synthetic construct
SEQUENCE: 30
atggagtttg tcgcccgtca gtccatgaat gcctctccct tgtcaggtc aacttctacc     60
caccatttga agaagttggc agcaaacagt tctctagctg ctactgctag tcattctccc    120
gtggttggcc ctgctctcca acagcagaga tactactctc aaccttccaa gccagcccaa    180
gcccaaacct ccgacattgc tactgggatc aagaaggatg tttctccgat ccgtatggac    240
tctaatgaaa ccgcctttga ttacaatgga atgtatgagt ctgatcttgc gaataaacgt    300
aaagataact cgtatcgtta tttcaataac atcaaccgtc tagccaagga gtttcccaag    360
gcacatcgcc agaccgaaga tgacaaggtg accgtctggt gctctaacga ctacttagga    420
atgggtaggc atcctgagat tatcaaaacc atgaaggcta ccatggacaa gtacggttcc    480
ggagcaggag gaactaggaa cattgcaggt cataaccacg ccgctatcaa tttgaaagc     540
gagttggctt gcttgaacaa gaaggaagcg gctctggtgt tttcatcatg tttcatagct    600
aacgatgcaa tcatctcgtt gttgggacaa aaaatcaaaa atttggtcat tttctctgac    660
cagtcgaatc atgcttccat gatattgggt gtgcgtaact ccaaagcgaa gaagcactc    720
ttcaagcaca acaatttgaa ggatctggag tcgcagttag ctcagtaccc caagtcgact    780
cctaaactga tcgccttcga gtcagtttac tctatgtgtg gatctgtggc tcccattgag    840
aagatttgcg atttggctaa aggtacggt gccctcacct tcttgatga gttcatgct      900
gttggaatgt atggtcctca tggacagggt gtagctgcac atttggactt tgatctgcat    960
ttacagtctg gaatcgccag tcctagcgtg gtggacaaac gcaccatatt ggatcgtgtc   1020
gacatgatta ctggtacttg cggaaagtca tttggtactg ttggaggtta cgttgctggt   1080
agtgccaacc taattgattg gttaagatcc tatgcgccag gttttcatttt cactaccaca   1140
cttcctcctg ctatcatggc tggtacagcc acttctgttc gtgttgttag ggccgacatt   1200
gaggcccgta tcaagcaaca gcttaatact cgctacgtca aagactcatt tgaaaacctt   1260
ggtattccag tcattccaaa cccaagtcac attgttcctg ttctagttgg aaatgctgca   1320
gatgccaaga aggcatccga tatgttaatg aacaaacacc gtatttatgt tcaagctatt   1380
aactacccta ctgtgcctgt cggtgaagaa cgactaagaa ttactcctac tccaggtcat   1440
ggaaaggaga tttgtgacca gctgatcagc gctgtcgacg atgttttttac tgagcttaat   1500
ttaccaagaa tcaacaaatg gcagtcccaa ggtggtcatt gcggtgttgg tgatgctaat   1560
tacgtaccag aacccaatct gtggactcag accagctca gcttgacaaa ccaagacttg    1620
cactccaatg tgcacaaccc agtgattgag cagatcgaaa cctcatcagg agtcagattg    1680
tag                                                                 1683

SEQ ID NO: 31           moltype = AA  length = 560
FEATURE                 Location/Qualifiers
source                  1..560
                        mol_type = protein
                        organism = synthetic construct
SEQUENCE: 31
MEFVARQSMN ASPFVRSTST HHLKKLAANS SLAATASHSP VVGPALQQQR YYSQPSKPAQ     60
AQTSDIATGI KKDVSPIRMD SNETAFDYNG MYESDLANKR KDNSYRYFNN INRLAKEFPK    120
AHRQTEDDKV TVWCSNDYLG MGRHPEIIKT MKATMDKYGS GAGGTRNIAG HNHAAINLES    180
ELACLNKKEA ALVFSSCFIA NDAIISLLGQ KIKNLVIFSD QSNHASMILG VRNSKAKKHI    240
FKHNNLKDLE SQLAQYPKST PKLIAFESVY SMCGSVAPIE KICDLAKRYG ALTFLDEVHA    300
VGMYGPHGQG VAEHLDFDLH LQSGIASPSV VDKRTILDRV DMITGTCGKS FGTVGGYVAG    360
SANLIDWLRS YAPGFIFTTT LPPAIMAGTA TSVRIVRADI EARIKQQLNT RYVKDSFENL    420
GIPVIPNPSH IVPVLVGNAA DAKKASDMLM NKHRIYVQAI NYPTVPVGEE RLRITPTPGH    480
GKEICDQLIS AVDDVFTELN LPRINKWQSQ GGHCGVGDAN YVPEPNLWTQ DQLSLTNQDL    540
HSNVHNPVIE QIETSSGVRL                                                560

SEQ ID NO: 32           moltype =     length =
SEQUENCE: 32
000

SEQ ID NO: 33           moltype = AA  length = 5
FEATURE                 Location/Qualifiers
source                  1..5
                        mol_type = protein
                        organism = synthetic construct
SEQUENCE: 33
ACPFV                                                                  5

SEQ ID NO: 34           moltype = AA  length = 5
FEATURE                 Location/Qualifiers
source                  1..5
                        mol_type = protein
                        organism = synthetic construct
SEQUENCE: 34
HCPVV                                                                  5

SEQ ID NO: 35           moltype = AA  length = 5
FEATURE                 Location/Qualifiers
source                  1..5
                        mol_type = protein
                        organism = synthetic construct
SEQUENCE: 35
ICPFM                                                                  5

SEQ ID NO: 36           moltype = AA  length = 5
FEATURE                 Location/Qualifiers
```

```
source                          1..5
                                mol_type = protein
                                organism = synthetic construct
SEQUENCE: 36
GCPVV                                                                    5

SEQ ID NO: 37        moltype = DNA   length = 41
FEATURE              Location/Qualifiers
source               1..41
                     mol_type = other DNA
                     organism = synthetic construct
SEQUENCE: 37
cgtcagtcca tgaatgcctc tcccttttgtc aggtcaactt c                           41

SEQ ID NO: 38        moltype = DNA   length = 41
FEATURE              Location/Qualifiers
source               1..41
                     mol_type = other DNA
                     organism = synthetic construct
SEQUENCE: 38
gaagttgacc tgacaaaggg agaggcattc atggactgac g                            41

SEQ ID NO: 39        moltype = DNA   length = 37
FEATURE              Location/Qualifiers
source               1..37
                     mol_type = other DNA
                     organism = synthetic construct
SEQUENCE: 39
gctgctactg ctagtcattc tcccgtggtt ggccctg                                 37

SEQ ID NO: 40        moltype = DNA   length = 37
FEATURE              Location/Qualifiers
source               1..37
                     mol_type = other DNA
                     organism = synthetic construct
SEQUENCE: 40
cagggccaac cacgggagaa tgactagcag tagcagc                                 37

SEQ ID NO: 41        moltype = DNA   length = 27
FEATURE              Location/Qualifiers
source               1..27
                     mol_type = other DNA
                     organism = synthetic construct
SEQUENCE: 41
aaacgctgtc ttggaaccta atatgac                                            27

SEQ ID NO: 42        moltype = DNA   length = 38
FEATURE              Location/Qualifiers
source               1..38
                     mol_type = other DNA
                     organism = synthetic construct
SEQUENCE: 42
gacgggcgac aaactccatc gtttcgaata attagttg                                38

SEQ ID NO: 43        moltype = DNA   length = 40
FEATURE              Location/Qualifiers
source               1..40
                     mol_type = other DNA
                     organism = synthetic construct
SEQUENCE: 43
caactaatta ttcgaaacga tggagtttgt cgcccgtcag                              40

SEQ ID NO: 44        moltype = DNA   length = 45
FEATURE              Location/Qualifiers
source               1..45
                     mol_type = other DNA
                     organism = synthetic construct
SEQUENCE: 44
aattaaatac atttcaacta caatctgact cctgatgagg tttcg                        45

SEQ ID NO: 45        moltype = DNA   length = 42
FEATURE              Location/Qualifiers
source               1..42
                     mol_type = other DNA
                     organism = synthetic construct
SEQUENCE: 45
cctcatcagg agtcagattg tagttgaaat gtatttaatt tg                           42

SEQ ID NO: 46        moltype = DNA   length = 24
```

-continued

```
FEATURE                 Location/Qualifiers
source                  1..24
                        mol_type = other DNA
                        organism = synthetic construct
SEQUENCE: 46
aaactgtcag ttttgggcca tttg                                              24

SEQ ID NO: 47           moltype = DNA   length = 21
FEATURE                 Location/Qualifiers
source                  1..21
                        mol_type = other DNA
                        organism = synthetic construct
SEQUENCE: 47
gctctccaac agcagagata c                                                 21

SEQ ID NO: 48           moltype = DNA   length = 21
FEATURE                 Location/Qualifiers
source                  1..21
                        mol_type = other DNA
                        organism = synthetic construct
SEQUENCE: 48
gtccatacgg atcggagaaa c                                                 21

SEQ ID NO: 49           moltype = DNA   length = 19
FEATURE                 Location/Qualifiers
source                  1..19
                        mol_type = other DNA
                        organism = synthetic construct
SEQUENCE: 49
agcaacatcc ctgattccg                                                    19

SEQ ID NO: 50           moltype = DNA   length = 20
FEATURE                 Location/Qualifiers
source                  1..20
                        mol_type = other DNA
                        organism = synthetic construct
SEQUENCE: 50
atgcgtacct tcaatcctgg                                                   20

SEQ ID NO: 51           moltype = DNA   length = 24
FEATURE                 Location/Qualifiers
source                  1..24
                        mol_type = other DNA
                        organism = synthetic construct
SEQUENCE: 51
aagcccaaac ctccgacatt gcta                                              24

SEQ ID NO: 52           moltype = DNA   length = 28
FEATURE                 Location/Qualifiers
source                  1..28
                        mol_type = other DNA
                        organism = synthetic construct
SEQUENCE: 52
tcgccgtaag ttcttggttt agacgttc                                          28

SEQ ID NO: 53           moltype = DNA   length = 23
FEATURE                 Location/Qualifiers
source                  1..23
                        mol_type = other DNA
                        organism = synthetic construct
SEQUENCE: 53
tagcgcagtc tctctatcgc ttc                                               23

SEQ ID NO: 54           moltype = DNA   length = 20
FEATURE                 Location/Qualifiers
source                  1..20
                        mol_type = other DNA
                        organism = synthetic construct
SEQUENCE: 54
cactgggttg tgcacattgg                                                   20

SEQ ID NO: 55           moltype = DNA   length = 20
FEATURE                 Location/Qualifiers
source                  1..20
                        mol_type = other DNA
                        organism = synthetic construct
SEQUENCE: 55
acaatattct tctctgccgc                                                   20
```

-continued

```
SEQ ID NO: 56          moltype = DNA   length = 20
FEATURE                Location/Qualifiers
source                 1..20
                       mol_type = other DNA
                       organism = synthetic construct
SEQUENCE: 56
ttgatctcgt caagaatgcg                                                     20

SEQ ID NO: 57          moltype = DNA   length = 23
FEATURE                Location/Qualifiers
source                 1..23
                       mol_type = other DNA
                       organism = synthetic construct
SEQUENCE: 57
taggtgccac aacttttggt ttc                                                 23

SEQ ID NO: 58          moltype = DNA   length = 24
FEATURE                Location/Qualifiers
source                 1..24
                       mol_type = other DNA
                       organism = synthetic construct
SEQUENCE: 58
gatccaatgc gatgacattc ttgt                                                24

SEQ ID NO: 59          moltype = DNA   length = 24
FEATURE                Location/Qualifiers
source                 1..24
                       mol_type = other DNA
                       organism = synthetic construct
SEQUENCE: 59
acctgcaata actcctcttc tctg                                                24

SEQ ID NO: 60          moltype = DNA   length = 20
FEATURE                Location/Qualifiers
source                 1..20
                       mol_type = other DNA
                       organism = synthetic construct
SEQUENCE: 60
ccactgaggg tagccgaatc                                                     20

SEQ ID NO: 61          moltype = DNA   length = 22
FEATURE                Location/Qualifiers
source                 1..22
                       mol_type = other DNA
                       organism = synthetic construct
SEQUENCE: 61
gggctctgaa aaactctttt gg                                                  22

SEQ ID NO: 62          moltype = DNA   length = 27
FEATURE                Location/Qualifiers
source                 1..27
                       mol_type = other DNA
                       organism = synthetic construct
SEQUENCE: 62
gcatgtctca ataacagatc tcgacgg                                             27

SEQ ID NO: 63          moltype = DNA   length = 27
FEATURE                Location/Qualifiers
source                 1..27
                       mol_type = other DNA
                       organism = synthetic construct
SEQUENCE: 63
aagcctcttg tttttctgta aatgcac                                             27

SEQ ID NO: 64          moltype = DNA   length = 22
FEATURE                Location/Qualifiers
source                 1..22
                       mol_type = other DNA
                       organism = synthetic construct
SEQUENCE: 64
tgatggcgtc cgagatgaac tc                                                  22

SEQ ID NO: 65          moltype = DNA   length = 21
FEATURE                Location/Qualifiers
source                 1..21
                       mol_type = other DNA
                       organism = synthetic construct
SEQUENCE: 65
atggagtttg tcgcccgtca g                                                   21
```

| | |
|---|---|
| SEQ ID NO: 66 | moltype = DNA length = 27 |
| FEATURE | Location/Qualifiers |
| source | 1..27 |
| | mol_type = other DNA |
| | organism = synthetic construct |
| SEQUENCE: 66 | |
| ctacaatctg actcctgatg aggtttc | 27 |

What is claimed is:

1. A method of producing a heme-binding protein in a cell, the method comprising:
expressing in the cell a first exogenous nucleic acid construct comprising a nucleotide sequence encoding an aminolevulinate synthase (ALAS) protein operably linked to a first promoter element, wherein the ALAS protein comprises an amino acid sequence having at least 80% sequence identity to the amino acid sequence of SEQ ID NO: 29, wherein the ALAS protein comprises at least a first heme responsive motif (HRM), wherein the first HRM comprises a mutated C-P motif, and wherein the mutated C-P motif in the first HRM has a mutation from cysteine to a different amino acid; and
expressing in the cell a second exogenous nucleic acid construct comprising a nucleotide sequence encoding a heme-binding protein,
wherein the second exogenous nucleic acid construct comprising a nucleotide sequence encoding the heme-binding protein is operably linked to the first promoter element or is operably linked to a second promoter element.

2. The method of claim 1, wherein the cell is a fungal cell.

3. The method of claim 1, wherein the ALAS protein comprises a second HRM, wherein the second HRM comprises a mutated C-P motif, and wherein the mutated C-P motif in the second HRM has a mutation from cysteine to a different amino acid.

4. The method of claim 3, wherein the method produces the heme-binding protein in a titer that is at least 5% greater than a corresponding method lacking the mutations in the first HRM and second HRM.

5. The method of claim 3, wherein the method produces the heme-binding protein in a titer that is at least 10% greater than a corresponding method lacking the mutations in the first HRM and second HRM.

6. The method of claim 3, wherein the different amino acid is the same for the mutation in the first HRM and the mutation in the second HRM.

7. The method of claim 1, wherein the different amino acid is serine, alanine, phenylalanine, or histidine.

8. The method of claim 1, wherein the ALAS protein comprises an amino acid sequence having at least 90% sequence identity to the amino acid sequence in SEQ ID NO: 29.

9. The method of claim 1, wherein the heme-binding protein is selected from the group consisting of a globin, a cytochrome, a cytochrome c oxidase, a ligninase, a catalase, and a peroxidase.

10. The method of claim 3, wherein the different amino acid in the mutation in the first HRM is serine, alanine, phenylalanine, or histidine, and wherein the different amino acid in the mutation in the second HRM is serine, alanine, phenylalanine, or histidine.

11. The method of claim 6, wherein the different amino acid is serine, alanine, phenylalanine, or histidine.

12. The method of claim 1, wherein the cell is a yeast cell.

* * * * *